(12) United States Patent
Laroia et al.

(10) Patent No.: US 8,099,099 B2
(45) Date of Patent: *Jan. 17, 2012

(54) METHODS AND APPARATUS RELATED TO ASSIGNMENT IN A WIRELESS COMMUNICATIONS SYSTEM

(75) Inventors: Rajiv Laroia, Far Hills, NJ (US); Vladimir Parizhisky, New York, NY (US); Junyi Li, Bedminster, NJ (US); Sathyadev Venkata Uppala, Whitehouse Station, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1314 days.

This patent is subject to a terminal disclaimer.

(21) Appl. No.: 11/487,053

(22) Filed: Jul. 14, 2006

(65) Prior Publication Data

US 2008/0013490 A1 Jan. 17, 2008

Related U.S. Application Data

(63) Continuation-in-part of application No. 10/780,539, filed on Feb. 17, 2004, now Pat. No. 7,813,322.

(60) Provisional application No. 60/448,667, filed on Feb. 19, 2003.

(51) Int. Cl.
*H04W 72/00* (2009.01)
(52) U.S. Cl. ............... 455/450; 455/452.1; 455/464; 455/511; 455/509; 370/329; 370/331; 380/270; 380/278
(58) Field of Classification Search .......... 455/450, 455/452.1, 464, 511, 509; 370/329, 331, 370/341, 458; 380/270, 278
See application file for complete search history.

(56) References Cited

U.S. PATENT DOCUMENTS

| 5,335,010 A | * | 8/1994 | Lindemeier et al. .......... 348/706 |
| 5,881,069 A | | 3/1999 | Cannon et al. |
| 5,907,577 A | * | 5/1999 | Hoole .......................... 375/130 |

(Continued)

FOREIGN PATENT DOCUMENTS

EP 1156617 A1 11/2001

(Continued)

OTHER PUBLICATIONS

International Search Report—PCT/US07/073321, International Search Authority—European Patent Office—Feb. 5, 2008.

(Continued)

*Primary Examiner* — Nick Corsaro
*Assistant Examiner* — Babar Sarwar
(74) *Attorney, Agent, or Firm* — Donald C. Kordich

(57) ABSTRACT

Methods and apparatus related to assignment in a wireless communications system are described. A mobile is assigned an identifier and a mask value, e.g., as part of a state transition message. The mobile uses the assigned identifier and/or the assigned mask value in determining whether assignments included in assignment messages, e.g., traffic channel assignment messages, are directed to the wireless terminal. Predetermined associations between assignment slots, assigned segments, and/or mask values are utilized to limit control signaling overhead. Different groups of segments are available for assignment to different wireless terminals as a function of mask values. Different types of assignment messages use different amounts of information bits to convey the assignment. Some types of assignments use a wireless terminal identifier, while other types of assignments use a wireless terminal identifier and a mask identifier. The mask identifier, e.g., a single bit, allows for selection between a subset of the potential masks used in the system.

72 Claims, 24 Drawing Sheets

U.S. PATENT DOCUMENTS

| | | | |
|---|---|---|---|
| 6,172,970 B1* | 1/2001 | Ling et al. | 370/347 |
| 6,297,691 B1* | 10/2001 | Anderson et al. | 329/300 |
| 6,418,549 B1 | 7/2002 | Ramchandran et al. | |
| 6,631,128 B1 | 10/2003 | Lemieux | |
| 6,646,993 B1 | 11/2003 | Davies et al. | |
| 6,661,784 B1 | 12/2003 | Nykanen | |
| 6,771,706 B2* | 8/2004 | Ling et al. | 375/267 |
| 6,847,678 B2* | 1/2005 | Berezdivin et al. | 375/146 |
| 6,895,010 B1 | 5/2005 | Chang et al. | |
| 6,904,555 B2 | 6/2005 | Nagase et al. | |
| 6,925,561 B1* | 8/2005 | Hunt et al. | 713/169 |
| 7,006,848 B2* | 2/2006 | Ling et al. | 455/562.1 |
| 7,035,894 B2 | 4/2006 | Park et al. | |
| 7,058,873 B2* | 6/2006 | Song et al. | 714/752 |
| 7,146,553 B2* | 12/2006 | Jarchi et al. | 714/755 |
| 7,185,256 B2 | 2/2007 | Miki et al. | |
| 7,197,021 B2 | 3/2007 | Seo et al. | |
| 2002/0053058 A1 | 5/2002 | Lee et al. | |
| 2002/0060997 A1 | 5/2002 | Hwang | |
| 2002/0155852 A1* | 10/2002 | Bender | 455/522 |
| 2003/0039218 A1 | 2/2003 | Kwak | |
| 2004/0002340 A1 | 1/2004 | Lim et al. | |
| 2004/0114566 A1* | 6/2004 | Lim et al. | 370/349 |
| 2004/0153909 A1 | 8/2004 | Lim et al. | |
| 2004/0228320 A1* | 11/2004 | Laroia et al. | 370/349 |
| 2005/0030911 A1 | 2/2005 | Tiedemann et al. | |
| 2005/0163161 A1 | 7/2005 | Wei et al. | |
| 2007/0011553 A1 | 1/2007 | Altahan et al. | |

FOREIGN PATENT DOCUMENTS

| | | |
|---|---|---|
| EP | 1168703 A2 | 1/2002 |
| EP | 1326361 A1 | 7/2003 |
| GB | 2357017 A | 6/2001 |
| JP | 60041832 | 3/1985 |
| JP | 2000512094 T | 9/2000 |
| JP | 2002111637 A | 4/2002 |
| JP | 2003507944 T | 2/2003 |
| JP | 2006524966 T | 11/2006 |
| JP | 2007525043 T | 8/2007 |
| JP | 2007536846 T | 12/2007 |
| KR | 2001018182 | 3/2001 |
| WO | 9746044 | 12/1997 |
| WO | WO9849797 A2 | 11/1998 |
| WO | 0024157 | 4/2000 |
| WO | WO00021236 A1 | 4/2000 |
| WO | WO0101624 A1 | 1/2001 |
| WO | 0113655 | 2/2001 |
| WO | WO0203600 A1 | 1/2002 |
| WO | WO0233876 A1 | 4/2002 |
| WO | WO2004075023 | 9/2004 |
| WO | WO2004095851 | 11/2004 |
| WO | WO2005107304 A1 | 11/2005 |

OTHER PUBLICATIONS

Richardson TJ et al., "Efficient encoding of low-density parity-check codes," IEEE Transactions on Information Theory, US, vol. 47, No. 2, Feb. 1, 2001, pp. 638-656.

Written Opinion—PCT/US2007/073321, International Search Authority, European Patent Office, Feb. 5, 2008.

Shoji, T. et al., "Wireless Access Method to Ensure Each User's QoS in Unpredictable and Various QoS Requirements", Wireless Personal Communications, Springer, Dordrecht, NL, vol. 22, No. 2, Aug 1, 2002, pp. 139-151. XP001122731, ISSN: 0929-6212, DO1: 10.1023/A: 1019956104130.

Supplementary European Search Report—EP04712392—Search Authority—The Hague—Apr. 4, 2011.

Taiwan Search Report—TW096125768—TIPO—Jul. 19, 2011.

* cited by examiner

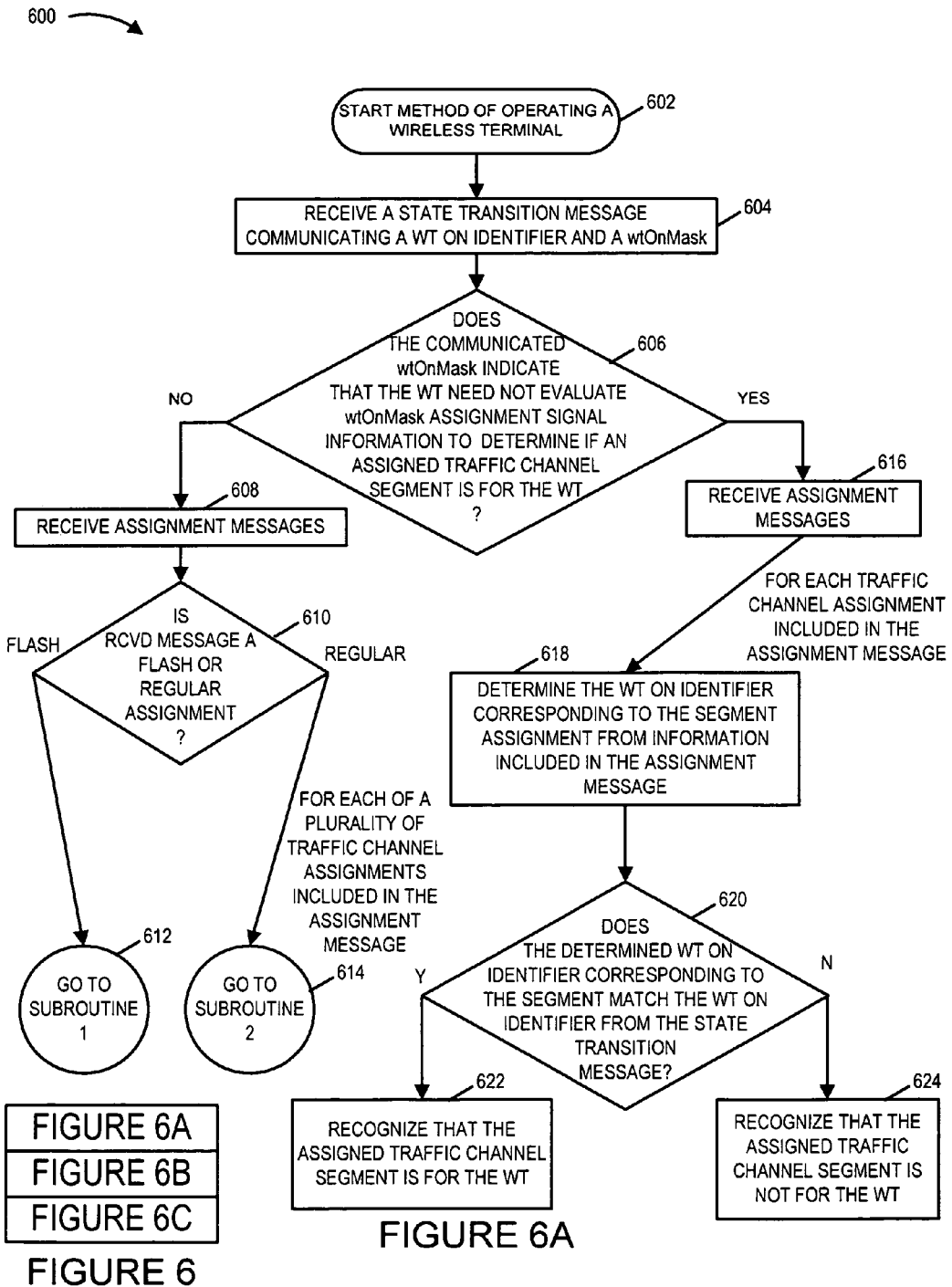

| | FIGURE 8A |
|---|---|
| | FIGURE 8B |
| | FIGURE 8C |

| | | 802 | 804 | 806 | 808 | 810 | 812 | 814 | 816 |

| | | | | | | | | | |
|---|---|---|---|---|---|---|---|---|---|
| | | Exemplary specification of UL.TCH assignment in the DL.TCCH channel | | | | | | | |
| Row Index | Framing Format | DL.TCCH.FLASH | | DL.TCCH.REGULAR UL.TCH assignment 0 | | DL.TCCH.REGULAR UL.TCH assignment 1 | |
| | | Index of assigned UL.TCH segment | Assigned wtOnMask | Index of assigned UL.TCH segment | Assigned wtOnMask | Index of assigned UL.TCH segment | Assigned wtOnMask |
| 20 | UL | 28 | 0b 100 | x | N/A | N/A | N/A |
| 21 | DL | N/A | N/A | x | N/A | x | N/A |
| 22 | UL | 30 | 0b 001 | 29 | 0b 010, 0b 100 | N/A | N/A |
| 23 | DL | N/A | N/A | x | N/A | x | N/A |
| 24 | UL | 32 | 0b 010 | 31 | 0b 001, 0b 010 | N/A | N/A |
| 25 | DL | N/A | N/A | 33 | 0b 100, 0b 001 | x | N/A |
| 26 | UL | 35 | 0b 100 | 34 | 0b 010, 0b 100 | N/A | N/A |
| 27 | DL | N/A | N/A | 36 | 0b 001, 0b 010 | x | N/A |
| 28 | UL | 38 | 0b 001 | 37 | 0b 100, 0b 001 | N/A | N/A |
| 29 | DL | N/A | N/A | x | N/A | x | N/A |
| 30 | UL | 39 | 0b 010 | x | N/A | N/A | N/A |
| 31 | DL | N/A | N/A | 40 | 0b 010, 0b 100 | 41 | 0b 001, 0b 010 |
| 32 | UL | x | N/A | x | N/A | N/A | N/A |
| 33 | DL | N/A | N/A | 42 | 0b 100, 0b 001 | 43 | 0b 010, 0b 100 |
| 34 | UL | 44 | 0b 100 | x | N/A | N/A | N/A |
| 35 | DL | N/A | N/A | 45 | 0b 001, 0b 010 | 46 | 0b 100, 0b 001 |
| 36 | UL | 47 | 0b 001 | x | N/A | N/A | N/A |
| 37 | DL | N/A | N/A | x | N/A | x | N/A |
| 38 | UL | 49 | 0b 010 | 48 | 0b 010, 0b 100 | N/A | N/A |
| 39 | DL | N/A | N/A | 50 | 0b 001, 0b 010 | x | N/A |
| 40 | UL | 52 | 0b 100 | 51 | 0b 100, 0b 001 | N/A | N/A |
| 41 | DL | N/A | N/A | x | N/A | x | N/A |
| 42 | UL | 54 | 0b 001 | 53 | 0b 010, 0b 100 | N/A | N/A |
| 43 | DL | N/A | N/A | 55 | 0b 001, 0b 010 | x | N/A |
| 44 | UL | 57 | 0b 010 | 56 | 0b 100, 0b 001 | N/A | N/A |
| 45 | DL | N/A | N/A | x | N/A | x | N/A |
| 46 | UL | 58 | 0b 100 | x | N/A | N/A | N/A |
| 47 | DL | N/A | N/A | 59 | 0b 010, 0b 100 | 60 | 0b 001, 0b 010 |
| 48 | UL | 61 | 0b 001 | x | N/A | N/A | N/A |
| 49 | DL | N/A | N/A | 62 | 0b 100, 0b 001 | 63 | 0b 010, 0b 100 |
| 50 | UL | x | N/A | x | N/A | N/A | N/A |
| 51 | DL | N/A | N/A | 64 | 0b 001, 0b 010 | 65 | 0b 100, 0b 001 |
| 52 | UL | 66 | 0b 010 | x | N/A | N/A | N/A |
| 53 | DL | N/A | N/A | x | N/A | x | N/A |

FIGURE 8B 802　804　806　808　810　812　814　816

| Row Index | Framing Format | DL.TCCH.FLASH | | DL.TCCH.REGULAR UL.TCH assignment 0 | | DL.TCCH.REGULAR UL.TCH assignment 1 | |
|---|---|---|---|---|---|---|---|
| | | Index of assigned UL.TCH segment | Assigned wtOnMask | Index of assigned UL.TCH segment | Assigned wtOnMask | Index of assigned UL.TCH segment | Assigned wtOnMask |
| 54 | UL | 68 | 0b 100 | 67 | 0b 010, 0b 100 | N/A | N/A |
| 55 | DL | N/A | N/A | 69 | 0b 001, 0b 010 | x | N/A |
| 56 | UL | 71 | 0b 001 | 70 | 0b 100, 0b 001 | N/A | N/A |
| 57 | DL | N/A | N/A | 72 | 0b 010, 0b 100 | x | N/A |
| 58 | UL | 74 | 0b 010 | 73 | 0b 001, 0b 010 | N/A | N/A |
| 59 | DL | N/A | N/A | x | N/A | x | N/A |
| 60 | UL | 76 | 0b 100 | 75 | 0b 100, 0b 001 | N/A | N/A |
| 61 | DL | N/A | N/A | x | N/A | x | N/A |
| 62 | UL | 0 | 0b 001 | x | N/A | N/A | N/A |
| 63 | DL | N/A | N/A | 1 | 0b 010, 0b 100 | 2 | 0b 001, 0b 010 |

Exemplary specification of UL.TCH assignment in the DL.TCCH channel

FIGURE 8C

| FIGURE 11A |
|---|
| FIGURE 11B |
| FIGURE 11C |

METHODS AND APPARATUS RELATED TO ASSIGNMENT IN A WIRELESS COMMUNICATIONS SYSTEM

RELATED APPLICATIONS

The present application is a continuation-in-part of U.S. patent application Ser. No. 10/780,539, filed Feb. 17, 2004 now U.S. Pat. No. 7,813,322 which claims the benefit of the filing date of U.S. Provisional Patent Application Ser. No. 60/448,667 filed Feb. 19, 2003.

FIELD OF THE INVENTION

This invention relates to multi-user communications systems and, more particularly, to methods and apparatus related to assignment in a wireless communication system.

BACKGROUND

As the popularity of wireless communications systems increases and the variety of types of data communications services offered increases, there is an ever increasing demand for the limited available air link resources, e.g., frequency spectrum, allocated to a given base station for its cell. In addition, the number of users and user demand for resources can vary as a function of time and events which can cause anticipated and unanticipated peaks in demand. High numbers of concurrent active users in a cell create challenges to satisfy the users' needs to communicate uplink and/or downlink user data in a timely manner while not expending a large portion of those air link resources for control signaling purposes. Resources that are utilized for control signaling purposes such as assignments reduce the amount of resources available to communicate user data. Complicating the efficient use of resources is the fact that, there are typically a variety of different types of users and/or applications which may have different traffic channel resource demands and requirements such as latency, acceptable error rate, etc.

One method of assignment used for traffic channel segments, is for a base station attachment point to allocate a unique base station assigned user identifier to each of the wireless terminals it is to be servicing, and then include that assignment identifier in an assignment message. However, as the number of potential current users increases, the number of bits needed to uniquely represent the user identifier increases, thus increasing the overhead signaling in each communicated assignment message. Generally this method also treats each of the users equally in that each user could potentially be assigned to any given traffic channel segment, even though some of the users may be more likely to be allocated a high number of traffic channel segments while others may be allocated a low number of traffic channel segments than other users in a given time interval.

While the known assignment method may be adequate for some applications, it would be beneficial if new and improved methods and apparatus were available for traffic channel assignment. It would be desirable if at least some new methods and apparatus could efficiently support a high number of users, provide flexibility in terms of accommodating different types of users/applications/current needs, and/or limit control signaling overhead as compared to other techniques.

SUMMARY

Methods and apparatus for communicating resource assignment information, e.g., traffic channel segment assignment information, and using such assignment information are described. Various exemplary methods and apparatus can be used in a system including both base stations and wireless terminals. Thus, it should be appreciated that some methods are applicable to base stations while other methods are applicable to wireless terminals.

An exemplary method of operating a base station, in accordance with some but not necessarily all embodiments, includes: communicating a base station assigned wireless terminal identifier and a corresponding mask value to a wireless terminal and subsequently communicating a first type of assignment message to the wireless terminal, said first type of assignment message including a wireless terminal identifier and a mask identifier value. The base station assigned wireless terminal identifier and corresponding mask value are, in some embodiments, communicated as part of a state transition message. The first type of assignment message may be a traffic channel assignment message.

The received mask value is, in some embodiments, used to determine the mode of operation to which the wireless terminal is being transitioned. Different On state modes of operation may correspond to different levels of available resources which may be utilized, and the received mask value may be used to identify the mode and at least some of those available resources.

The information from the state transition message may subsequently be used by the wireless terminal when processing assignment messages, e.g., traffic channel assignment messages, to determine whether or not the assignment is directed to the wireless terminal.

An exemplary base station, in accordance with some embodiments, includes a wireless terminal control message generation module for generating message information directed to a wireless terminal, said message information communicating a base station assigned wireless terminal identifier and a corresponding mask value; a first type assignment message generation module for generating an assignment message of a first type including said wireless terminal identifier and a mask identifier value; and a transmitter for transmitting said wireless terminal control message information and said first type assignment message.

An exemplary method of operating a wireless terminal, in accordance with some embodiments, includes: receiving a base station assigned wireless terminal identifier and a corresponding mask value from a base station; and receiving a first type of assignment message from said base station, said first type assignment message including a wireless terminal identifier and a mask identifier value.

An exemplary wireless terminal, in accordance with some embodiments, includes: a control message processing module for processing received control message information including a base station assigned wireless terminal identifier and a corresponding mask value, and a first type assignment message processing module for processing assignment messages of a first type, said first type assignment messages including a wireless terminal identifier and a mask identifier value.

Various but not necessarily all embodiments also include and use second type assignment messages in addition to first type assignment messages. In some embodiments second type assignment messages include a wireless terminal identifier but do not include a mask identifier value. In various embodiments, predetermined mapping associations between assignment slots, e.g., in an assignment channel, and traffic channel segments, e.g., in a traffic channel, are utilized to reduce control signaling. In one such embodiment the assignment and traffic channels are part of a recurring channel structure. In some embodiments, predetermined associations between traffic channel segments and mask information exists and is used to reduce control signaling.

In one particular exemplary embodiment a wireless communications system implements an uplink dedicated control channel (DCCH) supports both a full-tone format DCCH format and a split-tone DCCH format. In such an embodiment, if a logical DCCH channel tone is in full-tone format, each of the DCCH segments corresponding to the tone are associated with a single wireless terminal. If a logical DCCH tone is in split-tone format, the DCCH segments corresponding to the tone include a plurality of non-overlapping subsets, and each subset can be associated with a wireless terminal.

In the particular exemplary embodiment, a wireless terminal may receive, from a base station attachment point, a base station assigned ON-state identifier which is associated with a corresponding DCCH tone to be used by the wireless terminal. In addition, in accordance with the particular exemplary embodiment, the wireless terminal may receive an assignment mask. The bit pattern of the assignment mask identifies whether the DCCH tone to be used by the wireless terminal is in full-tone format or split-tone format. In addition, when split-tone format is indicated, the bit pattern further identifies which one or more non-overlapping subsets of DCCH segments associated with the logical tone are to be used by the wireless terminal.

In the particular exemplary embodiment, a recurring downlink/uplink traffic channel structure includes indexed segments, each indexed segment associated with a flash type assignment or regular type assignment. Each indexed traffic channel segment associated with a flash type assignment is associated, via a predetermined mapping, with a wireless terminal On-Mask bit pattern including one set bit. Each indexed traffic channel segment associated with a regular type assignment is associated, via a predetermined mapping, with two different wireless terminal On-Mask bit patterns, each of the two different bit patterns having a different single set bit.

A flash assignment for a traffic channel segment in the particular exemplary embodiment includes an ON-state identifier field, which carries the On-state identifier of the WT to which the assignment is directed. A wireless terminal in full-tone DCCH mode, by checking its assigned WT On-state identifier against the value in the On-state identifier field recognizes whether or not the assignment is directed toward itself. A wireless terminal in split tone DCCH mode compares its assigned On-state mask to the predetermined ON state mask associated with the segment to determine if the assignment can potentially be directed to itself; for segments in which the assignment can be directed to the wireless terminal, the wireless compares its assigned On state identifier to the value in the On-state identifier field of the flash assignment to determine whether or not it is the intended recipient of the assignment.

A regular assignment for a traffic channel segment in the particular exemplary embodiment includes a single bit On-Mask subfield in addition to an ON-state identifier subfield. The bit pattern of the On-Mask subfield identifies which of the two different potential wireless terminal On-Mask bit patterns applies to the segment assignment. A wireless terminal in full-tone format DCCH mode, by checking its assigned WT On-state identifier against the value in the On-state identifier field recognizes whether or not the assignment is directed toward itself. A wireless terminal in split-tone format DCCH mode compares its assigned On state mask to predetermined On state masks which can be associated with the segment to determine if the segment can potentially directed to itself. For a segment in which the assignment can be directed to the wireless terminal, the wireless terminal in split-tone DCCH mode, decodes the received value of the On-Mask subfield to determine an On-state mask. Then the wireless terminal can compare its assigned On-state mask to the decoded ON state mask currently associated with the segment to determine if the assignment can potentially be directed to itself. For segments in which the assignment can be directed to the wireless terminal, the wireless compares its assigned On state identifier to the value in the On-state identifier field of the assignment to determine whether or not it is the intended recipient of the assignment.

While the particular exemplary embodiment describes various steps being performed in a particular order, it should be appreciated that the order of various steps may vary depending on a given implementation.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 8C is a table of an exemplary specification of uplink traffic channel (UL.TCH) assignment in an exemplary downlink traffic control channel (DL.TCCH), in accordance with various embodiments.

DETAILED DESCRIPTION

Figure 1:
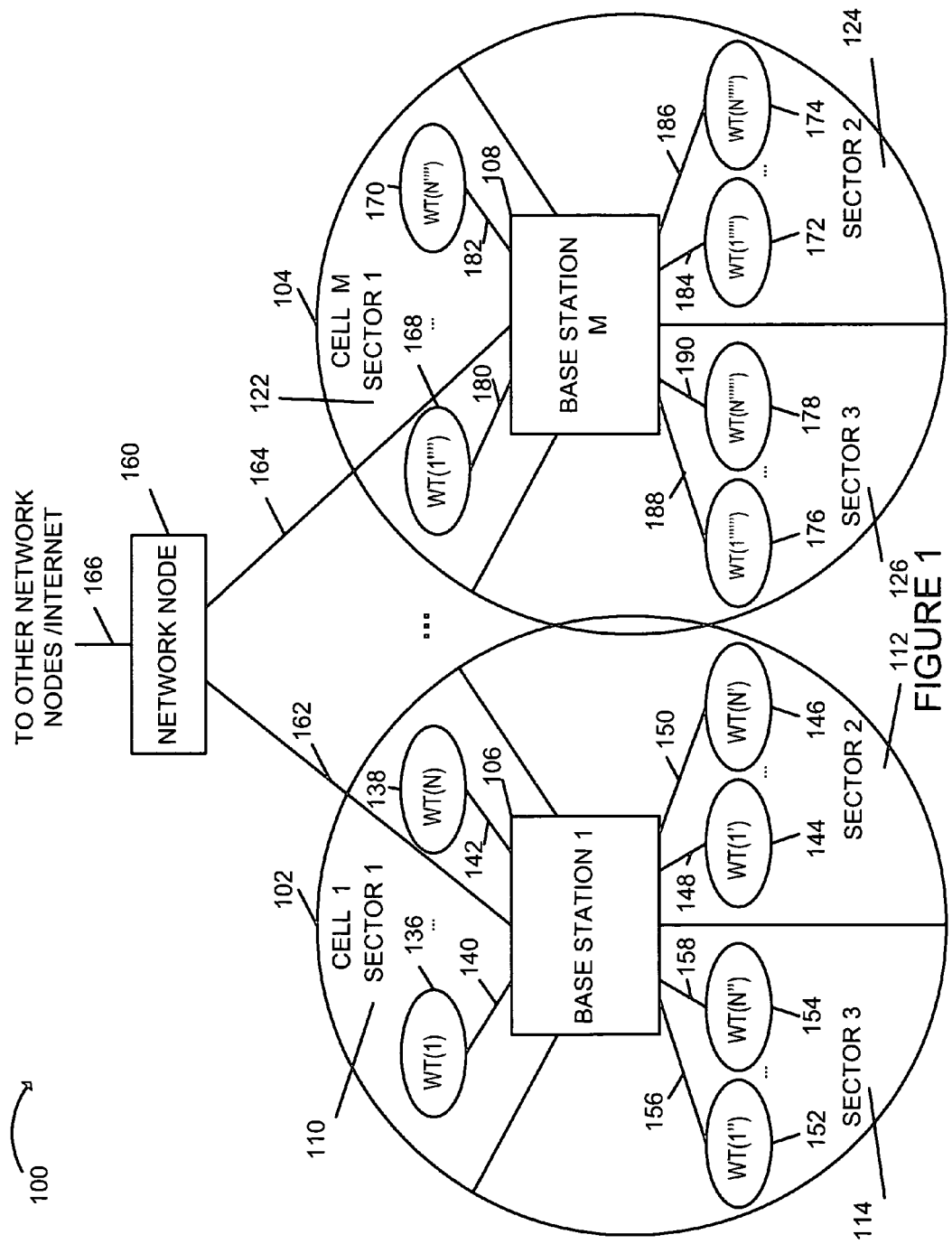
FIG. 1 is a drawing of an exemplary communication system implemented in accordance with various embodiments.

FIG. 1 shows an exemplary communication system 100 implemented in accordance with various embodiments. Exemplary communications system 100 includes multiple cells: cell 1 102, cell M 104. Exemplary system 100 is, e.g., an exemplary multiple access orthogonal frequency division multiplexing (OFDM) wireless communications system such as a multiple access OFDM spread spectrum system including tone hopping. Each cell 102, 104 of exemplary system 100 includes three sectors. Cells which have not be subdivided into multiple sectors (N=1), cells with two sectors (N=2) and cells with more than 3 sectors (N>3) are also possible in accordance with various embodiments. Each sector supports one or more carriers and/or downlink tones blocks. Each downlink tone block has a corresponding uplink tone block. In some embodiments at least some of the sectors support three downlink/uplink tones block pairs. Each combination of a sector and tone block pair, for a base station, corresponds to a different base station sector attachment point. Cell 102 includes a first sector, sector 1 110, a second sector, sector 2 112, and a third sector, sector 3 114. Similarly, cell M 104 includes a first sector, sector 1 122, a second sector, sector 2 124, and a third sector, sector 3 126. Cell 1 102 includes a base station (BS), base station 1 106, and a plurality of wireless terminals (WTs) in each sector 110, 112, 114. Sector 1 110 includes WT(1) 136 and WT(N) 138 coupled to BS 106 via wireless links 140, 142, respectively; sector 2 112 includes WT(1') 144 and WT(N') 146 coupled to BS 106 via wireless links 148, 150, respectively; sector 3 114 includes WT(1'') 152 and WT(N'') 154 coupled to BS 106 via wireless links 156, 158, respectively. Similarly, cell M 104 includes base station M 108, and a plurality of wireless terminals (WTs) in each sector 122, 124, 126. Sector 1 122 includes WT(1''') 168 and WT(N''') 170 coupled to BS M 108 via wireless links 180, 182, respectively; sector 2 124 includes WT(1'''') 172 and W(N'''') 174 coupled to BS M 108 via wireless links 184, 186, respectively; sector 3 126 includes WT(1''''') 176 and WT(N''''') 178 coupled to BS M 108 via wireless links 188, 190, respectively.

System 100 also includes a network node 160 which is coupled to BS1 106 and BS M 108 via network links 162, 164, respectively. Network node 160 is also coupled to other network nodes, e.g., other base stations, AAA server nodes, intermediate nodes, routers, etc. and the Internet via network link 166. Network links 162, 164, 166 may be, e.g., fiber optic cables. Each wireless, e.g. WT 1 136, includes a transmitter as well as a receiver. At least some of the wireless terminals, e.g., WT(1) 136, are mobile nodes which may move through system 100 and may communicate via wireless links with the base station in the cell in which the WT is currently located, e.g., using a base station sector attachment point. The wireless terminals (WTs), e.g. WT(1) 136, may communicate with peer nodes, e.g., other WTs in system 100 or outside system 100 via a base station, e.g. BS 106, and/or network node 160. WTs, e.g., WT(1) 136 may be mobile communications devices such as cell phones, personal data assistants with wireless modems, laptop computers with wireless modems, data terminals with wireless modems, etc.

In the exemplary system 100 of FIG. 1, corresponding to each base station attachment point, there is a recurring downlink/uplink channel structure which includes traffic channel assignment signaling opportunities and traffic channel segments. The assignment signaling opportunities, e.g., traffic control channel segments including one or more assignment opportunities, are linked to corresponding traffic channel segments. This predetermined linkage between an assignment signaling opportunity in the structure and a traffic channel segment in the structure reduces overhead signaling. In accordance with various embodiments, the assignment opportunities have, on an individual basis, a fixed association with one or more of a plurality of wtOnMask identifiers. For assignment opportunities where more than one wtOnMask identifier, representing a split-tone format, are possible alternatives, the assignment message includes a field, e.g., a single bit indicator field, used to distinguish between the alternatives. Thus a traffic channel segment can be unambiguously assigned to a wireless terminal. In this exemplary embodiment, a traffic channel segment can be assigned to any of the attachment points On state wireless terminals using full-tone dedicated control channel (DCCH) format, while the same traffic channel segment can be assigned to a subset of the wireless terminals using split-tone DCCH format. The approach, in accordance with various embodiments, provides an efficient, yet flexible assignment structure.

Figure 2:
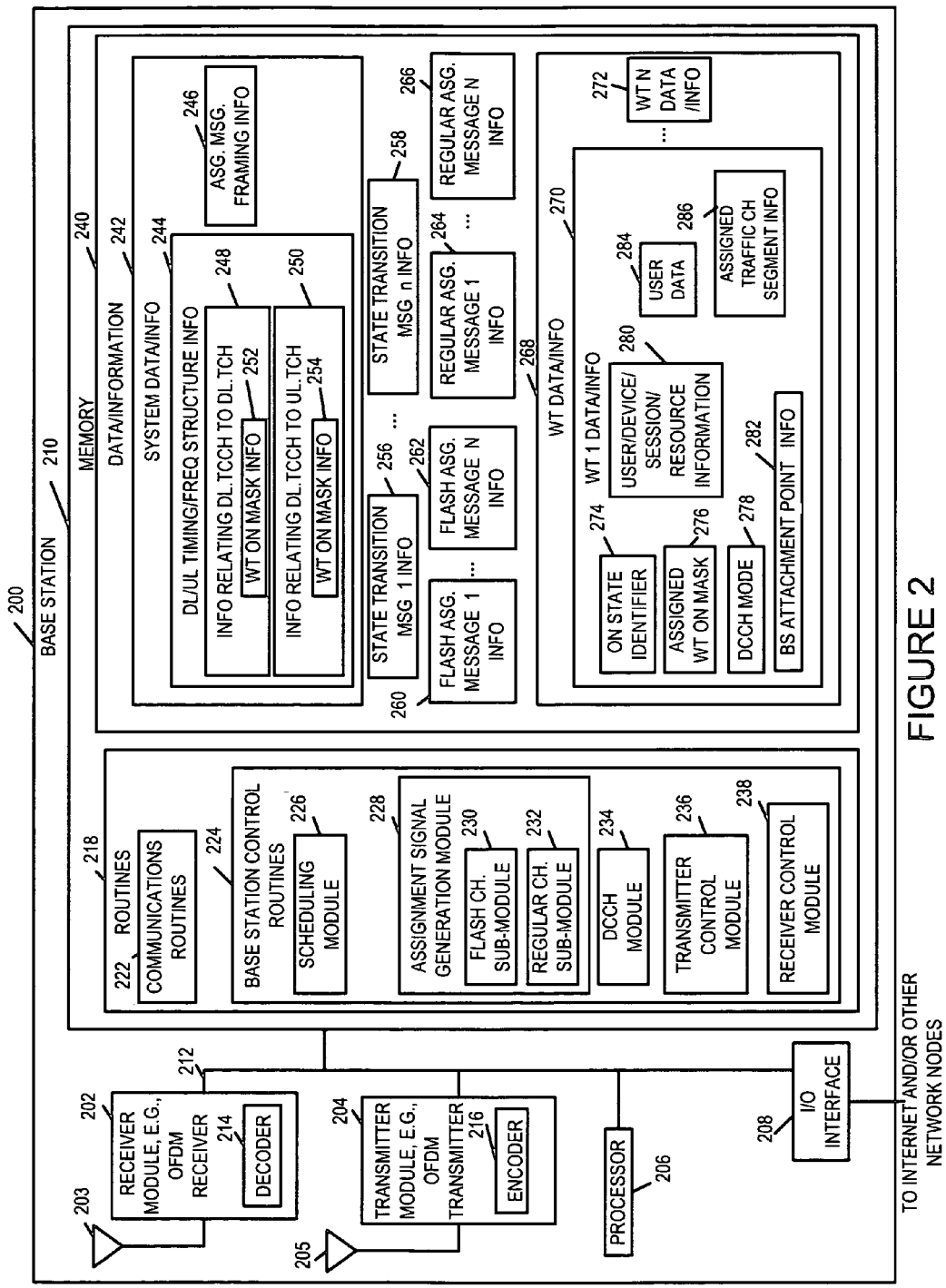
FIG. 2 is a drawing of an exemplary base station, e.g., access node, implemented in accordance with various embodiments.

FIG. 2 is a drawing of an exemplary base station 200, e.g., access node, implemented in accordance with various embodiments. Exemplary base station 200 may be any of the base stations (106, 108) of FIG. 1. Base station 200 includes a receiver module 202, a transmitter module 204, a processor 206, an I/O interface 208, and memory 210 coupled together via bus 212 over which the various elements may interchange data and information. Memory 210 includes routines 218 and data/information 240. The processor 206, e.g., a CPU, executes the routines 218 and uses the data/information 240 in memory 210 to control the operation of the base station and implement methods.

Receiver module 202, e.g., an OFDM receiver, is coupled to receive antenna 203 via which the base station receives uplink signals from wireless terminals. Received uplink signals include requests for state transition, uplink control channel segment signals including uplink dedicated control channel segment signals, and uplink traffic channel segment signals. Receiver module 202 includes a decoder 214 for decoding at least some of the received uplink signals, e.g., performing a block decoding operation on received uplink signals corresponding to an uplink traffic channel segment.

Transmitter module 204, e.g., an OFDM transmitter, is coupled to transmit antenna 205 via which the base station transmits downlink signals to wireless terminals. The downlink signals include state transition messages, downlink traffic control channel segment signals, and downlink traffic channel segment signals. At least some of the state transition messages include information indicating a wireless terminal On identifier and a wtOnMask. Downlink traffic control channel segment signals including assignment messages corresponding to uplink and/or downlink traffic channel segments, at least some of said assignment messages including a wtOnMask indicator value. Downlink traffic channel segment signals convey user data, e.g., voice data, audio data, text data, image data, file data, etc. In some embodiment, the same antenna is used for both receiver module 202 and transmitter module 204, e.g., in conjunction with a duplex module. In various embodiments, there is a separate receiver module 202 and a separate transmitter module 204 corresponding to each sector of the base station, e.g., with separate antennas and/or a sectorized antenna.

I/O interface 208 couples the base station 200 to the Internet and/or other network nodes, e.g., other base stations, AAA server nodes, home agent nodes, routers, etc. The I/O interface 208 couples base station 200 to a backhaul network which couples various base stations together. Thus a wireless terminal coupled via a wireless connection to a first base station may have a communications session with another wireless terminal coupled by a wireless connection to a second base station.

Routines 218 include communications routines 222 and base station control routines 224. The communications routines 222 implement the various communications protocols used by the base station 200. The base station control routines 224 include a scheduling module 226, an assignment signal generation module 228, a dedicated control channel (DCCH) module 234, a transmitter control module 236, and a receiver control module 238.

Scheduling module 226, e.g., a scheduler, schedules wireless terminals using the base station to uplink and downlink traffic channel segments, e.g., based on scheduling protocol rules being used by base station 200. For example, rules may take into account priority level, latency consideration, type of information to be communicated, request, channel conditions, interference levels, power considerations, amount of information to be communicated, and/or other factors when determining which user gets assigned which traffic channel segment. Scheduling module 226 associates wireless terminals with assignment slots in the channel structure. An assignment slot in the downlink traffic control channel is associated with a corresponding traffic channel segment in the channel structure in accordance with information 248 and/or information 250. The association performed by scheduling module 226, on a per segment basis, includes assigning a wireless terminal On state identifier and a wtOnMask identifier with an assignment slot.

Assignment signal generation module 228 uses the information output from the scheduling module 226 and uses the assignment message framing information and DL/UL timing/frequency structure information 244 to generate assignment signals. Assignment signal generation module 228 includes a flash channel sub-module 230 and a regular channel sub-module 232. Flash channel sub-module 230 generates flash assignment signals to be conveyed over downlink traffic control channel flash segments, a flash assignment signal including an assignment message corresponding to a single traffic channel segment. Regular channel sub-module 232 generates regular assignment signals to be conveyed over downlink traffic control channel regular segments, a regular signal including an assignment message corresponding to up to three different traffic channel segments, each having a separate assignment.

DCCH module 234 controls the partitioning of the logical dedicated control channel tones between full-tone format tones and split tone format tones. The DCCH module 234 also decides which wireless terminals receive a DCCH tone in full-tone format and which receive a DCCH tone in split-tone format. DCCH module 234 generates state transition messages. At least some of the state transition messages are messages indicating a wireless terminal On state identifier and an assigned wtOnMask. For example, in an exemplary embodiment including 31 DCCH logical tones correspond to a base station attachment point and wherein in split tone format up to 3 wireless terminals may be assigned to use the same DCCH logical tone, the wireless terminal is assigned a 5 bit wireless terminal identifier and a three bit wtOnMask, a wtOnMask=111 indicates that the wireless terminal is to use the DCCH tone corresponding to the assigned On state identifier in full tone format, a wtOnMask=100, 010, or 001 indicates that the wireless terminal is to use the DCCH tone corresponding to the assigned On state identifier in split tone format. In addition the assigned wtOnMask is utilized in the assignment structure and assignment signaling. In an exemplary embodiment, one of four possibilities for an assigned wtOnMask (111, 001, 010, 100) for a given wireless terminal for a given connection is communicated via a 2 bit wide field in a state transition message directed to the wireless terminal.

Transmitter control module 236 controls operation of transmitter module 204, while receiver control module 238 controls operation of receiver module 202.

Data/information 240 includes system data/information 242, wireless terminal data/information 268, a plurality of sets of state transition message information (state transition message 1 information 256, . . . state transition message n information 258), a plurality of sets of flash assignment message information (flash assignment message 1 information 260, . . . , flash assignment message N information 262), and a plurality of sets of regular assignment message information (regular assignment message 1 information 264, . . . , regular assignment message N information 266).

System data 242 includes downlink/uplink timing frequency structure information 244 and assignment message framing information 246. Downlink/uplink timing/frequency structure information 244 includes recurring channel structure information, uplink and downlink tone block information, carrier frequency information, OFDM symbol timing information, information relating to grouping of OFDM symbols such as halfslots, slots, superslots, beaconslots, utlraslots, etc., and uplink and downlink tone hopping information. Downlink/uplink timing/frequency structure information 244 includes information relating the downlink traffic control channel to downlink traffic channel 248 and information relating the downlink traffic control channel to the uplink traffic channel 250. Information 248 includes wireless terminal On Mask information 252, e.g., information associating specific downlink traffic channel segments with specific assigned wtOnMasks and/or assigned wtOnMask Indicator values. Information 250 includes wireless terminal On Mask information 254, e.g., information associating specific downlink traffic channel segments with specific assigned wtOnMasks and/or assigned wtOnMask Indicator values.

Assignment message framing information 246 includes information pertaining to the various types of assignment messages, e.g., flash assignment using uplink framing format, regular assignment using uplink framing format, flash assignment using downlink framing format, regular assignment using downlink framing format.

WT data/information 268 includes a plurality of sets of wireless terminal data/information (wireless terminal 1 data/information 270, . . . , wireless terminal N data/information 272). Wireless terminal 1 data/information 270 includes an On state identifier 274, an assigned wireless terminal On Mask 276, a dedicated control channel mode 278, user/device/session/resource information 280, base station attachment point information 282, user data 284, and assigned traffic channel segment information 286.

On state identifier 276 is the On state identifier assigned by the DCCH module to WT1, e.g., a 5 bit value in the range of 1 ... 31. Assigned wtOnMask 276 is the wtOnMask assigned by DCCH module to WT1, e.g., a three bit value being one of 111, 100, 010, or 001. DCCH mode 278 is one of a DCCH full-tone format mode, e.g., corresponding to an assigned wtOnMask=111, and a DCCH split tone format mode, e.g., corresponding to any of assigned wtOnMask=100, 010, or 001. On state identifier 274 and assigned wtOnMask 276 are communicated via a state transition message, e.g., corresponding to one of (state transition message 1 info 256, . . . , state transition message n information 258).

User/device/session/resource information 280 includes identification information and user profile information corresponding to the user of WT1, WT1 device identification information, WT1 device type information, WT1 device parameter information, session information including peer node information, state information, routing information, session state information, and resource information such as uplink and/or downlink segments assigned to WT1. Base station attachment point information 282 includes information associating WT1 with a particular base station attachment point corresponding to a base station sector and uplink/downlink tone block pair. User data 284 includes, e.g., voice data, audio data, image data, text data, file data, etc. User data 284 includes user data to be communicated in downlink traffic channel segments to WT1, received user data intended to be communicated to WT1, and user data sourced from WT1 intended to be communicated to another peer node. Assigned traffic channel segment information 286 includes information identifying the uplink and/or downlink traffic channel segments that are assigned to WT1.

In some embodiments various modules and/or information in base station 200 are implemented on a per sector basis or per attachment point basis.

Figure 3:
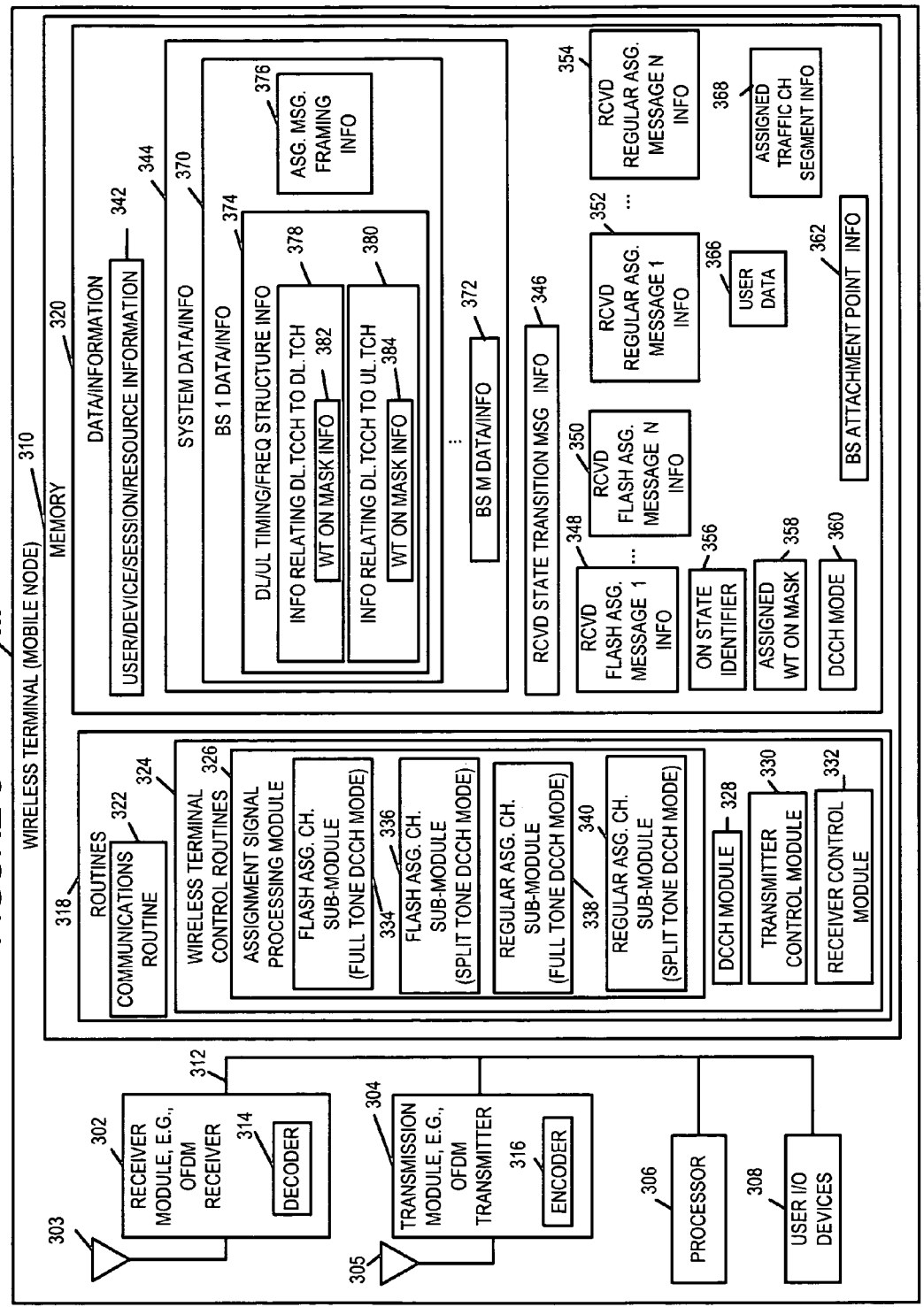
FIG. 3 is a drawing of an exemplary wireless terminal, e.g., mobile node, implemented in accordance with various embodiments.

FIG. 3 is a drawing of an exemplary wireless terminal 300, e.g., mobile node, implemented in accordance with various embodiments. Exemplary wireless terminal 300 may be any of the exemplary wireless terminals of exemplary system 100 of FIG. 1. Wireless terminal 300 includes a receiver module 302, a transmission module 304, a processor 306, user I/O devices 308, and memory 310 coupled together via a bus 312 via which the various elements can interchange data and information. Memory 310 includes routines 318 and data/information 320. The processor 306, e.g., a CPU, executes the routines 318 and uses the data/information 320 in memory 310 to control the operation of the wireless terminal 300 and implement methods.

Receiver module 302, e.g., an OFDM receiver, is coupled to receive antenna 303 via which the wireless terminal 300 receives downlink signals from base stations. The downlink signals include state transition messages, downlink traffic control channel segment signals, and downlink traffic channel segment signals. At least some of the state transition messages include information indicating a wireless terminal On identifier and a wtOnMask. Downlink traffic control channel segment signals including assignment messages corresponding to uplink and/or downlink traffic channel segments, at least some of said assignment messages including a wtOnMask indicator value. Downlink traffic channel segment signals convey user data, e.g., voice data, audio data, text data, image data, file data, etc. Receiver module 303 includes a decoder 314 which decodes at least some of the received downlink signals.

Transmission module 304, e.g., an OFDM transmitter, is coupled to transmit antenna 305 via which the wireless terminal transmits uplink signals to base stations. Transmitted uplink signals include requests for state transition, uplink control channel segment signals including uplink dedicated control channel segment signals, and uplink traffic channel segment signals. Transmission module 304 includes an encoder 316 which encodes at least some uplink signals prior to transmission. In some embodiments, the same antenna is used for the receiver module 302 and transmission module 304, e.g., in conjunction with a duplex module.

User I/O devices 308, e.g., microphone, keypad, keyboard, switches, camera, speaker, display, etc., allows a user of WT 300 to input user data, output user data, and control applications. In addition user I/O devices 308 allows the operator of WT 300 to control various functions of the WT 300, e.g., initiate a communications session.

Routines 318 include a communications routine 322 and wireless terminal control routines 324. The communications routine 322 implements the various communications protocols used by the wireless terminal 300. Wireless terminal control routines 324 include an assignment signal processing module 326, a dedicated control channel module 328, a transmitter control module 330, and a receiver control module 332.

Assignment signal processing module 326 processes received assignment signals and determines whether or not a received assignment is intended for WT 300. Assignment signal processing module 326 includes a flash assignment channel sub-module 334 for use when operating WT 300 in a full-tone format DCCH mode of operation, a flash assignment channel sub-module 336 for use when operating WT 300 in a split-tone format DCCH mode of operation, a regular assignment channel sub-module 338 for use when operating WT 300 in a full-tone format DCCH mode of operation, and a regular assignment channel sub-module 340 for use when operating WT 300 in a split-tone format DCCH mode of operation.

DCCH module 328 processes received state information messages. At least some of the received state transition messages are messages indicating an assigned wireless terminal is assigned a wireless terminal On state identifier and an assigned wtOnMask In one exemplary embodiment, the state transition message include a 5 bit wide field for the assigned wireless terminal identifier and a two bit wide field to convey one of four wtOnMask values. For example, in an exemplary embodiment including 31 DCCH logical tones correspond to a base station attachment point and wherein in split tone format up to 3 wireless terminals may be assigned to use the same DCCH logical tone, the wireless terminal is assigned a 5 bit wireless terminal identifier and a three bit wtOnMask, a wtOnMask=111 indicates that the wireless terminal is to use the DCCH tone corresponding to the assigned On state identifier in full tone format, a wtOnMask=100, 010, or 001 indicates that the wireless terminal is to use the DCCH tone corresponding to the assigned On state identifier in split tone format. In addition the assigned wtOnMask is utilized in the assignment structure and assignment signaling. DCCH module 328 determines the On state identifier 356 that WT 300 has been assigned to use, and the assigned WT On Mask 358 that the WT 300 has been assigned to use. From the received information, the WT 300 determines the DCCH mode 360, e.g., whether it is to operating a full-tone format DCCH mode of operation or a split-tone format DCCH mode of operation. The determination of DCCH module 328 controls whether assignment signal processing sub-module pair (334, 338) are used in the case of full-tone DCCH mode, or whether assignment signal processing sub-module pair (336, 340) are used in the case of split-tone format DCCH mode operation.

Transmitter control module 330 controls operation of transmission module 304, while receiver control module 332 controls operation of receiver module 302.

Data/information 320 includes user/device/session/resource information 342, system data/information 344, received state transition message information 346, a plurality of received flash assignment message information sets (received flash assignment message 1 information 348, . . . , received flash assignment message N information 350), a plurality of received regular assignment message information sets (received regular assignment message 1 information 352, . . . , received regular assignment message N information 354), an On state identifier 356, an assigned wireless terminal On Mask 358, a dedicated control channel mode 360, base station attachment point information 362, user data 366, and assigned traffic channel segment information 368.

User/device/session/resource information 342 includes identification information and user profile information corresponding to the user of WT 300, WT 300 device identification information, WT 300 device type information, WT 300 device parameter information, session information including peer node information, state information, routing information, session state information, and resource information such as uplink and/or downlink segments assigned to WT 300. Base station attachment point information 362 includes information associating WT 300 with a particular base station attachment point corresponding to a base station sector and uplink/downlink tone block pair. User data 366 includes, e.g., voice data, audio data, image data, text data, file data, etc. User data 366 includes user data received from downlink traffic channel segments assigned to WT 300, and user data that WT 300 intends to transmit to a base station via an uplink traffic channel segment assigned to WT 300, the data be subsequently communicated to another peer node of WT 300 in a communications session with WT 300. Assigned traffic channel segment information 368 includes information identifying the uplink and/or downlink traffic channel segments that are assigned to WT 300.

System data/information 344 includes a plurality of sets of base station data/information (base station 1 data/information 370, base station M data/information 372. Base station 1 data/information 370 includes downlink/uplink timing/frequency structure information 374 and assignment message framing information 376. Downlink/uplink timing/frequency structure information 374 includes recurring channel structure information, uplink and downlink tone block information, carrier frequency information, OFDM symbol timing information, information relating to grouping of OFDM symbols such as halfslots, slots, superslots, beaconslots, utlraslots, etc., and uplink and downlink tone hopping information. DL/UL timing/frequency structure information 374 also includes information relating the downlink traffic control channel to the downlink traffic channel 378 and information relating the downlink traffic control channel to the uplink traffic channel 380. Information 378 includes wireless terminal On Mask information 382, e.g., information associating specific downlink traffic channel segments with specific assigned wtOnMasks and/or assigned wtOnMask Indicator value. Information 380 includes wireless terminal On Mask information 384, e.g., information associating specific downlink traffic channel segments with specific assigned wtOnMasks and/or assigned wtOnMask Indicator values.

Assignment message framing information 376 includes information pertaining to the various types of assignment messages, e.g., flash assignment using uplink framing format, regular assignment using uplink framing format, flash assignment using downlink framing format, regular assignment using downlink framing format.

Received flash assignment message 1 information 348 includes information pertaining to a received flash assignment message, e.g., information input to and information recovered from one of modules 334 and 336. Received regular assignment message 1 information 352 includes information pertaining to a received regular assignment message, e.g., information input to and information recovered from one of modules 338 and 334.

Figure 4:
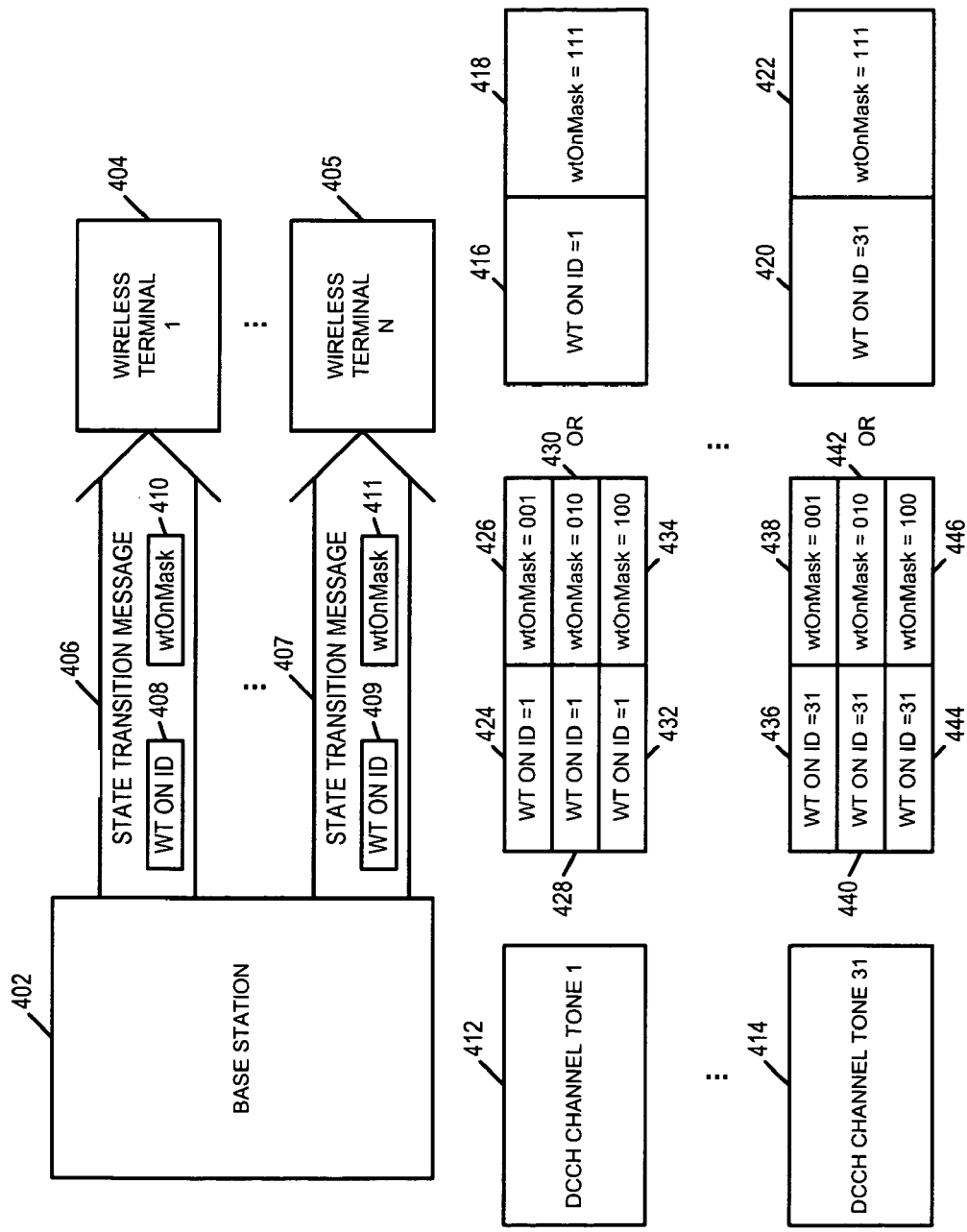
FIG. 4 illustrates exemplary state transition message signaling, dedicated control channel tones, the assignment of wireless terminal ON state identifier and wireless terminal On mask, in accordance with various embodiments.

FIG. 4 includes an exemplary base station 402 and a plurality of exemplary wireless terminals (WT 1 404, . . . WT N 405) implemented in accordance with various embodiments. Exemplary base station 402 may be any of the exemplary base stations of FIG. 1 and exemplary wireless terminals 404, 405 may be any of the exemplary wireless terminals of FIG. 1. Exemplary base station 402 transmits a state transition message 406 to wireless terminal 404, the state transition message 406 including a WT On identifier 408 and a wtOnMask 410. Exemplary base station 402 also transmits a state transition message 407 to wireless terminal 405, the state transition message 407 including a WT On identifier 409 and a wtOnMask 411.

Exemplary base station 402 uses a set of dedicated control channel tones (DCCH channel tone 1 412, . . . , DCCH channel tone 31 414), each tone associated with a WT ON identifier. In this exemplary embodiment, WTs can be commanded to operate in either a full-tone DCCH mode or a split tone DCCH mode. In the full tone DCCH mode, the WT receives a WT ON identifier in the range of (1 . . . 31) and a wtOnMask=111. For example, corresponding to DCCH channel tone 1 in full-tone format, the WT ON ID=1 416 and the wtOnMask=111 418. Similarly, corresponding to DCCH channel tone 31 in full-tone format, the WT ON ID=31 420 and the wtOnMask=111 422. In the split-tone DCCH mode, a WT receives a WT ON identifier in the range of (1 . . . 31) and a wtOnMask equal to one of: 001, 010, or 100. In the split tone mode the same logical DCCH channel tone can be associated with up to three different WTs. For example, corresponding to DCCH channel tone 1 in split tone format, a first WT can be sent a state transition message including WT ON ID=1 424 and the wtOnMask=001 426, a second WT can be sent a state transition message including WT ON ID=1 428 and the wtOnMask=010 430, and a third WT can be sent a state transition message including WT ON ID=1 432 and the wtOnMask=100 434. Similarly corresponding to DCCH channel tone 31 in split tone format, a first WT can be sent a state transition message including WT ON ID=31 436 and the wtOnMask=001 438, a second WT can be sent a state transition message including WT ON ID=31 440 and the wtOnMask=010 442, and a third WT can be sent a state transition message including WT ON ID=31 444 and the wtOnMask=100 446.

In some embodiments, in the state transition message the wireless terminal On identifier is communicated via a 5 bit wide field and the wireless terminal ON mask is communicated via a two bit wide field.

Figure 5:
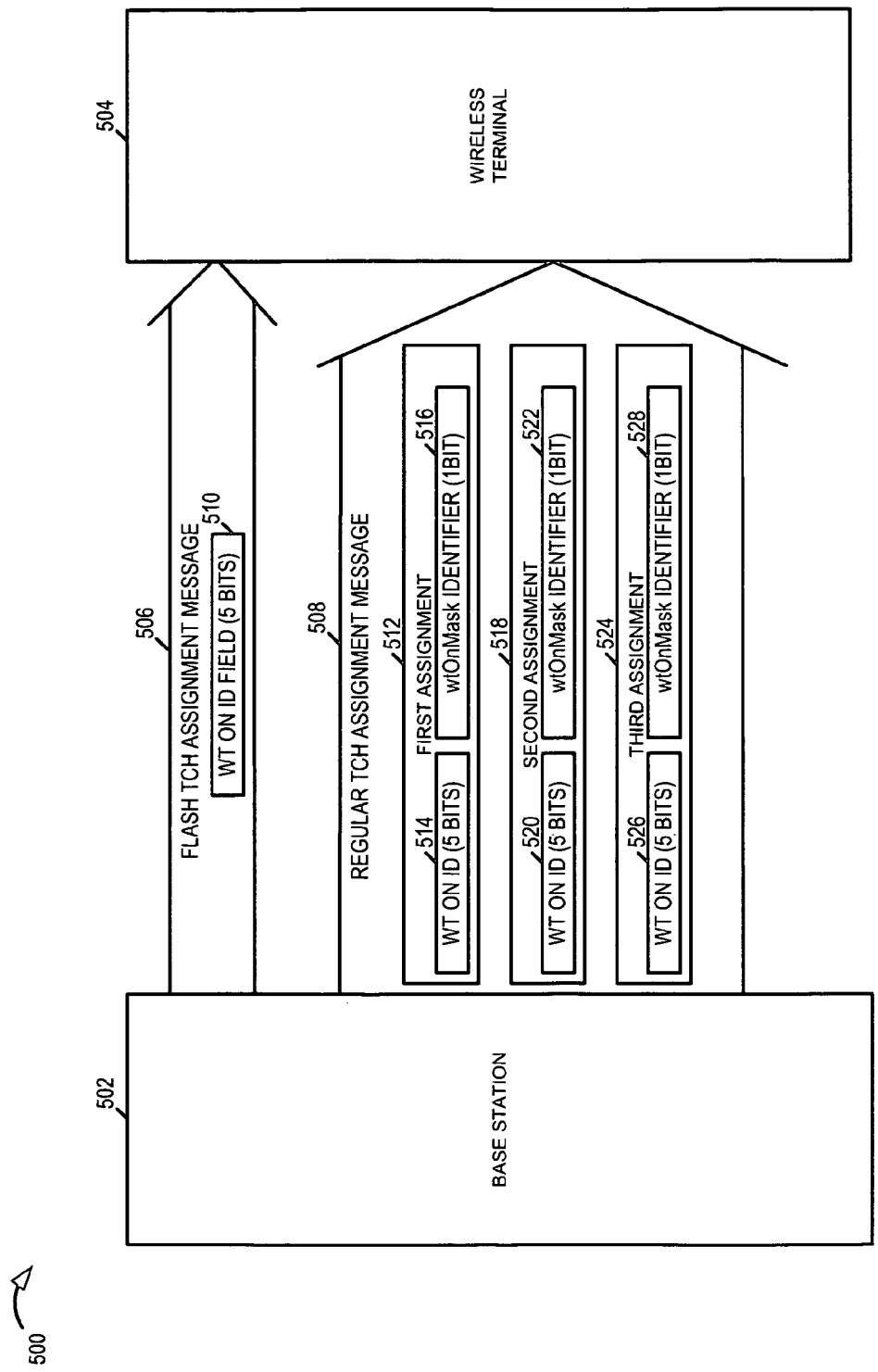
FIG. 5 illustrates exemplary flash assignment message signaling of a traffic channel segment and exemplary regular assignment message signaling including one or more assignments in accordance with various embodiments, each of the one or more assignments corresponding to a different traffic channel segment.

FIG. 5 is a drawing 500 including an exemplary base station 502 and an exemplary wireless terminal 504, implemented in accordance with various embodiments. Exemplary base station 502 may be any of the exemplary base stations of FIG. 1 and exemplary wireless terminal 504 may be any of the exemplary wireless terminals of FIG. 1. Exemplary base station 502 transmits flash traffic channel assignment messages 506 and regular traffic channel assignment messages 508. For example, in some embodiments the uplink and downlink traffic channel corresponding to base station 502 for a particular attachment point, e.g., sector and tone block, are partitioned into indexed segments in a repetitive pattern. In some embodiments there is a predetermined timing relationship between the assignments messages and the corresponding traffic channel segments which are assigned.

In this exemplary embodiment, each flash traffic channel assignment message 506 corresponds to one traffic channel segment and includes a WT On ID field of 5 bits 510 used to identify the WT to which the assignment is directed. The traffic channel segment being assigned by flash TCH assignment message 506 is one of an uplink traffic channel segment and a downlink traffic channel segment.

In this exemplary embodiment, each regular traffic channel segment assignment message 508 corresponds to three different traffic channel segments and includes first assignment information 512, second assignment information 518, and third assignment information 524. First assignment information 512 includes a WT On ID (5 bits) 514 and a wtOnMask Identifier (1 bit) 516. Second assignment information 518 includes a WT On ID (5 bits) 520 and a wtOnMask Identifier (1 bit) 522. Third assignment information 524 includes a WT On ID (5 bits) 526 and a wtOnMask Identifier (1 bit) 528. Each regular traffic channel assignment message is used to convey traffic channel segment assignments for one of the following: (i) two downlink traffic channel segments and one uplink traffic channel segments and (ii) one downlink traffic channel segment and two uplink traffic channel segments.

Figure 6B:
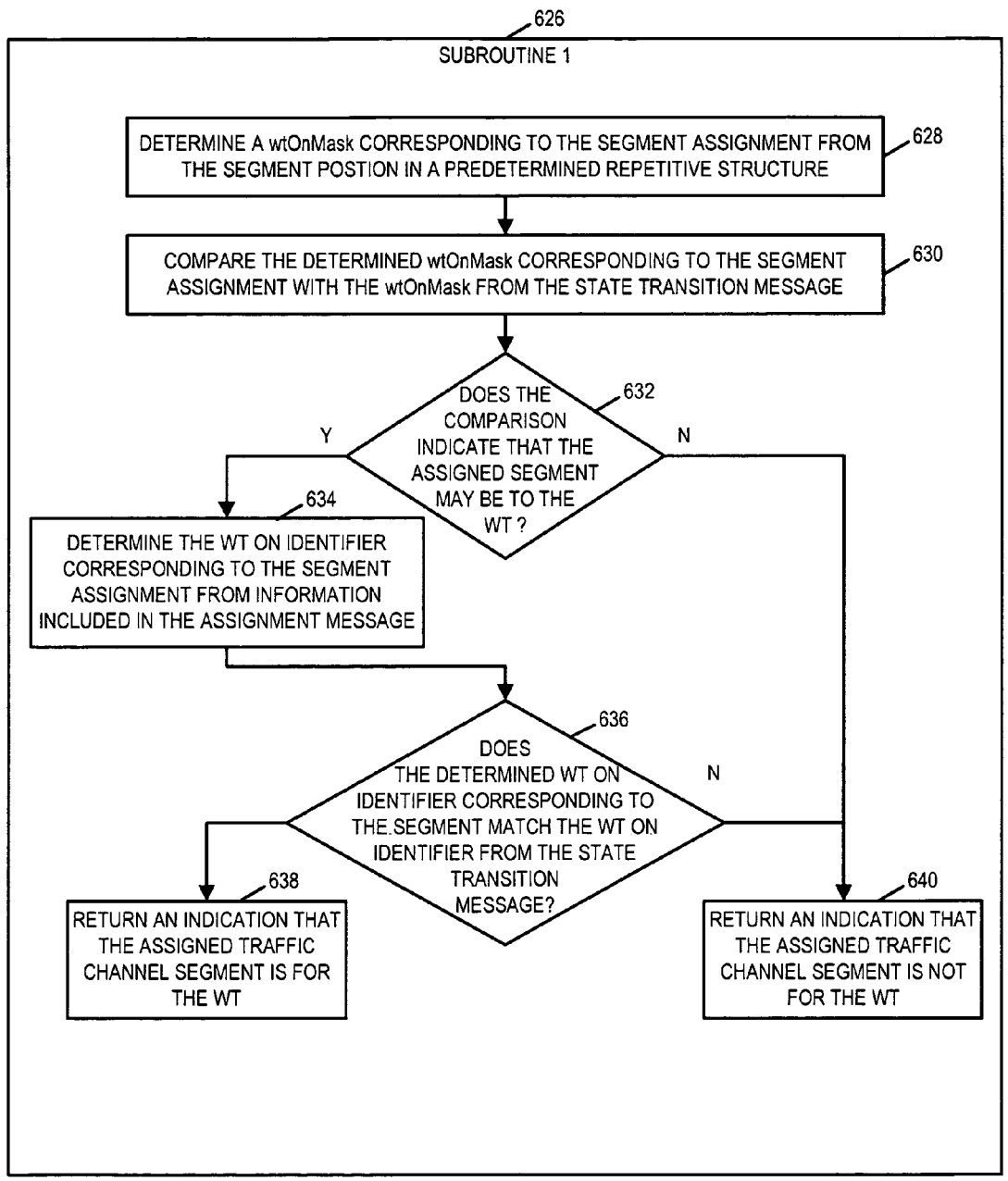
FIG. 6 comprising the combination of FIG. 6A, FIG. 6B.
FIG. 6C is a flowchart of an exemplary method of operating a wireless terminal in accordance with various embodiments.
Figure 6C:
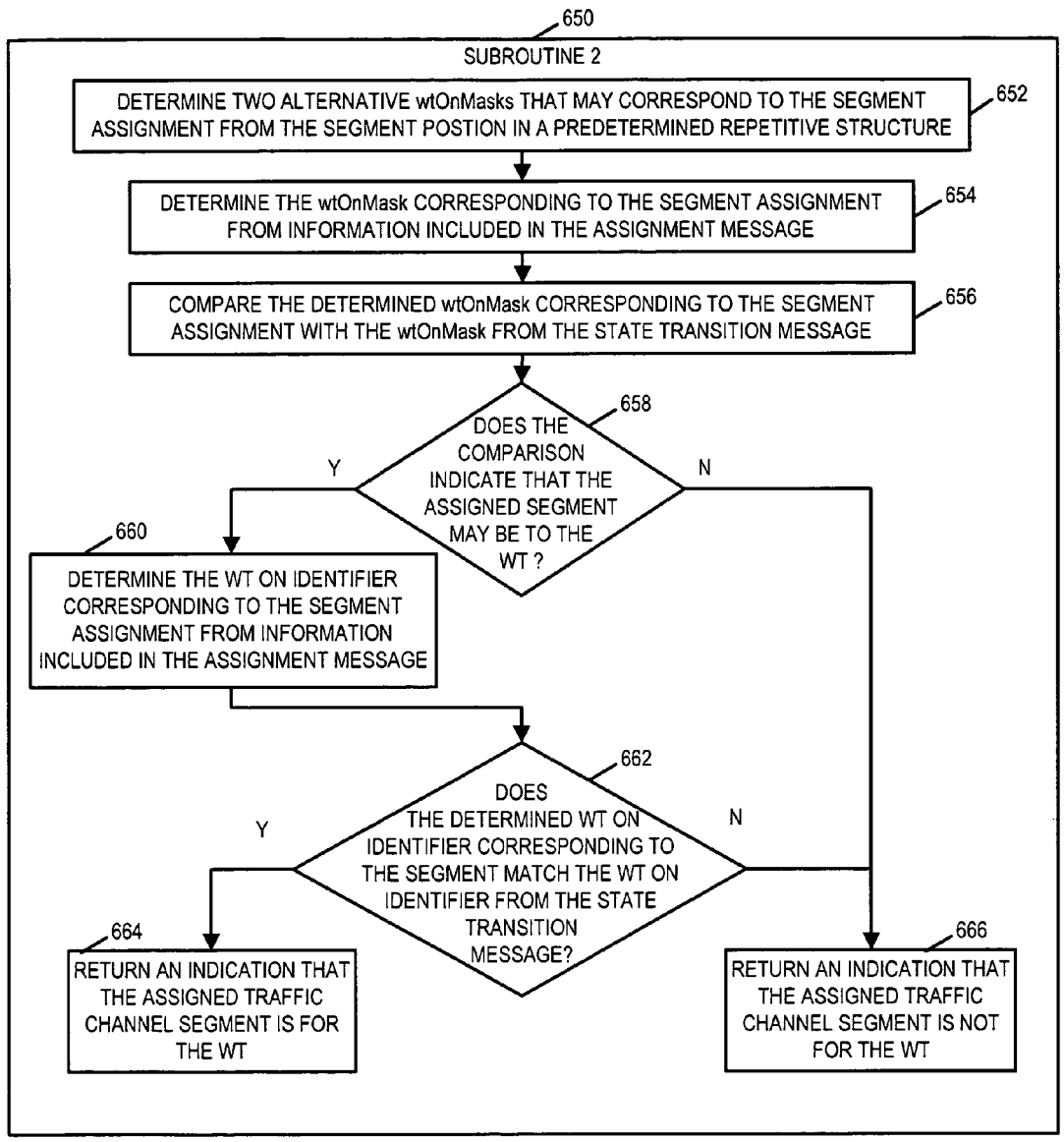

FIG. 6 comprising the combination of FIG. 6A, FIG. 6B, and FIG. 6C is a flowchart 600 of an exemplary method of operating a wireless terminal in accordance with various embodiments. Operation of the exemplary method starts in step 602 where the wireless terminal is powered up and initialized. Operation proceeds from step 602 to step 604, in which the wireless terminal receives a state transition message communicating a WT on identifier and a wtOnMask. For example, the status transition message is transmitted by a base station sector attachment point. For example, the base station sector attachment point uses a downlink tone block and a corresponding uplink tone block, and can support On state connections with a plurality of wireless terminals simultaneously. The WT On identifier is a base station assigned-identifier associating the WT with one of a plurality of dedicated control channel uplink logical tones. The wtOnMask, in the exemplary embodiment, is one of the following: 001, 010, 100, and 111. The patterns 001, 010, 100 signify that the WT is to be in a split-tone DCCH mode of operation. The pattern 111 signifies that the WT is to be in a full-tone DCCH mode.

Operation proceeds from step 604 to step 606, in which the WT checks whether or not the communicated wtOnMask of the received state transition message directed to the WT indicates that the WT need not evaluate wtONMask assignment signal information to determine if an assigned traffic channel segment is for the WT. For example, if the communicated wtOnMask of the received state transition message is 111 the WT is to be in full-tone DCCH mode and need not evaluate the wtOn Mask Assignment signal information to determine if an assignment is for the WT, and operation proceeds from step 606 to step 608. However, if the communicated wtOn-Mask of the state transition message is one of 001, 010, and 100 the WT is to be in split-tone DCCH mode and the WT evaluates the wtOn Mask Assignment signal information to determine if an assignment is for the WT, and operation proceeds from step 606 to step 616.

In step 608, the wireless terminal receives assignment messages. Operation proceeds from step 608 to step 610 for each received assignment message. In step 610 the wireless terminal proceeds along different paths depending upon whether the received assignment message is a flash assignment or a regular assignment. In some embodiments, flash assignments are communicated using a higher per tone transmission power on non-zero modulation symbols than used for regular assignment signals. In some embodiments, flash assignments include signaling using a combination of zero and non-zero modulation symbol values associated with the tone-symbols of a flash assignment channel segment, while a regular assignment channel segment uses non-zero modulation symbol values for each tone-symbol of the regular assignment channel segment. If the received assignment message is a flash assignment, operation proceeds from step 610 to subroutine 1 626, via go to step 612. If the received assignment message is a regular assignment, operation proceeds from step 610 to subroutine 2 650, via go to step 614, for each of a plurality of traffic channel assignments, e.g., three traffic channel assignments, included in the regular assignment message.

Exemplary subroutine 1 626, used for determining whether or not a flash assignment of a traffic channel segment corresponds to the WT, will now be described. In step 628, the WT determines a wtOnMask corresponding to the segment assignment from the segment position in a predetermined repetitive structure. For example, in one exemplary embodiment, the uplink traffic channel includes 28 indexed uplink traffic channel segments which are assigned via flash assignment signals. Considering the split-tone DCCH mode of operation, of those 28 uplink traffic channel segments, a first set of 10 uplink traffic channel segments may be individually assigned to a WT(s) with its wtOnMask set to 001, a second set of 9 uplink traffic channel segments may be individually assigned to a WT(s) with its wtOnMask set to 010, and a third set of 9 uplink traffic channel segments may be individually assigned to a WT(s) with its wtOnMask set to 100, the first, second, and third sets being non-overlapping sets.

For example, in one exemplary embodiment uplink traffic channel segments with index values (3, 13, 22, 30, 38, 47, 54, 61, 71, and 0) form the $1^{st}$ set; uplink traffic channel segments with index values (6, 16, 25, 32, 39, 49, 57, 66, and 74) form the $2^{nd}$ set; uplink traffic channel segments with index values (10, 19, 28, 35, 34, 52, 58, 68, and 76) form the $3^{rd}$ set. In a similar way, the set of downlink traffic channel segments, which are assigned via flash assignments are partitioned among the three wtOnMask values that may be assigned to a WT in a split-tone DCCH mode of operation.

Operation proceeds from step 628 to step 630. In step 630, the WT compares the determined wtOnMask corresponding to the segment assignment with the wtOnMask from the state transition message. Operation proceeds from step 630 to step 632. In step 632, the WT determines whether the comparison indicates that the assigned segment may be the WT. For example, in the exemplary embodiment, if the wtOnMask from the transition message matches the wtOnMask corresponding to the segment assignment, that indicates that the assigned segment may be to the WT and operation proceeds from step 632 to step 634; otherwise the WT, in split tone DCCH mode, is precluded from being assigned the segment and operation proceeds from step 632 to step 640.

In some embodiments, a WT in split tone DCCH mode may be assigned two portions of the DCCH channel tone, and such a WT may receive a wtOnMask=011, 101 or 110 In some such embodiments, a wtOnMask corresponding to the assignment signal is one of 001, 010, and 100, and the traffic channel segment may be assigned to the WT if a bit-wise logical AND of any of the same position bit in the wtOnMask of the transition message with the corresponding position bit in the wtOnMask representing the assignment message equals 1. For example, if the wtOnMask from the transition message is 011 and the wtOnMask representing the assignment message is 001 or 010, the WT may be assigned the segment; however, if the wtOnMask from the transition message is 011 and the wtOnMask representing the assignment message is 100, the WT is precluded from being assigned the segment.

In step 634, the WT determines the WT On identifier corresponding to the segment assignment from information included in the assignment message, e.g., from a 5 bit bit WT On ID field. Operation proceeds from step 634 to step 636. In step 636 the WT tests does the determined WT On identifier corresponding to the segment match the WT On identifier from the state transition message. If there is a match, the WT proceeds to step 638, where subroutine 1 returns an indication that the assigned traffic channel segment is for the WT. If there is not a match, operation proceeds to step 640. In step 640, subroutine 1 returns an indication that the assigned traffic channel segment is not for the WT.

Exemplary subroutine 2 650, used for determining whether or not a regular assignment of a traffic channel segment corresponds to the WT, will now be described. In step 652, the WT determines two alternative wtOnMasks that may correspond to the segment assignment from the segment position in a predetermined repetitive structure. For example, in one exemplary embodiment, the uplink traffic channel includes 49 indexed uplink traffic channel segments which are assigned via regular assignment signals. Considering the split-tone DCCH mode of operation, of those 49 uplink traffic channel segments, a first set of 17 uplink traffic channel segments may be individually assigned to a WT(s) with its wtOnMask set to 001 or 010, a second set of 16 uplink traffic channel segments may be individually assigned to a WT(s) with its wtOnMask set to 010 or 100, and a third set of 16 uplink traffic channel segments may be individually assigned to a WT(s) with its wtOnMask set to 100 or 001, the first, second, and third sets being non-overlapping sets. For example, in one exemplary embodiment uplink traffic channel segments with index values (4, 8, 12, 17, 21, 26, 31, 36, 40, 45, 50, 55, 60, 64, 69, 73, and 2) form the $1^{st}$ set; uplink traffic channel segments with index values (7, 11, 15, 20, 24, 29, 34, 41, 43, 48, 53, 59, 63, 67, 72, and 1) form the $2^{nd}$ set; uplink traffic channel segments with index values (5, 9, 14, 18, 23, 27, 33, 37, 42, 46, 51, 56, 62, 65, 70, and 75) form the $3^{rd}$ set. In a similar way, the set of downlink traffic channel segments, which are assigned via regular assignments are associated with wtOnMask values that may be assigned to a WT in a split-tone DCCH mode of operation.

Operation proceeds from step 652 to step 654. In step 654, the WT determines the wtOnMask corresponding to the segment assignment from information included in the assignment message. For example, a 1 bit wtOnMask Identifier bit included in the assignment message allows the base station to select between the two potential alternative wtOnMasks of step 652. For example, consider that the assignment corresponds to exemplary uplink traffic channel segment with index value=4 and the two alternative wtOnMasks of step 652 are 001 and 010. If the wtOnMask Identifier bit included in the assignment message is 0, that indicates that the assigned wtOnMask=001; however if the wtOnMask Identifier bit included in the assignment message is 1, that indicates that the assigned wtOnMask=010. In step 656, the WT compares the determined wtOnMask corresponding to the segment assignment with the wtOnMask from the state transition message. Operation proceeds from step 656 to step 658. In step 658, the WT determines whether the comparison indicates that the assigned segment may be the WT. For example, in the exemplary embodiment, if the wtOnMask from the transition message matches the wtOnMask corresponding to the segment assignment, that indicates that the assigned segment may be to the WT and operation proceeds from step 658 to step 660; otherwise the WT, in split tone DCCH mode, is precluded from being assigned the segment and operation proceeds from step 658 to step 666.

In some embodiments, a WT in split tone DCCH mode may be assigned two portions of the DCCH channel tone, and such a WT may receive a wtOnMask=011, 101 or 110. In some such embodiments, a wtOnMask indicated in the assignment signal is one of 001, 010, and 100, and the traffic channel segment may be assigned to the WT if a bit-wise logical AND of any of the same position bit in the wtOnMask of the transition message with the corresponding position bit in the wtOnMask of the assignment message equals 1. For example, if the wtOnMask from the transition message is 011 and the wtOnMask representing the assignment message is 001 or 010, the WT may be assigned the segment; however, if the wtOnMask from the transition message is 011 and the wtOnMask representing the assignment message is 100, the WT is precluded from being assigned the segment.

In step 660, the WT determines the WT On identifier corresponding to the segment assignment from information included in the assignment message, e.g., from a 5 bit WT On ID field. Operation proceeds from step 660 to step 662. In step 662 the WT tests does the determined WT On identifier corresponding to the segment match the WT On identifier from the state transition message. If there is a match, the WT proceeds to step 664, where subroutine 2 returns an indication that the assigned traffic channel segment is for the WT. If there is not a match, operation proceeds to step 666. In step 666, subroutine 2 returns an indication that the assigned traffic channel segment is not for the WT.

Returning to step 616, in step 616 the WT receives assignment messages. For each traffic channel assignment included in the assignment message, operation proceeds from step 616 to step 618. In step 618, the WT determines the WT On identifier corresponding to the segment assignment from information included in the assignment message, e.g., from a 5 bit WT On ID field in the assignment message. Operation proceeds from step 618 to step 620. In step 620, the WT determines whether or not the determined WT On identifier corresponding to the segment matches the WT On identifier from the state transition message. If there is a match, the WT proceeds to step 620 to step 622, where the WT recognizes that the assigned traffic channel segment is for the WT. If there is not a match, operation proceeds to step 624. In step 624, the wireless terminal recognizes that the assigned traffic channel segment is not for the WT.

Figure 7:
FIG. 7 is a table of an exemplary specification of downlink traffic channel (DL.TCH) assignment in an exemplary downlink traffic control channel (DL.TCCH), in accordance with various embodiments.

FIG. 7 is a table 700 of an exemplary specification of downlink traffic channel (DL.TCH) assignment in an exemplary downlink traffic control channel (DL.TCCH). The information of table 700 may correspond to information relating DL.TCCH to DL.TCH 378 in wireless terminal 300 and information relating DL.TCCH to DL.TCH 248 in base station 200. In Table 700 if an assignment field does not exist in the framing format, the corresponding entry is marked with "N/A". An assigned DL.TCH segment is marked via shading, if it starts in the superslot that immediately follows the superslot of the assigning DL.TCCH segment.

First column 702 "row index" specifies a row index. For a given row index, a row specifies the indexes of the assigned DL.TCH segments and the information about the wtOnMask of the assigned DL.TCH segment. Second column 704 "framing format" specifies the framing format used in the downlink traffic control channel flash (DL.TCCH.FLASH) and downlink traffic control channel regular (DL.TCCH.REGULAR) segments for a given row index.

Third column 706 "index of assigned DL.TCH segment in DL.TCCH.FLASH" specifies the index of the DL.TCH segment assigned by the DL.TCCH.FLASH segment.

Fourth column 708 "assigned wtOnMask in DL.TCCH.FLASH" specifies the assigned wtOnMask to the DL.TCH segment in third column 706. "s" denotes the segment index of the DL.TCCH.FLASH and the DL.TCCH.REGULAR segments in a given slot. In some embodiments s is an integer value in the range 0:63.

Fifth column 710 "index of assigned DL.TCH segment in DL.TCCH.REGULAR DL.TCH assignment 0" specifies the index of the DL.TCH segment assigned by the DL.TCH.assignment 0" field of the DL.TCCH.REGULAR segment. Sixth column 712 "assigned wtOnMask in DL.TCCH.REGULAR DL.TCH assignment 0" specifies the two possible wtOnMasks to be used in the DL.TCH segment specified in fifth column 710. The "assigned wtOnMask" subfield of the "DL.TCH assignment field of the DL.TCCH.REGULAR segment specifies, which one of the two possible wtOnMasks is actually assigned; if the "ON MASK" subfield is 0, the first one in sixth column 712 is the assigned wtOnMask to the DL.TCH segment; if the "ON MASK" subfield is 1, the second one in sixth column 712 is the assigned OnMask to the DL.TCH segment.

Seventh column 714 "index of assigned DL.TCH segment in DL.TCCH.REGULAR DL.TCH assignment 1" specifies the index of DL.TCH segment assigned by the "DL.TCH assignment 1" field of the DL.TCCH.REGULAR segment. Eighth column 716 "assigned wtOnMask in DL.TCCH.REGULAR DL.TCH assignment 1" specified the two possible wtOnMasks to be used in the DL.TCH segment specified in seventh column 714. The "assigned wtOnMask" subfield of the "DL.TCH assignment field of the DL.TCCH.REGULAR segment specifies which one of the two possible wtOnMasks is actually assigned; if the "ON MASK" subfield is 0, the first one in eighth column 716 is the assigned wtOnMask to the DL.TCH segment; if the "ON MASK" subfield is 1, the second one in eight column 716 is the assigned OnMask to the DL.TCH segment.

Examples illustrating the use of table 700 will now be described. Consider s=6. Note that mod(s,8)=6, where s=6. Therefore check the row index=6. There is no DL.TCH assignment in the DL.TCCH.FLASH segment. The "DL.TCH assignment 0" field of the DL.TCCH.REGULAR segment specifies the assignment for DL.TCH segment [14] and either 0b001 or 0b010 can be the assigned wtOnMask to DL.TCH segment [14] depending on the "ON MASK" subfield of the "DL.TCH assignment 0" field. If the "ON MASK" subfield is 0, then the assigned wtOnMask is 0b001. Thus, the wtOnMask of the assigned WT can be either 0b001 or 0b111. If the "ON MASK" subfield is 1, then the assigned wtOnMask is 0b010. Thus, the wtOnMask of the assigned WT can be either 0b010 or 0b111. The "DL.TCH assignment 1" field of the DL.TCCH.REGULAR segment specifies the assignment for DL.TCH segment [15] and either 0b100 or 0b001 can be the assigned wtOnMask to DL.TCH segment [15] depending on the "ON MASK" subfield of the "DL.TCH assignment 1" field. If the "ON MASK" subfield is 0, then the assigned wtOnMask is 0b100. Thus, the wtOnMask of the assigned WT can be either 0b100 or 0b111. If the "ON MASK" subfield is 1, then the assigned wtOnMask is 0b001. Thus, the wtOnMask of the assigned WT can be either 0b001 or 0b111.

Now consider s=15. Note that mod(s,8)=7, where s=15. Therefore check the row index=7. DL.TCCH.FLASH and DL.TCCH.REGULAR segment [15] uses the downlink framing format. The "DL.TCH assignment 0" field of the DL.TCCH.FLASH segment specifies the assignment for DL.TCH [1] and the wtOnMask and the wtOnMask of the WT to be assigned to DL.TCH segment [1] is 1<<mod ((15−1)/2,3)=0b010, where the operator "<<" represents a bit-wise shift left. The "DL.TCH assignment 0" field of the DL.TCCH.REGULAR segment specifies the assignment for DL.TCH segment [0] and either 0b010 or 0b100 is the wtOnMask of the WT to be assigned to DL.TCH[0] depending on the "ON MASK" subfield of the "DL.TCH assignment 0" field. If the "ON MASK" subfield is 0, then the assigned wtOnMask is 0b010. Thus, the wtOnMask of the assigned WT can be either 0b010 or 0b111. If the "ON MASK" subfield is 1, then the assigned wtOnMask is 0b100. Thus, the wtOnMask of the assigned WT can be either 0b100 or 0b111. There is no "DL.TCH assignment 1" field. Note that the two DL.TCH segments both start in the superslot that immediately follows the superslot of the DL.TCCH segment.

Figures 8, 8A:
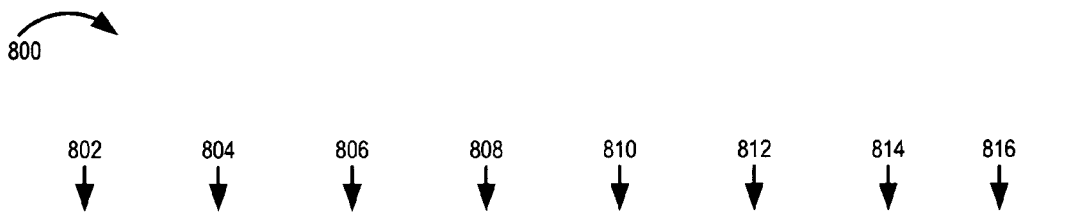
FIG. 8 comprising the combination of FIG. 8A, FIG. 8B

FIG. 8 comprising the combination of FIG. 8A, FIG. 8B and FIG. 8C is a table 800 of an exemplary specification of uplink traffic channel (UL.TCH) assignment in an exemplary downlink traffic control channel (DL.TCCH). The information of table 800 may correspond to information relating DL.TCCH to UL.TCH 380 in wireless terminal 300 and information relating DL.TCCH to UL.TCH 250 in base station 200. Table 800 shows the assignment of UL.TCH in a beaconslot. The pattern repeats every beaconslot. For s=0:63, the UL.TCH segments assigned by the DL.TCCH.FLASH segment [s] and DL.TCCH.REGULAR segment [s] are specified in the rows whose row index is equal to mod(s-floor (BSS_DLUL_OFFSET/14), 64), where BSS_DLUL_OFFSET is an non-negative integer value associated with the base station sector specifying how much time a downlink superslot leads its concurrent uplink superslot as measured at the base station sector.

In table 800, if the UL.TCH segment corresponding to an assignment field is absent, the corresponding entry is marked with an "x"; if an assignment field itself does not exist in the framing format, the corresponding entry is marked with an "N/A".

First column 802 "row index" specifies a row index. For a given row index, a row specifies the indexes of the assigned UL.TCH segments and the information about the wtOnMask of the WT assigned to a corresponding UL.TCH segment. Second column 804 "framing format" specifies the framing format used in the DL.TCCH.FLASH and DL.TCCH.REGULAR segments for a given row index.

Third column 806 "index of assigned UL.TCH segment in DL.TCCH.FLASH" specifies the index of the UL.TCH segment assigned by the DL.TCCH.FLASH segment. Fourth column 808 "assigned wtOnMask in DL.TCCH.FLASH" specifies the assigned wtOnMask to the UL.TCH segment specified in third column 806.

Fifth column 810 "index of assigned UL.TCH segment in DL.TCCH.REGULAR UL.TCH assignment 0" specifies the index of UL.TCH segment assigned by the "UL.TCH assignment 0" field of the DL.TCCH.REGULAR segment. Sixth column 812 "assigned wtOnMask in DL.TCCH.REGULAR UL.TCH assignment 0" specifies two possible wtOnMasks to be used in the UL.TCH specified in fifth column 810. The "ON MASK" subfield of the "UL.TCH assignment 0" field of the DL.TCCH.REGULAR segment specifies which of the two wtOnMasks is actually assigned; if the "ON MASK" subfield is 0, the first one in sixth column 812 is the wtOnMask of the WT assigned to the UL.TCH segment; if the "ON MASK" subfield is 1, the second one in column 812 is the wtOnMask of the WT assigned to the UL.TCH segment.

Seventh column 814 "index of assigned UL.TCH segment in DL.TCCH.REGULAR UL.TCH assignment 1" specifies the index of UL.TCH segment assigned by the "UL.TCH assignment 1" field of the downlink TCCH.REGULAR segment. Eighth column 816 "assigned wtOnMask in DL.TCCH.REGULAR UL.TCH assignment 1" specifies the two possible wtONMasks to be used in the UL.TCH segment specified in seventh column 814. The "ON MASK" subfield of the "UL.TCH assignment 1" field of the DL.TCCH.REGULAR segment specifies which of the two wtOnMasks is actually assigned; if the "ON MASK" subfield is 0, the first one in eighth column 816 is the wtOnMask of the WT assigned to the UL.TCH segment; if the "ON MASK" subfield is 1, the second one in column 6 is the wtOnMask of the WT assigned to the UL.TCH segment.

Examples illustrating the use of table 800 will now be described. Consider s=63 and BSS_DLUL_OFFSET=33. Note that under those conditions, mod(s-floor(BSS_DLUL_OFFSET/14),64)=61. Therefore check the row of row index 61. DL.TCCH.FLASH and DL.TCCH.REGULAR segment [63] uses the downlink framing format. There is no UL.TCH in the DL.TCCH.FLASH segment. The UL.TCH segments corresponding to the "UL.TCH assignment 0" and "UL.TCH assignment 1" fields of the DL.TCCH.REGULAR segment are both absent. The corresponding "ON MASK" subfields are set to N/A.

Now consider s=0, and BSS_DLUL_OFFSET=33. Note that under those conditions, where mod(s-floor(BSS_DLUL_OFFSET/14),64)=62. Therefore check the row of row index 62. DL.TCCH.FLASH and DL.TCCH.REGULAR segment [0] uses the uplink framing format. The "UL.TCH assignment 0" field of the DL.TCCH.FLASH segment specifies the assignment for UL.TCH segment [0] and the assigned wtOnMask to UL.TCH segment [0] is 0b001. Thus the wtOnMask of the assigned WT can be either 0b001 or 0b111. The UL.TCH segment corresponding to "UL.TCH assignment 0" field of the DL.TCCH.REGULAR segment is absent. There is no "UL.TCH assignment 1" field. Note that the assigned UL.TCCH.REGULAR segment is absent. There is no "UL.TCCH assignment 1" field. Note that the assigned UL.TCH segment [0] starts in the same beaconslot as the assigning DL.TCCH segment [0].

Now consider s=62, and BSS_DLUL_OFFSET=33. Note that under those conditions, where mod(s-floor(BSS_DLUL_OFFSET/14),64)=60. Therefore check the row of row index 60. DL.TCCH.FLASH and DL.TCCH.REGULAR segment [62] uses the uplink framing format. The "UL.TCH assignment 0" field of the DL.TCCH.FLASH segment specifies the assignment for UL.TCH segment [76] and the assigned wtOnMask to UL.TCH segment [0] is 0b100. Thus the wtOnMask of the assigned WT can be either 0b100 or 0b111. The "UL.TCH assignment 0" field of the DL.TCCH.REGULAR segment specifies the assignment for UL.TCH segment [75] and either 0b100 or 0b001 is the assigned wtOnMask to UL.TCH segment [75] depending on the "ON MASK" subfield of the "UL.TCH assignment 0" field. If the "ON MASK" subfield is 0, then the assigned wtOnMask is 0b100. Thus the wtONMask of the assigned WT can be either 0b100 or 0b111. If the "ON MASK" subfield is 1, then the assigned wtOnMask is 0b001. Thus the wtOnMask of the assigned WT can be either 0b001 or 0b111. There is no "UL.TCH assignment 1" field. Note that the two assigned UL.TCH segments both start in the same beaconslot as the assigning DL.TCCH segment.

The structure of an exemplary embodiment will be described. If uplink framing format is used, a DL.TCCH.FLASH channel segment conveys at most one uplink traffic channel assignment and no downlink traffic channel assignments. If uplink framing format is used, a DL.TCCH.REGULAR channel segment conveys at most two downlink traffic channel assignment and at most one uplink traffic channel assignment.

If downlink framing format is used, a DL.TCCH.FLASH channel segment conveys at most one downlink traffic channel assignment and no downlink traffic channel assignments. If downlink framing format is used, a DL.TCCH.REGULAR channel segment conveys at most one downlink traffic channel assignment and at most two uplink traffic channel assignment.

In this exemplary embodiment, within a beaconslot there are 64 flash assignment segments and 64 regular assignment segments, each assignment segment has a fixed mapping to one or more corresponding traffic channel segments in the structure, e.g., in accordance with the tables 700 and 800.

Each flash traffic channel assignment is associated with a fixed one of the wtOnMasks corresponding to operation in DCCH split tone mode. Each regular traffic channel assignment can be associated with either of two wtOnMasks corresponding to operation in DCCH split tone mode. The regular assignment message corresponding to a regular traffic channel assignment includes a single bit OnMask indicator value to distinguish between the two possibilities. A wireless terminal operating in split tone mode needs to determine that both the On state identifier and the indicator mask bit indicate that the assignment is directed to itself.

A WT operating in full-tone mode need not use the OnMask indicator in determining that an assignment is directed to itself, the decoding of the ON state identifier included in the message is sufficient.

Figure 9:
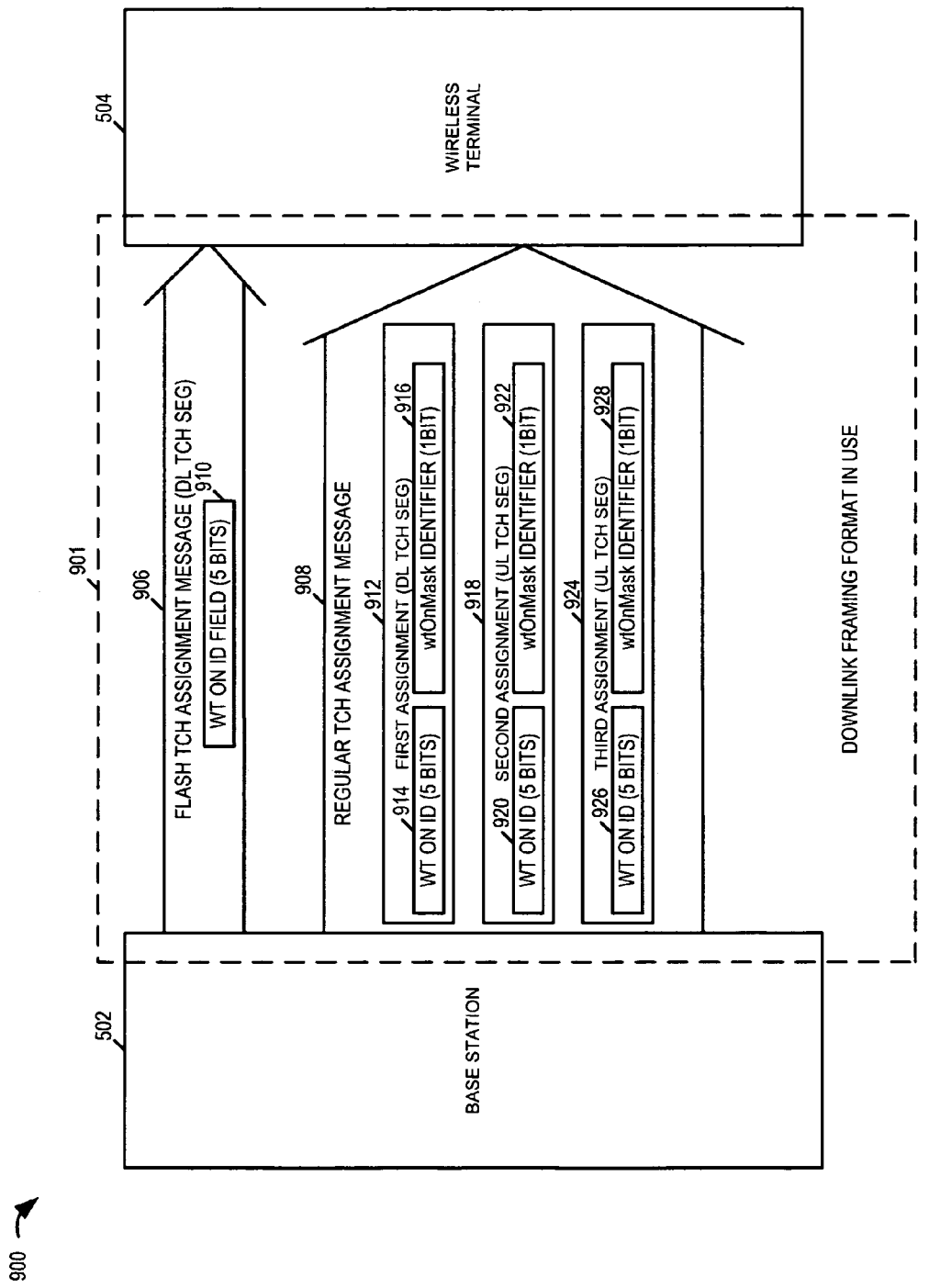
FIG. 9 is a drawing illustrating the exemplary base station and exemplary wireless terminal of FIG. 5 while downlink framing format is in use for the assignment signaling.

FIG. 9 is a drawing 900 illustrating the exemplary base station 502 and exemplary wireless terminal 504 of FIG. 5 while downlink framing format is in use, as indicated by dashed box 901, for the assignment signaling. Exemplary flash assignment message 906 for the traffic channel conveys an assignment for a corresponding downlink traffic channel segment. Exemplary flash assignment message 906 includes a 5 bit wireless terminal ON identifier value in an On identifier field of 5 bits 910. Exemplary regular assignment message 908 for the traffic channel includes a first assignment 912 for a corresponding downlink traffic channel segment, a second assignment 918 for a corresponding uplink traffic channel segment, and a third assignment for a corresponding uplink traffic channel segment 924. Each assignment (first 912, second 918, third 924) includes a 5 bit wireless terminal On identifier value of 5 bits in a On Identifier field of 5 bits (914, 920, 926) and a one bit wtOnMask Identifier value in an wtOn Mask Identifier field of one bit (916, 922, 928).

In some embodiments, for at least some of intervals in a recurring structure where downlink framing format is used, the regular assignment message 908 includes assignment opportunities for a predetermined subset of the first, second, and third assignments, e.g., as illustrated in the exemplary structure of Tables 700 and 800.

Figure 10:
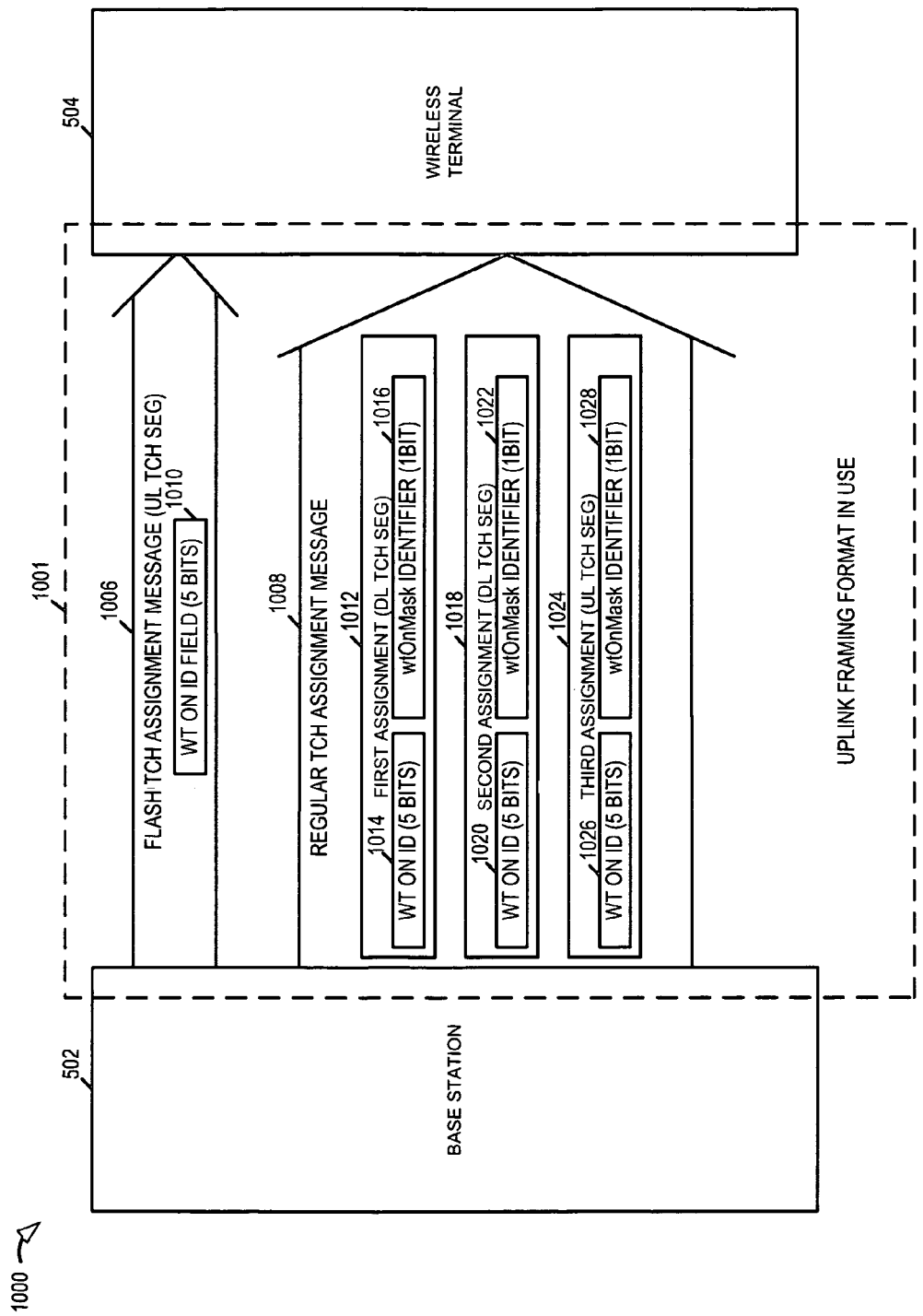
FIG. 10 is a drawing illustrating the exemplary base station and exemplary wireless terminal of FIG. 5 while uplink framing format is in use for the assignment signaling.

FIG. 10 is a drawing 1000 illustrating the exemplary base station 502 and exemplary wireless terminal 504 of FIG. 5 while uplink framing format is in use, as indicated by dashed box 1001, for the assignment signaling. Exemplary flash assignment message 1006 for the traffic channel conveys an assignment for a corresponding uplink traffic channel segment. Exemplary flash assignment message 1006 includes a 5 bit wireless terminal ON identifier value in an On identifier field of 5 bits 1010. Exemplary regular assignment message 1008 for the traffic channel includes a first assignment 1012 for a corresponding downlink traffic channel segment, a second assignment 1018 for a corresponding downlink traffic channel segment, and a third assignment for a corresponding uplink traffic channel segment 1024. Each assignment (first 1012, second 1018, third 1024) includes a 5 bit wireless terminal On identifier value of 5 bits in a On Identifier field of 5 bits (1014, 1020, 1026) and a one bit wtOnMask Identifier value in an wtOn Mask Identifier field of one bit (1016, 1022, 1028).

In some embodiments, for at least some of intervals in a recurring structure where uplink framing format is used, the regular assignment message 1008 includes assignment opportunities for a predetermined subset of the first, second, and third assignments, e.g., as illustrated in the exemplary structure of Tables 700 and 800.

Figures 11, 11A:
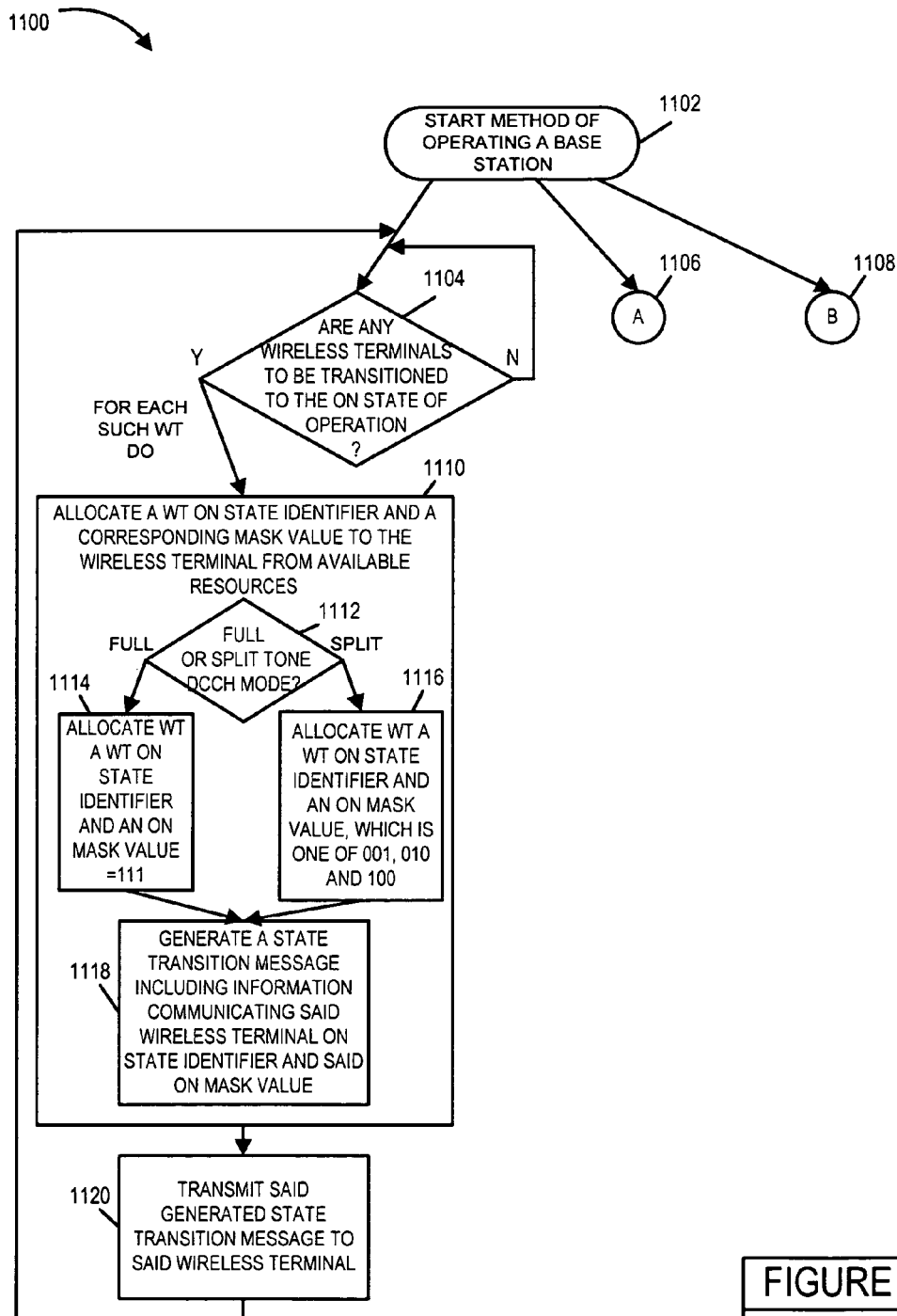
FIG. 11 comprising the combination of FIG. 11A, FIG. 11B
Figure 11B:
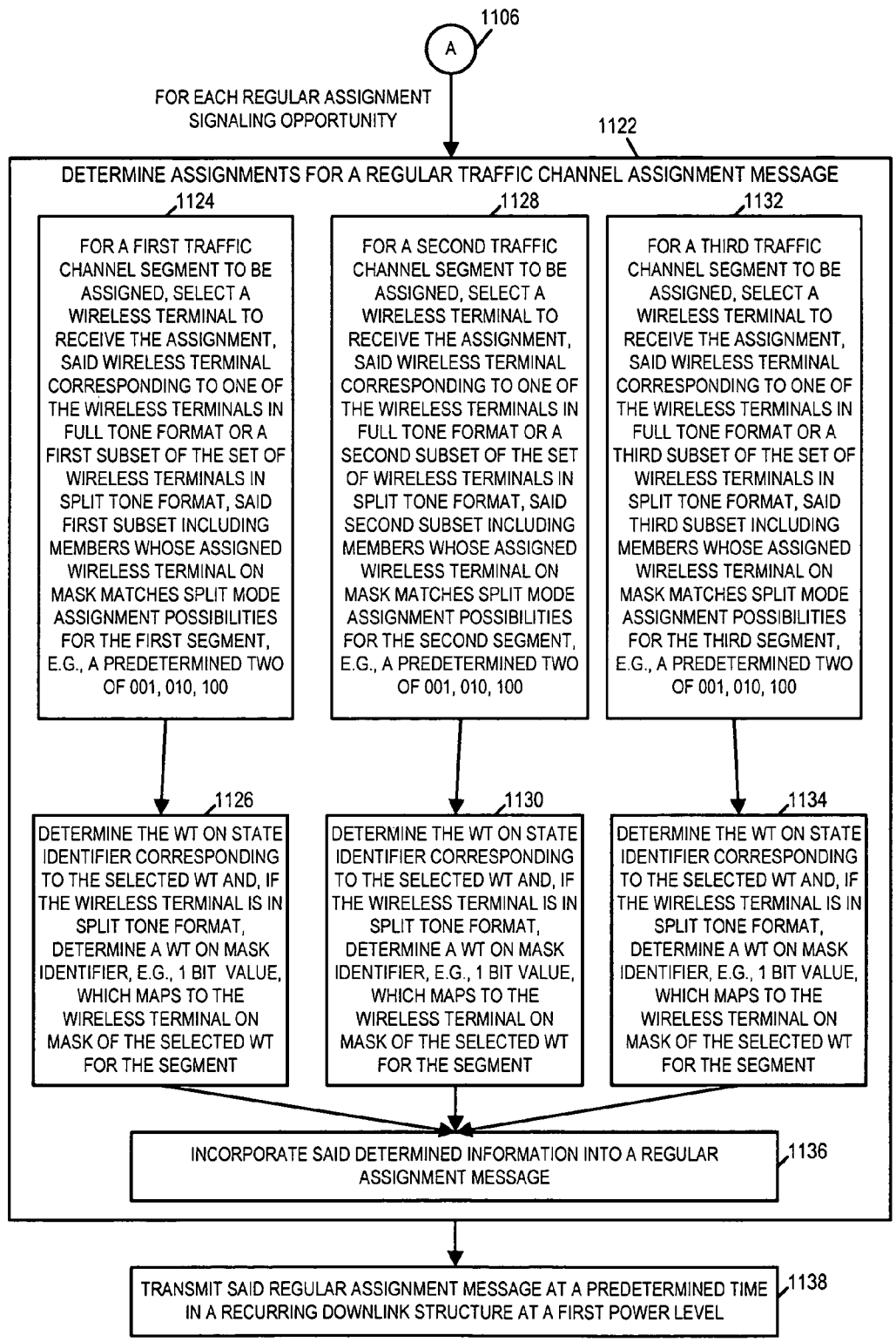
FIG. 11C is a drawing of a flowchart of an exemplary method of operating a base station in accordance with various embodiments.
Figure 11C:
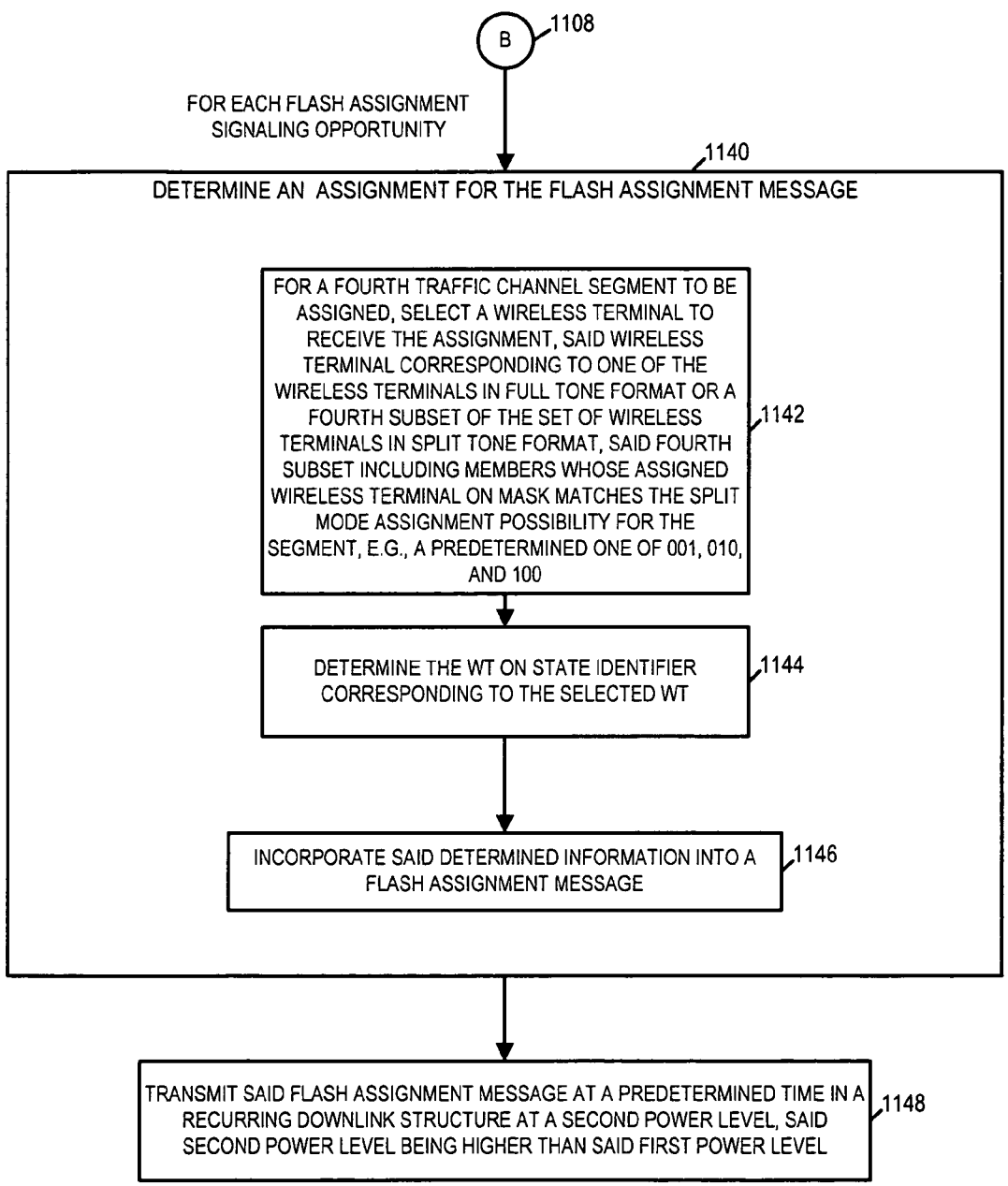

FIG. 11 is a drawing of a flowchart 1100 of an exemplary method of operating a base station in accordance with various embodiments. The exemplary method starts in step 1102, where the base station is powered on and initialized. Operation proceeds from start step 1102 to step 1104, step 1122 via connecting node A 1106, and step 1140 via connecting node B 1108.

In step 1104, the base station determines whether there are any wireless terminals to be transitioned to the On state of operation. For each such wireless terminal, operation proceeds from step 1104 to step 1110. In step 1110, the base station allocates a wireless terminal On state identifier, e.g., a 5 bit identifier, and a corresponding On state Mask value to the wireless terminal from available resources. Step 1110 includes steps 1112, 1114, 1116, and 1118. In step 1112, the base station determines whether the wireless terminal is to operate in full tone dedicated control channel format mode or split tone dedicated control channel format mode. If the wireless terminal is to be operated in full-tone mode, operation proceeds from step 1112 to step 1114; if the wireless terminal is to be operated in split tone format mode operation proceeds from step 1112 to step 1116. In step 1114, the base station allocates the wireless terminal an On state identifier and an On Mask value=111. In the full tone format mode, the wireless terminal's base station assigned On state identifier is not shared with other wireless terminals with respect to the base station attachment point. In step 1116, the base station allocates the wireless terminal a wireless terminal On state identifier and an On mask value which is one of: 001, 010, and 100. In the split tone format mode, the wireless terminal's base station assigned On state identifier may be and sometimes is shared with other wireless terminals with respect to the base station attachment point, e.g., three different wireless terminals in split tone mode may each be assigned the same On state identifier, but may be assigned different On masks. Operation proceeds from step 1114 or step 1116 to step 1118. In step 1118, the base station generates a state transition message including information communicating said wireless terminal On state identifier and said On state Mask value.

Operation proceeds from step 1110 to step 1120. In step 1120, the base station transmits said generated state transition message to said wireless terminal. Operation proceeds from step 1120 to step 1104.

For each regular assignment signaling opportunity, operation proceeds via connecting node A 1106 to step 1122. In step 1122, the base station determines assignments for a regular traffic channel assignment message. Step 1122 includes steps 1124, 1126, 1128, 1130, 1132, 1134, and 1136.

In step 1124, for a first traffic channel segment to be assigned, the base station selects a wireless terminal to receive the assignment, said wireless terminal corresponding to one of the wireless terminals in full tone format or a first subset of the set of wireless terminals in split tone format, said first subset including members whose assigned wireless terminal On Mask matches split tone assignment possibilities for the segment, e.g., a predetermined two of 001, 010, and 100. Operation proceeds from step 1124 to step 1126. In step 1126, the base station determines the wireless terminal ON state identifier corresponding to the selected wireless terminal of step 1124, and if the selected wireless terminal is in split tone format, the base station determines a wireless terminal On Mask identifier, e.g., a 1 bit value which maps to the wireless terminal On Mask of the selected wireless terminal for the segment.

In step 1128, for a second traffic channel segment to be assigned, the base station selects a wireless terminal to receive the assignment, said wireless terminal corresponding to one of the wireless terminals in full tone format or a second subset of the set of wireless terminals in split tone format, said second subset including members whose assigned wireless terminal On Mask matches split tone assignment possibilities for the segment, e.g., a predetermined two of 001, 010, and 100. Operation proceeds from step 1128 to step 1130. In step 1130, the base station determines the wireless terminal On state identifier corresponding to the selected wireless terminal of step 1128, and if the selected wireless terminal is in split tone format, the base station determines a wireless terminal On Mask identifier, e.g., a 1 bit value which maps to the wireless terminal On Mask of the selected wireless terminal for the segment.

In step 1132, for a third traffic channel segment to be assigned, the base station selects a wireless terminal to receive the assignment, said wireless terminal corresponding to one of the wireless terminals in full tone format or a third subset of the set of wireless terminals in split tone format, said third subset including members whose assigned wireless terminal On Mask matches split tone assignment possibilities for the segment, e.g., a predetermined two of 001, 010, and 100. Operation proceeds from step 1132 to step 1134. In step 1134, the base station determines the wireless terminal On state identifier corresponding to the selected wireless terminal of step 1132, and if the selected wireless terminal is in split tone format, the base station determines a wireless terminal On Mask identifier, e.g., a 1 bit value which maps to the wireless terminal On Mask of the selected wireless terminal for the segment.

Operation proceeds from step 1126, 1130, and 1134 to step 1136, where the base station incorporates said determined information into a regular assignment message. Operation proceeds from step 1122 to step 1138. In step 1138, the base station transmits said regular assignment message at a predetermined time in a recurring downlink structure at a first power level.

For each flash assignment signaling opportunity, operation proceeds via connecting node B 1108 to step 1140. In step 1140, the base station determines an assignment for a flash traffic channel assignment message. Step 1140 includes steps 1142, 1144, and 1146.

In step 1142, for a fourth traffic channel segment to be assigned, the base station selects a wireless terminal to receive the assignment, said wireless terminal corresponding to one of the wireless terminals in full tone format or a fourth subset of the set of wireless terminals in split tone format, said fourth subset including members whose assigned wireless terminal On Mask matches split tone assignment possibility for the segment, e.g., a predetermined one of 001, 010, and 100. Operation proceeds from step 1142 to step 1144. In step 1144, the base station determines the wireless terminal ON state identifier corresponding to the selected wireless terminal of step 1142. Operation proceeds from step 1144 to step 1146, where the base station incorporates said determined information from step 1144 into a flash assignment message.

Operation proceeds from step 1140 to step 1148, in which the base station transmits said flash assignment message at a predetermined time in a recurring downlink structure at a second power level, said second power level being higher than said first power level.

Figure 12:
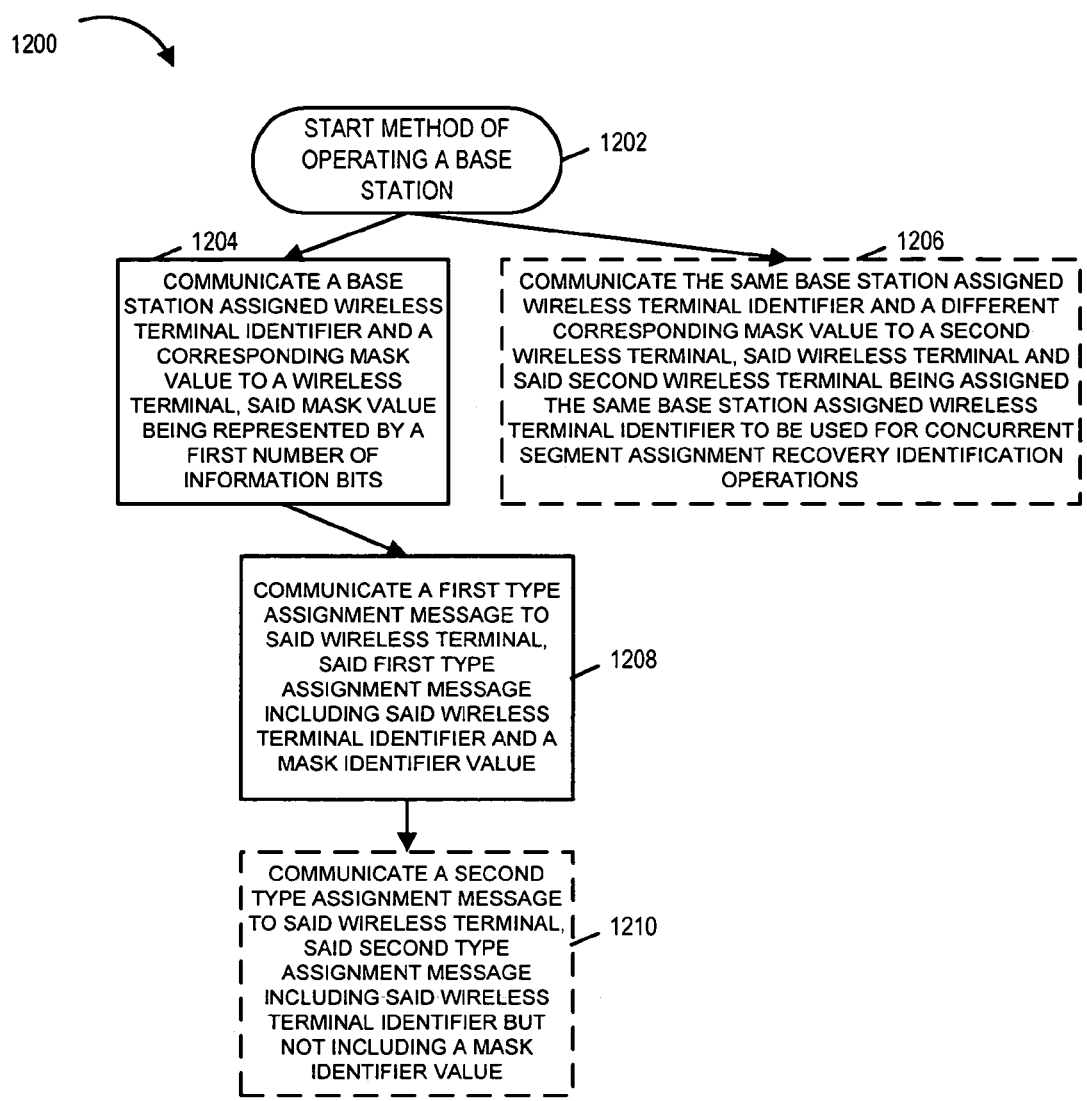
FIG. 12 is a flowchart of an exemplary method of operating a base station in accordance with various embodiments.

FIG. 12 is a flowchart 1200 of an exemplary method of operating a base station in accordance with various embodiments. Operation starts step 1202, where the base station is powered on and initialized. Operation proceeds from start step 1202 to step 1204. In some embodiments, at some times, operation also proceeds from start step 1202 to step 1206.

In step 1204, the base station communicates a base station assigned wireless terminal identifier and a corresponding mask value to a wireless terminal, said mask value being represented by a first number of information bits. For example, the base station assigned wireless terminal identifier and corresponding mask value may be communicated via a state transmission message transmitted to the wireless terminal.

In step 1206, when performed, the base station communicates the same base station assigned wireless terminal identifier and a different corresponding mask value to a second wireless terminal, said second wireless terminal being assigned the same base station assigned wireless terminal identifier to be used for concurrent segment assignment recovery identification operations. For example in one exemplary embodiment, in step 1204, the base station may have communicated a 5 bit base station assigned On state wireless terminal identifier=00001 and a 3 bit On mask value=001 to the wireless terminal; and in step 1206, the base station may have communicated a 5 bit wide base station assigned wireless terminal On state identifier=00001 and a 3 bit wide On mask value=010 to the second wireless terminal. Continuing with the example, alternatively, if in step 1204, the base station had communicated a 5 bit base station assigned On state wireless terminal identifier=00001 and a 3 bit On mask value=111 to the wireless terminal, the second base station could not share the same base station assigned wireless terminal identifier, the On mask value=111 signifying that the wireless terminal is to be operated in a mode where it does not share its On state identifier with other wireless terminals using the base station attachment point. In some embodiments, where the On Mask value can be one of four possibilities, e.g., (111, 001, 010, 100), the assigned On Mask value is communicated via a pattern of a two bit wide field.

Operation proceeds from step 1204 to step 1208. In step 1208, the base station communicates a first type assignment message, e.g., a regular type assignment message, to said wireless terminal, said first type assignment message including said wireless terminal identifier and a mask identifier value. In some embodiments, the mask identifier value is represented by a second number of information bits, said second number being less than said first number. In one exemplary embodiment, the mask value is communicated in a two bit wide field while the mask identifier value is communicated in a one bit wide field.

In some embodiments, at some times, operation proceeds from step 1208 to step 1210. In step 1210, the base station communicates a second type assignment message, e.g., a flash type assignment message, to said wireless terminal, said second type assignment message including said wireless terminal identifier but not including a mask identifier value. In some embodiments, the first type assignment message is communicated at a lower power level than said second type assignment message.

In various embodiments, the first and second type assignment messages are traffic channel assignment messages. In some such embodiments for at least some first type assignment messages, the first type assignment message conveys assignments for a plurality of, e.g., two or three, traffic channel segments, one of said plurality of assignments being conveyed by said wireless terminal identifier and said mask identifier value; and the second type assignment message conveys an assignment for a single traffic channel segment.

In some embodiments, the mask value identifies potential traffic channel segments in a recurring traffic channel structure which may be assigned to said wireless terminal. In some such embodiments if said mask value matches a first predetermined pattern, e.g., 111, any traffic channel segment from a set of traffic channel segments in the recurring traffic channel structure may be assigned to the wireless terminal and if the mask matches a second predetermined pattern, e.g., 001, a first predetermined subset of said set of traffic channel segments may be assigned to said wireless terminal, and if said mask matches a third predetermined pattern, e.g., 010, a second predetermined subset of said traffic channel segments may be assigned to said wireless terminal. In some such embodiments, the first predetermined subset and second predetermined subset are partially overlapping. In some embodiments, if the mask value matches a fourth predetermined value, e.g., 100, a third predetermined subset of said set of traffic channel segments may be assigned to said wireless terminal, said third predetermined subset being partially overlapping with said first and second predetermined subsets.

In various embodiments, the mask identifier value is represented by a single information bit, said single information bit distinguishing between two mask values which may be associated with the segment.

Figure 13:
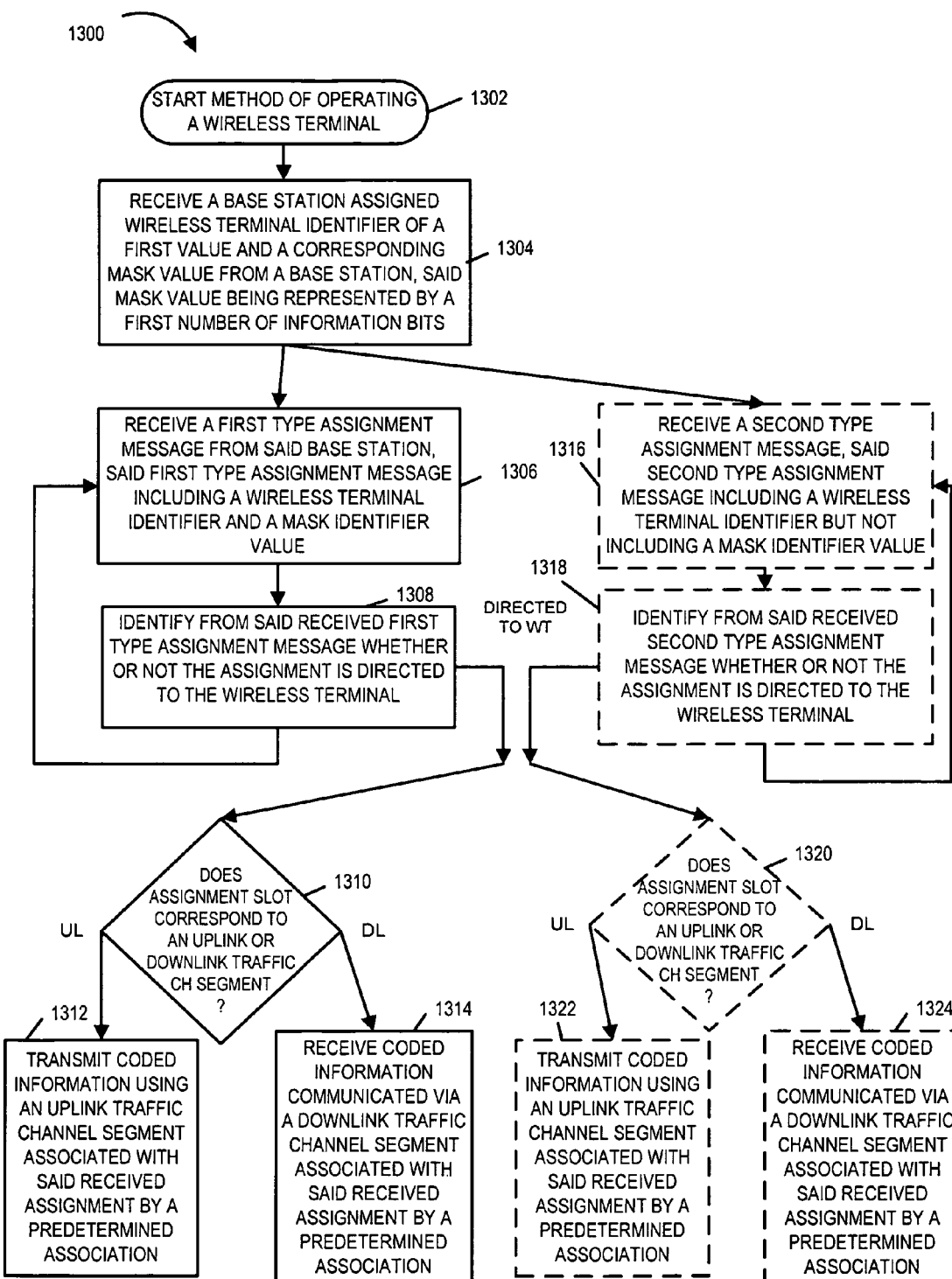
FIG. 13 is a flowchart of an exemplary method of operating a wireless terminal in accordance with various embodiments.

FIG. 13 is a flowchart 1300 of an exemplary method of operating a wireless terminal in accordance with various embodiments. The exemplary method starts in step 1302, where the wireless terminal is powered on and initialized. Operation proceeds from start step 1302 to step 1304. In step 1304, the wireless terminal receives a base station assigned wireless terminal identifier of a first value and a corresponding mask value from a base station, said mask value being represented by a first number of information bits. In some embodiments, the mask identifier value is represented by a second number of information bits, the second number being less than the first number. In one exemplary embodiment, the mask value which can take one of four possibilities, e.g., 111, 001, 010 and 100 is conveyed via a 2 bit wide field, and the mask identifier value is conveyed by a one bit wide field. In some embodiments, the mask value is conveyed via a 3 bit wide field and the mask identifier value is conveyed via a one bit wide field. Operation proceeds from step 1304 to step 1306, and in some embodiments, to step 1316.

In step 1306, the wireless terminal receives a first type assignment message from said base station, said first type assignment message including a wireless terminal identifier and a mask identifier value. Operation proceeds from step 1306 to step 1308. In step 1308, the wireless terminal identifies from said received first type assignment message whether or not the assignment is directed to the wireless terminal. If the wireless determines in step 1308, that an assignment of the message received in step 1306 is directed to the wireless terminal, operation proceeds from step 1308 to step 1310. Operation also proceeds from step 1308 to step 1306, to receive additional first type assignment messages.

In step 1310, the wireless determines whether the assignment slot corresponds to an uplink or downlink traffic channel segment. If the assignment directed to the wireless terminal corresponds to an uplink traffic channel segment operation proceeds from step 1310 to step 1312; if the assignment directed to the wireless terminal corresponds to a downlink traffic channel segment, operation proceeds to step 1314. In step 1312, the wireless terminal transmits coded information using an uplink traffic channel segment associated with said received assignment by a predetermined association. In step 1314, the wireless terminal receives coded information communicated via a downlink traffic channel segment associated with said received assignment by a predetermined association.

In step 1316, the wireless terminal receives a second type assignment message, said second type assignment message including a wireless terminal identifier but not including a mask identifier value. Operation proceeds from step 1316 to step 1318. In step 1318, the wireless terminal identifies from said received second type assignment message whether or not the assignment is directed to the wireless terminal. For example, if the base station assigned wireless terminal identifier received in step 1304 matches the base station assigned wireless terminal identifier received in step 1316, the assignment is directed to the wireless terminal. If the wireless determines in step 1318, that an assignment of the message received in step 1316 is directed to the wireless terminal, operation proceeds from step 1318 to step 1320. Operation also proceeds from step 1318 to step 1316, to receive additional second type assignment messages.

In step 1320, the wireless determines whether the assignment slot corresponds to an uplink or downlink traffic channel segment. If the assignment directed to the wireless terminal corresponds to an uplink traffic channel segment operation proceeds from step 1320 to step 1322; if the assignment directed to the wireless terminal corresponds to a downlink traffic channel segment, operation proceeds to step 1324. In step 1322, the wireless terminal transmits coded information using an uplink traffic channel segment associated with said received assignment by a predetermined association. In step 1324, the wireless terminal receives coded information communicated via a downlink traffic channel segment associated with said received assignment by a predetermined association.

In some embodiments, wherein when said received mask value is one of a set of a plurality of predetermined mask values, said step 1308 of identifying whether of not said received assignment is directed to said wireless terminal includes: (i) determining whether said received base station assigned wireless terminal identifier from step 1304 matches said wireless terminal identifier in said received first type assignment message of step 1306 and (ii) determining whether said wireless terminal identifier in said received assignment message from step 1306 identifies the received mask value from step 1304. In one exemplary embodiment, the set of a plurality of predetermined mask values is {001, 010, 100}.

In some embodiments, wherein when said received mask value is a first predetermined mask value, said first predetermined mask value being exclusive from said set of plurality of predetermined mask values, said step 1308 of identifying whether or not said received assignment is directed to said wireless terminal includes: determining whether said received base station assigned wireless terminal identifier from step 1304 matches said wireless terminal identifier in said received first type assignment message of step 1306, said determination not requiring use of said mask identifier value received in said assignment message. In one exemplary embodiment, the first predetermined mask value=111 and the set of a plurality of predetermined mask values is {001, 010, 100}.

In some embodiments, the wireless terminal determines a subset of assignment messages to receive as a function of the received mask value from step 1304. In some embodiments, the wireless terminal determines a subset of the assignment messages to receive as a function of the received mask value from step 1304. For example, in one exemplary embodiment, if a wireless terminal receives a mask value in step 1304=111, the wireless terminal should attempt to receive and recover each of the assignment signals since any assignment may be directed to the wireless terminal, e.g., the wireless terminal is in a full tone format DCCH mode of operation. Continuing with the example, if a wireless terminal receives a mask value being one of 001, 010, and 100 in step 1304, the wireless can, and sometimes does, selectively receive and/or process assignment signals, since by a predetermined implemented structure some assignments can be directed to the wireless terminal, while others can not be directed to the wireless terminal. In some such embodiments, the wireless terminal can conserve resources, e.g., power, processing time, and/or memory usage, by limiting reception and/or recovery operation of assignment signals.

In some embodiments, if said received mask value from step 1304 matches a first predetermined pattern, e.g., 111, any traffic channel segment from a set of traffic channel segments in the recurring traffic channel structure may be assigned to the wireless terminal and wherein if the mask matches a second predetermined pattern, e.g., 001, a first predetermined subset of said set of traffic channel segments may be assigned to said wireless terminal, and wherein if said mask matches a third predetermined pattern, e.g., 010, a second predetermined subset of traffic channel segments may be assigned to said wireless terminal. In some such embodiments, the first predetermined subset and the second predetermined subset are partially overlapping. In some embodiments, if said mask matches a fourth predetermined pattern, e.g., 100, a third predetermined subset of said traffic channel segments may be assigned to said wireless terminal, said third predetermined subset being partially overlapping with said first and second predetermined subsets.

Figure 14:
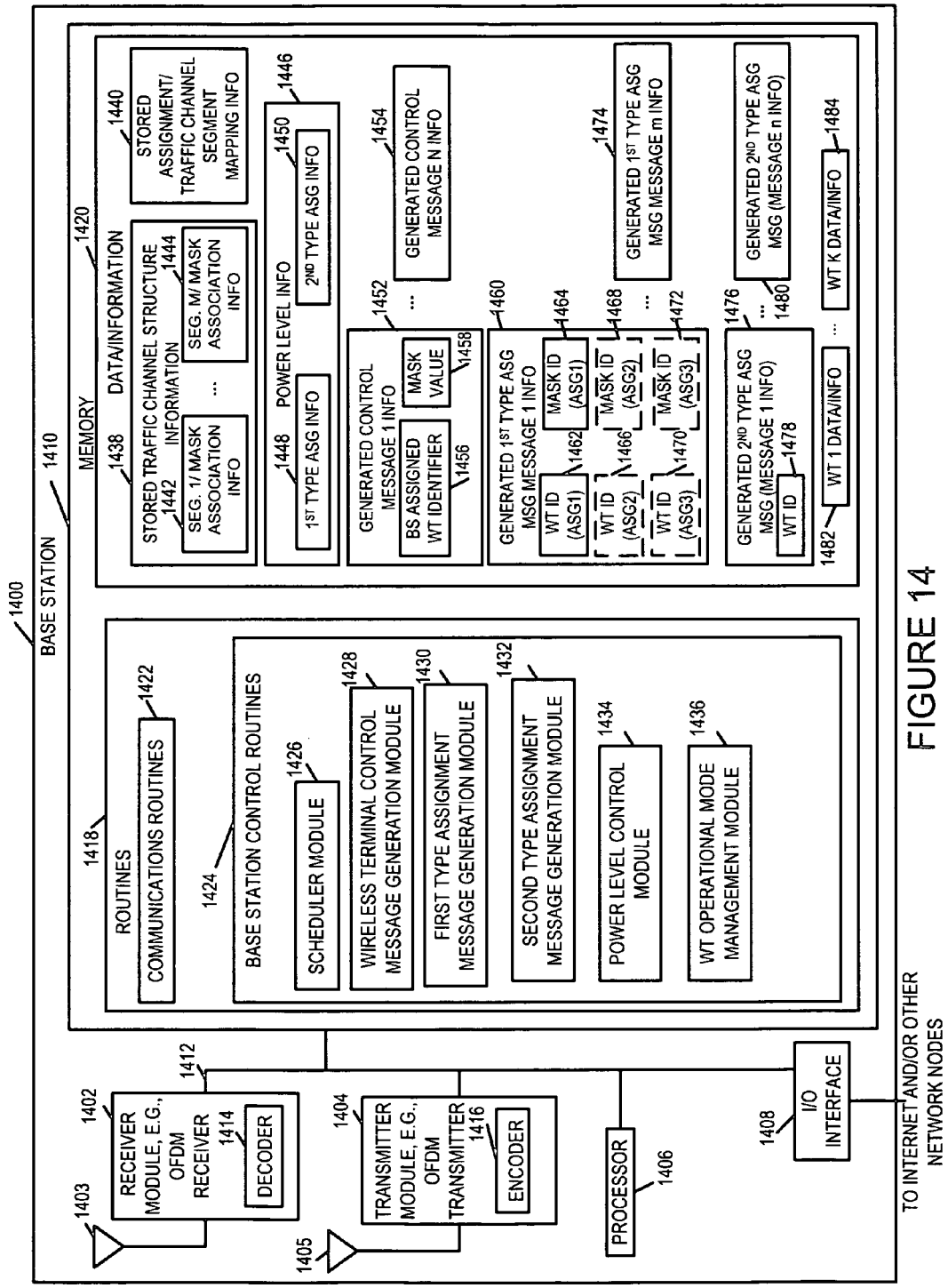
FIG. 14 is a drawing of an exemplary base station implemented in accordance with various embodiments.

FIG. 14 is a drawing of an exemplary base station 1400 implemented in accordance with various embodiments. Exemplary base station 1400 may be any of the base stations of system 100 of FIG. 1. Exemplary base station 1400 includes a receiver module 1402, a transmitter module 1404, a processor 1406, I/O devices 1408, and a memory 1410 coupled together via a bus 1412 over which the various elements may interchange data and information. The memory 1410 includes routines 1418 and data/information 1420. The processor 1406, e.g., a CPU, executes the routines 1418 and uses the data/information 1420 in memory 1410 to control the operation of the base station and implement methods.

Receiver module 1402, e.g., an OFDM receiver is coupled to receive antenna 1403 via which the base station receives uplink signals from wireless terminals. The uplink signals include, e.g., registration request signals, requests to change a state of operation, uplink dedicated control channel signals including requests for traffic channel resources, and uplink traffic channel segment signals. Receiver module 1402 includes a decoder 1414 for decoding at least some of the received uplink signals.

Transmitter module 1404, e.g., an OFDM transmitter, is coupled to transmit antennas 1405 via which the base station transmits downlink signals to wireless terminals, the downlink signals include, e.g., timing/synchronization signals, control signals including control signals conveying base station assigned wireless terminal identifiers and mask values, e.g., state transition message signals, first type assignment signals, second type assignment signals, and downlink traffic channel segment signals. The transmitter module 1404 includes an encoder 1416 for encoding at least some downlink signals to be transmitted.

I/O interface 1408 couples the base station 1400 to other network nodes, e.g., other base stations, routers, AAA servers, home agent nodes, various servers, etc., and/or the Internet. I/O interface 1408 allows a wireless terminal using a base station 1400 attachment point to participate in a communications session with a peer node located in a different cell using an attachment point of a different base station.

Routines 1418 include communications routines 1422 and base station control routines 1424. The communications routines 1422 implement the various communications protocols used by the base station 1400. The base station control routines 1424 include a scheduler module 1426, a wireless terminal control message generation module 1428, a first type assignment message generation module 1430, a second type assignment message generation module 1432, a power level control module 1434, and a wireless terminal operational mode management module 1436.

Scheduler module 1426, e.g., a scheduler, schedules uplink and downlink segments to wireless terminals in accordance with an implemented scheduling policy. The scheduling of module 1426 includes the scheduling of uplink and downlink traffic channel segments. At some times, some of the segments may be unavailable to be scheduled to certain wireless terminal using the base station attachment point, e.g., as a function of the mask value assigned to the wireless terminal.

Wireless terminal control message generation module 1428 generates message information directed to a wireless terminal, said message information including a base station assigned wireless terminal identifier and a corresponding mask value. In some embodiments, the base station assigned wireless terminal identifier and the corresponding mask value are communicated via the same message, e.g., a state transition message. In one such exemplary embodiment, the base station assigned wireless terminal is communicated by a 5 bit wide field and the corresponding mask value being communicated by a two bit wide field. In one such embodiment, the base station assigned identifier is a value in the range of 1 . . . 31, and the corresponding mask value communicated by the two bit wide field is one of four different three bit wide patterns: 111, 001, 010 and 100. Generated control message 1 information 1452 and generated control message N information 1454 represents output from module 1428.

The wireless terminal control message generation module 1428, at times, generates message information directed to a second wireless terminal including the same base station assigned wireless terminal identifier and different corresponding mask value, said wireless terminal and said second wireless terminal being assigned the same base station assigned wireless terminal identifier to be used for concurrent segment information recovery operations. For example, WT A may be assigned base station assigned wireless terminal identifier=00011 and mask=001, while WTB may be assigned wireless terminal identifier=00011 and mask=010.

First type assignment message generation module 1430 generates an assignment message of a first type including a wireless terminal identifier and a mask identifier value. In some embodiments, the mask value is represented by a first number of information bits and the mask identifier value is represented by a second number of information bits, said second number of information bits being less than said first number. For example, in one exemplary embodiment, the mask value field in a state transition message is two bits wide communicating one of four possibilities (bit pattern 111, bit pattern 001, bit pattern 010, or bit pattern 100), while the mask identifier field in a first type assignment message is one bit wide communicating one of two possibilities. In some embodiments, the first type assignment message is referred to as a regular assignment message. Message 1 information 1460 and message N information 1454 represent output from module 1430.

Second type assignment message generation module 1432 generates a second type assignment message including a wireless terminal identifier but not including a mask identifier value. In some embodiments, the second type assignment message is referred to as a flash assignment message. Message 1 information 1476 and message N information 1480 represent output from module 1434.

Power level control module 1434 performs power control including controlling the relative transmission powers of first type assignment messages and second type assignment messages such that said first type assignment messages are transmitted at a lower power level than second type assignment messages. Power level control module 1434 uses power level information 1446.

Wireless terminal operational mode management module 1436, manages the operational mode for a plurality of wireless terminals using the base station attachment point. Management module 1436 determines, e.g., from available resources, a base station assigned wireless terminal identifier and corresponding mask value to temporarily assign to a wireless terminal, e.g., a wireless terminal which is to be transitioned into an On state of operation, e.g., a state of operation in which the wireless terminal may be assigned uplink and/or downlink traffic channel segments. In this exemplary embodiment, the value of the mask determines whether the wireless terminal is in a first or second mode of On state operation with different amounts of resources being available in the different modes of On state operation. For example, in one exemplary embodiment, if the mask=111, the wireless terminal is transitioned into a full tone format mode of dedicated control channel operation, while if the mask is one of 001, 100, and 010, the wireless terminal is being transitioned into a split tone format mode of operation, with more resources being available in the full tone format than in the split tone format mode of operation. Determinations made by the management module 1436 are forwarded to the wireless terminal control message generation module 1428.

Data/information 1420 includes stored traffic channel structure information 1438 which includes segment to mask association information (segment 1/mask association information 1442, . . . , segment M/mask association information 1444), stored assignment/traffic channel segment mapping information 1440, and power level information 1446. Some exemplary stored traffic channel structure information 1438 includes at least some of the information of FIGS. 7 and 8. For example, with regard to segment/mask association information consider the information of columns 806 and 808 for second type assignments, and consider the information of columns (810 and 812) and (814 and 816) for second type assignments. Some exemplary stored assignment/traffic segment mapping information 1440 includes at least some of the information of FIGS. 7 and 8. In the example of FIGS. 7 and 8, each traffic channel segment is associated with an assignment slot following a predetermined relationship.

Power level information 1446 includes power level information associated with the transmission power level of $1^{st}$ type assignment information messages 1448 and power level information associated with the transmission power level of $2^{nd}$ type assignment information messages 1450. Data/information 1420 also includes generated control message information (generated control message 1 information 1452, . . . generated control message N information 1454). Generated control message 1 information 1452 includes a base station assigned wireless terminal identifier 1456 and a corresponding mask value 1458.

Data/information 1420 also includes generated $1^{st}$ type assignment message information (generated $1^{st}$ type assignment message message 1 information 1460, . . . , generated $1^{st}$ type assignment message message m information 1474). Generated $1^{st}$ type assignment message message 1 information 1460 includes a wireless terminal identifier corresponding to a first assignment being conveying in the message 1462 and a corresponding mask identifier value corresponding to the first assignment being conveyed in the message 1464. Generated $1^{st}$ type assignment message message 1 information 1460 also includes in some embodiments at some times, a wireless terminal identifier corresponding to a second assignment being conveying in the message 1466 and a corresponding mask identifier value corresponding to the second assignment being conveyed in the message 1468; and/or a wireless terminal identifier corresponding to a third assignment being conveying in the message 1470 and a corresponding mask identifier value corresponding to the third assignment being conveyed in the message 1472.

Data/information 1420 also includes a generated $2^{nd}$ type assignment message information (generated $2^{nd}$ type assignment message message 1 information 1476, . . . , generated $2^{nd}$ type assignment message message n information 1480). Generated $2^{nd}$ type assignment message message 1 information 1476 includes a wireless terminal identifier 1478 corresponding to the assignment but does not include a mask identifier. The communicated wireless terminal identifier 1476 of the $2^{nd}$ type assignment message either alone or in combination with stored timing structure information being sufficient for a wireless terminal to determined whether or not a $2^{nd}$ type assignment is directed to itself.

Data/information 1420 also includes a plurality of sets of wireless terminal data/information (wireless terminal 1 data/information 1482, . . . , wireless terminal K data/information 1484), e.g., a plurality of wireless terminal currently using a base station 1400 attachment point. Wireless terminal 1 data/information 1482 includes, e.g., user data pertaining to wireless terminal 1 communicated in uplink and/or downlink traffic channel segments, a base station assigned wireless terminal identifier temporarily assigned to WT 1, a corresponding mask temporarily assigned to wireless terminal 1, a mode of operation associated with the mask, e.g., a first mode of operation in which a larger number of traffic channel segments are available for allocation to WT 1 in comparison to a second mode of operation, various state information pertaining to wireless terminal 1 operations, and/or session information pertaining to wireless terminal 1.

In some embodiments, the first and second type assignment messages are traffic channel assignment messages. In various embodiments, the first type assignment message can convey assignments for a plurality of traffic channel segments, e.g., up to three traffic channel segments, and second type assignments convey an assignment for a single traffic channel segment.

In various embodiments, the traffic channel structure information 1438 defines a recurring traffic channel structure and a mask value identifies potential traffic channel segments which may be assigned to a wireless terminal. For example, consider that the base station uses the traffic channel structure information of FIGS. 7 and 8. Referring to FIG. 8A, if a wireless terminal is assigned a mask=111 or 001 the wireless terminal may be assigned uplink traffic channel segment with index number=3; however, if the wireless terminal is assigned a mask=010 or 100, the wireless terminal can not be assigned the uplink traffic channel segment with index number=3. Continuing with the example, if a wireless terminal is assigned a mask=111 or 001 or 010, the wireless terminal may be assigned the uplink traffic channel segment with index number=4; however if the wireless terminal is assigned a mask=100, the wireless terminal can not be assigned the uplink traffic channel segment with index number=4.

In some embodiments, if the mask value assigned to a wireless terminal matches a first predetermined pattern, e.g., 111, any traffic channel segment from a set of traffic channel segments in the recurring traffic channel structure may be assigned to the wireless terminal and if the mask value matches a second predetermined pattern, e.g., 001, a first predetermined subset of said set of traffic channel segments in the recurring traffic channel structure may be assigned to the wireless terminal, and if the mask value matches a third predetermined pattern, e.g., 010, a second predetermined subset of said set of traffic channel segments in the recurring traffic channel structure may be assigned to the wireless terminal. In some such embodiments, the first predetermined subset and the second predetermined subset are partially overlapping. In some embodiments, if the mask value matches a fourth predetermined pattern, e.g., 100, a third predetermined subset of said set of traffic channel segments in the recurring traffic channel structure may be assigned to the wireless terminal, said third predetermined subset being partially overlapping with said first and second predetermined subsets.

In various embodiments, the mask identifier value is represented by a single information bit, said single bit distinguishing between two potential mask values which may be associated with the assignment. For example, consider that an exemplary first type assignment includes an assignment corresponding to uplink traffic channel segment with index=4 as indicated in FIG. 8A, if the mask value identifier value is a first value, e.g., 0, that indicates mask 001, while if the mask identifier value is a second value, e.g., 1, that indicates mask 010.

Figure 15:
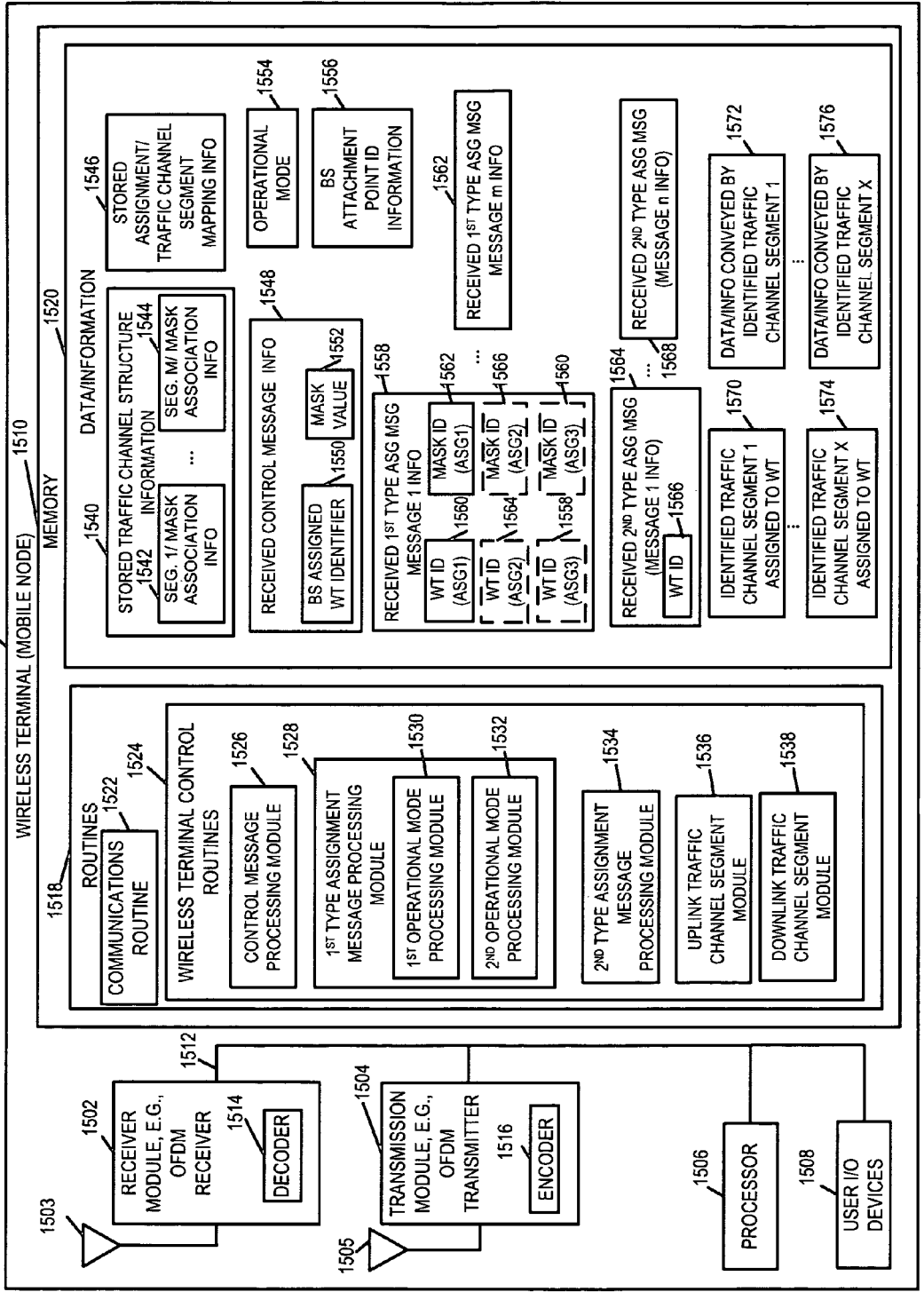
FIG. 15 is a drawing of an exemplary wireless terminal, e.g., mobile node, implemented in accordance with various embodiments.

FIG. 15 is a drawing of an exemplary wireless terminal 1500, e.g., mobile node, implemented in accordance with various embodiments. Exemplary wireless terminal 1500 may be any of the wireless terminals of system 100 of FIG. 1. Exemplary wireless terminal 1500 includes a receiver module 1502, a transmitter module 1504, a processor 1506, user I/O devices 1508, and a memory 1510 coupled together via a bus 1512 over which the various elements interchange data and information. Memory 1510 includes routines 1518 and data/information 1520. The processor 1506, e.g., a CPU, executes routines 1518 and uses the data/information 1520 in memory 1510 to control the operation of the wireless terminal 1500 and implement methods.

Receiver module 1502, e.g., an OFDM receiver, is coupled to receive antenna 1503 via which the wireless terminal receives downlink signals from base stations, e.g., from base station 1400. Received downlink signals include timing/synchronization signals, control message signals conveying a base station assigned wireless terminal identifier and a corresponding mask value, first type assignment signals, second type assignment signals, and downlink traffic channel segment signals. Receiver module 1502 includes a decoder 1514 for decoding at least some of the received downlink signals. Transmission module 1504, e.g., an OFDM transmitter, is coupled to transmit antenna 1505 via which the wireless terminal transmits uplink signals to base stations, e.g., to base station 1400. Uplink signals include registration request signals, mode transition request signals, uplink dedicated control channel signals including requests for uplink traffic channel segment resources, and uplink traffic channel segment signals. Transmission module 1504 includes an encoder 1516 for encoding at least some of the uplink signals to be transmitted. In some embodiments, the same antenna is used for transmitter and receiver, e.g., in conjunction with a duplexer module.

User I/O devices 1508 include, e.g., microphone, camera, keyboard, touch-screen, keypad switches, speaker, display, etc. User I/O devices 1508 allow a user of wireless terminal 1500 to input data/information, access output data/information, control at least some functions of wireless terminal 1500, and/or control applications.

Routines 1518 include a communications routine 1522 and wireless terminal control routines 1524. The communications routine 1522 implements various communications protocols used by the wireless terminal 1500. Wireless terminal control routines 1524 include a control message processing module 1526, a $1^{st}$ type assignment processing module 1528, a $2^{nd}$ type assignment message processing module 1534, an uplink traffic channel segment module 1536 and a downlink traffic channel segment module 1538.

Control message processing module 1526 processes received control message information including a base station assigned wireless terminal identifier and a corresponding mask value, the mask value being represented by a first number of information bits. For example, the base station assigned wireless terminal identifier and mask value may be communicated via a state transition message and module 1524 processes this information storing the recovered information, e.g., for later use when processing assignment messages. Control message processing module 1526 also determines an operational mode based on the received mask value. For example in one exemplary embodiment, the mask value is conveyed by means of a two bit field conveying one of four potential mask patterns 111, 001, 010, and 100. If the value is 111, the wireless terminal is to be in a second mode of operation, while if the mask value is one of 001, 010, and 100, the wireless terminal is an a first mode of operation, with more resources being potentially available in the second mode of operation than in the first mode of operation, e.g., a larger number of traffic channel segments in the recurring traffic channel structure can be assigned to a wireless terminal in a second mode of On state operation as compared to a wireless terminal in a first mode of On state operation. In some embodiments, the second mode of operation is referred to a full tone format DCCH mode of operation and the first mode of operation is referred to a split tone format DCCH mode of operation.

$1^{st}$ type assignment message processing module 1528 processes assignment messages of a $1^{st}$ type, said assignment messages of the $1^{st}$ type including a wireless terminal identifier and a corresponding mask identifier value. In some such embodiments, the mask identifier value is represented by a second number of information bits, the second number of information bits being less than the first number of information bits. $1^{st}$ type assignment message module 1528 identifies from a received $1^{st}$ type assignment message whether or not a received assignment is directed to WT 1500.

$1^{st}$ type assignment message processing module 1528 includes a $1^{st}$ operational mode processing module 1530 and a 2nd operational mode processing module 1532. $1^{st}$ operational mode processing module 1530, used when processing $1^{st}$ type assignment messages when said wireless terminal in a first mode of operation, determines whether the received base station assigned wireless terminal identifier value currently associated with WT 1500 matches the wireless terminal identifier included in the assignment under consider from the $1^{st}$ type assignment message being processed and whether the received mask identifier value of the assignment identifies the received mask value currently associated with WT 1500. In one exemplary embodiment, when using $1^{st}$ operational mode processing module, the received mask currently associated with WT 1500, e.g., corresponding to mask value 1552 of the received control message is one of 001, 010 and 100.

$2^{nd}$ operational mode processing module 1532, used when processing $1^{st}$ type assignment messages when WT 1500 is in the second mode of operation, determines whether the received base station assigned wireless terminal identifier value currently corresponding to the wireless terminal matches the wireless terminal identifier in the received assignment message, and the determination by module 1532 as to whether of not the assignment under consideration is directed to WT 1500 does not require the use of the mask identifier value currently associated with WT 1500, e.g., the mask value obtained from message 1548. In one exemplary embodiment, when using $2^{nd}$ operational mode processing module 1532, the received mask currently associated with WT 1500, e.g., corresponding to mask value 1552 of the received control message is 111, e.g., signifying that any traffic channel segment may be allocated to WT 1500.

Second type assignment message processing module 1534 processes a second type assignment message including a wireless terminal identifier but not including a mask identifier value, and module 1534 identifies whether or not the second type assignment message is directed to WT 1500.

Uplink traffic channel segment module 1536 is responsive to controlling the generation of uplink traffic channel segment signals and controlling the transmission of uplink traffic channel segment signals. Module 1536 is responsive to identified traffic channel segments 1570, 1574 which happen to be uplink traffic channel segments in the recurring traffic channel structure. Downlink traffic channel segment module 1538 is responsive to controlling the reception of downlink traffic channel segment signals and controlling the recovery of traffic channel segment signals. Module 1538 is responsive to identified traffic channel segments 1570, 1574 which happen to be downlink traffic channel segments in the recurring traffic channel structure.

Data/information 1520 includes stored traffic channel structure information 1540 and stored assignment/traffic channel segment mapping information 1546. The stored traffic channel structure information 1540 includes segment 1/mask association information 1542, ..., segment M/mask association information 1544. Information 1540 corresponds to information 1438 in BS 1400, while information 1546 corresponds to information 1440 in base station 1400. For example some information from FIGS. 7 and 8 is, in one embodiment, part of information 1540 and information 1546.

Data/information 1520 also includes received control message information 1548 including a base station assigned wireless terminal identifier 1550 and a mask value 1552, operational mode information 1554, base station attachment point identification information 1556, a plurality of received $1^{st}$ type assignment message information (received $1^{st}$ type assignment message message 1 information 1558, ..., received 1st type assignment message message m information 1562), a plurality of $2^{nd}$ type assignment message information (received $2^{nd}$ type assignment message message 1 information 1564, ..., received $2^{nd}$ type assignment message message n information 1568), information pertaining to identified traffic channel segments intended for WT 1500 (identified traffic channel segment 1 assigned to the WT 1570, . . . , identified traffic channel segment X assigned to the WT 1574).

The received control message information 1548, in some embodiments, is communicated via a state transition message. The information 1548 which is intended for WT 1500 is retained for use during subsequent assignment signaling processing operations. Operational mode 1554 includes information identifying the current state of WT 1500, e.g., off, sleep, Hold, first mode of On state, second mode of On state. In some embodiments the first mode of On state is referred to as split tone format DCCH mode of operation and the second mode of ON state is referred to as a full tone format DCCH mode of operation. Base station attachment point identification information 1556 includes information identifying the current base station attachment point being used by WT 1500, e.g., from among a plurality of base station attachment points in the system. Base station attachment point identification information 1556 includes, e.g., base station id, sector id, sector type identification, carrier identification, and/or tone block information.

Received $1^{st}$ type assignment message message 1 information 1558 corresponds to a received $1^{st}$ type message being processed and evaluated by module 1528. Information 1558 includes, for a first assignment slot, a wireless terminal identifier 1560 and a corresponding mask identifier value, e.g. 1 bit, 1562. Information 1558 for some messages includes a plurality of assignments, e.g., $2^{nd}$ assignment information (WT identifier 1564 and corresponding mask identifier value 1566), and/or $3^{rd}$ assignment information (WT identifier 1558 and corresponding mask identifier value 1560).

Received $2^{nd}$ type assignment message message 1 information 1564, which includes a wireless terminal identifier 1566 is processed by module 1534.

Data/information 1520 also include data/information conveyed by identified segments assigned to WT 1500 (data/info conveyed by identified traffic channel segment 1 1572, . . . , data/information conveyed by identified traffic channel segment X1576). The identified segments (1570, 1574) may be identified from either of a $1^{st}$ type assignment message by module 1528 or a second type assignment message by module 1534 and may correspond to either of an uplink traffic channel segment or a downlink traffic channel segment, e.g., in accordance with a predetermined mapping between assignment slots in the assignment messages and traffic channel segments in the recurring structure.

In some embodiments, the $1^{st}$ and $2^{nd}$ type assignment messages are traffic channel assignment messages. In one exemplary embodiment, the $1^{st}$ type assignment message is referred to a regular assignment message and the $2^{nd}$ type assignment message is referred to as a flash assignment. In some embodiments, a $1^{st}$ type assignment message can convey multiple assignments, e.g., assignments for up to 3 different traffic channel segments and each of the traffic channel segments may be and sometimes is directed to a different wireless terminal. In some embodiments, the $2^{nd}$ type assignment conveys an assignment for a single traffic channel segment.

Figure 16:
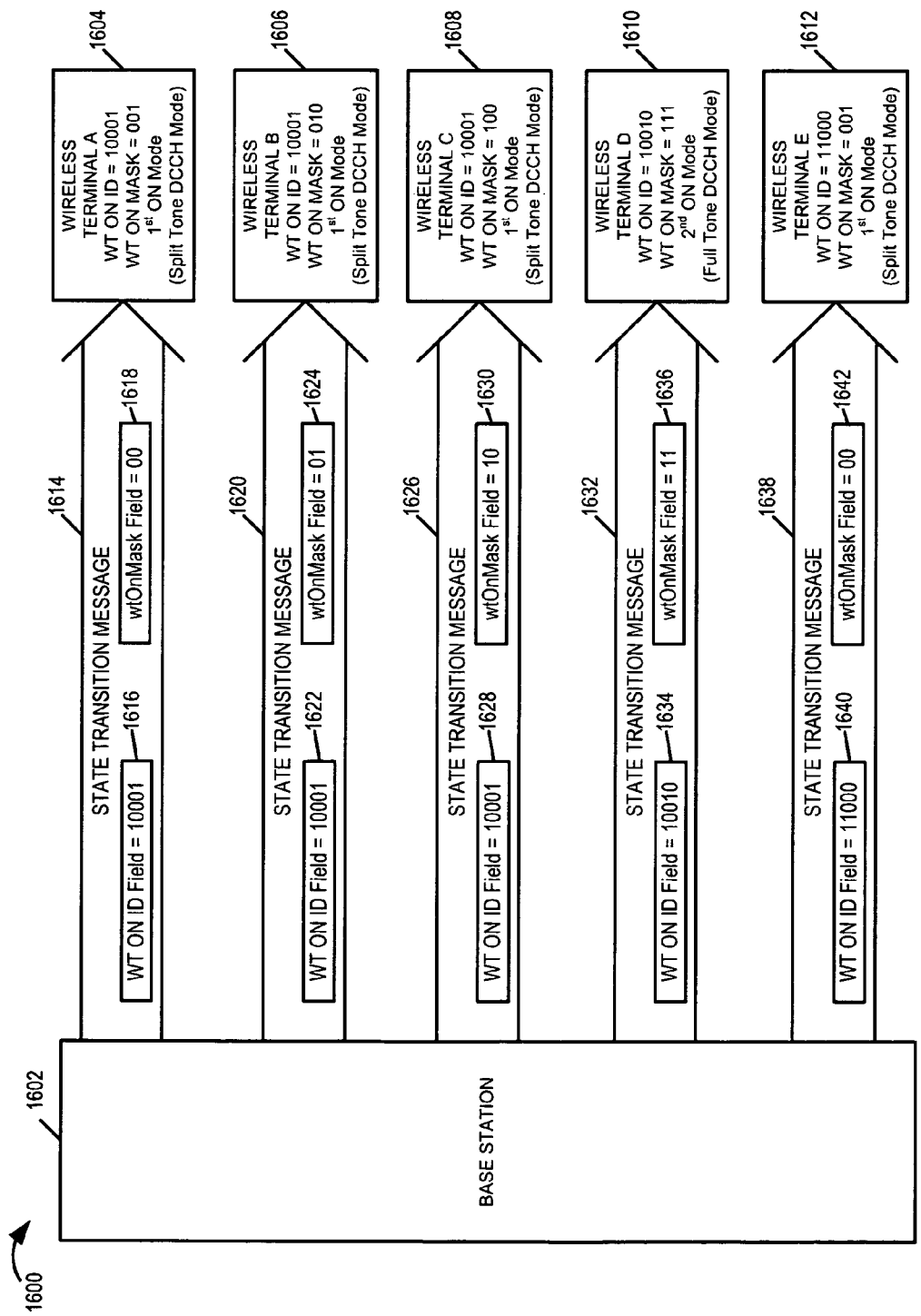
FIG. 16, FIG. 17 and FIG. 18 illustrate exemplary state transition signaling, traffic channel assignment signaling and recurring channel structure in accordance with various embodiments.
Figure 17:
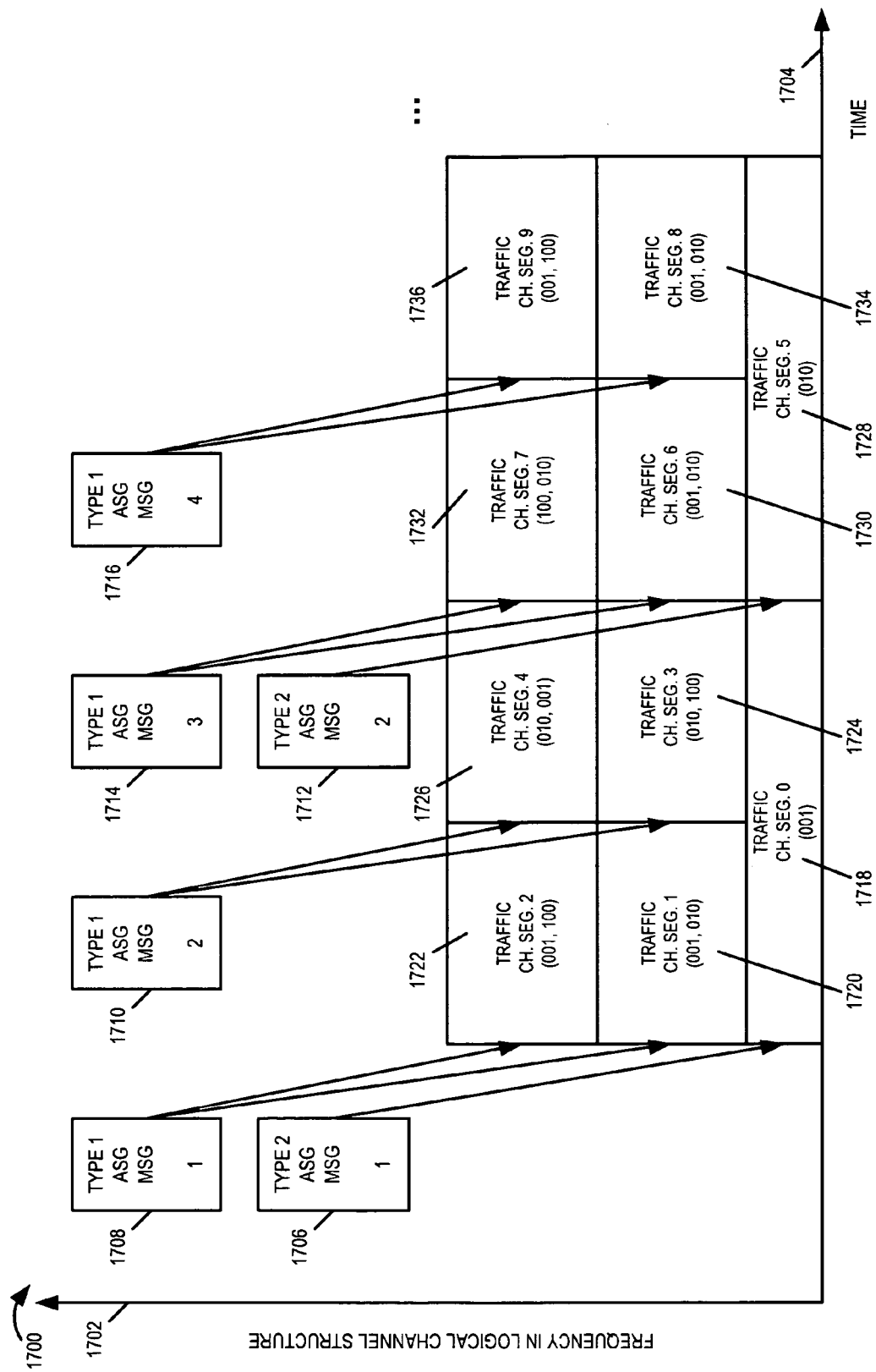
Figure 18:
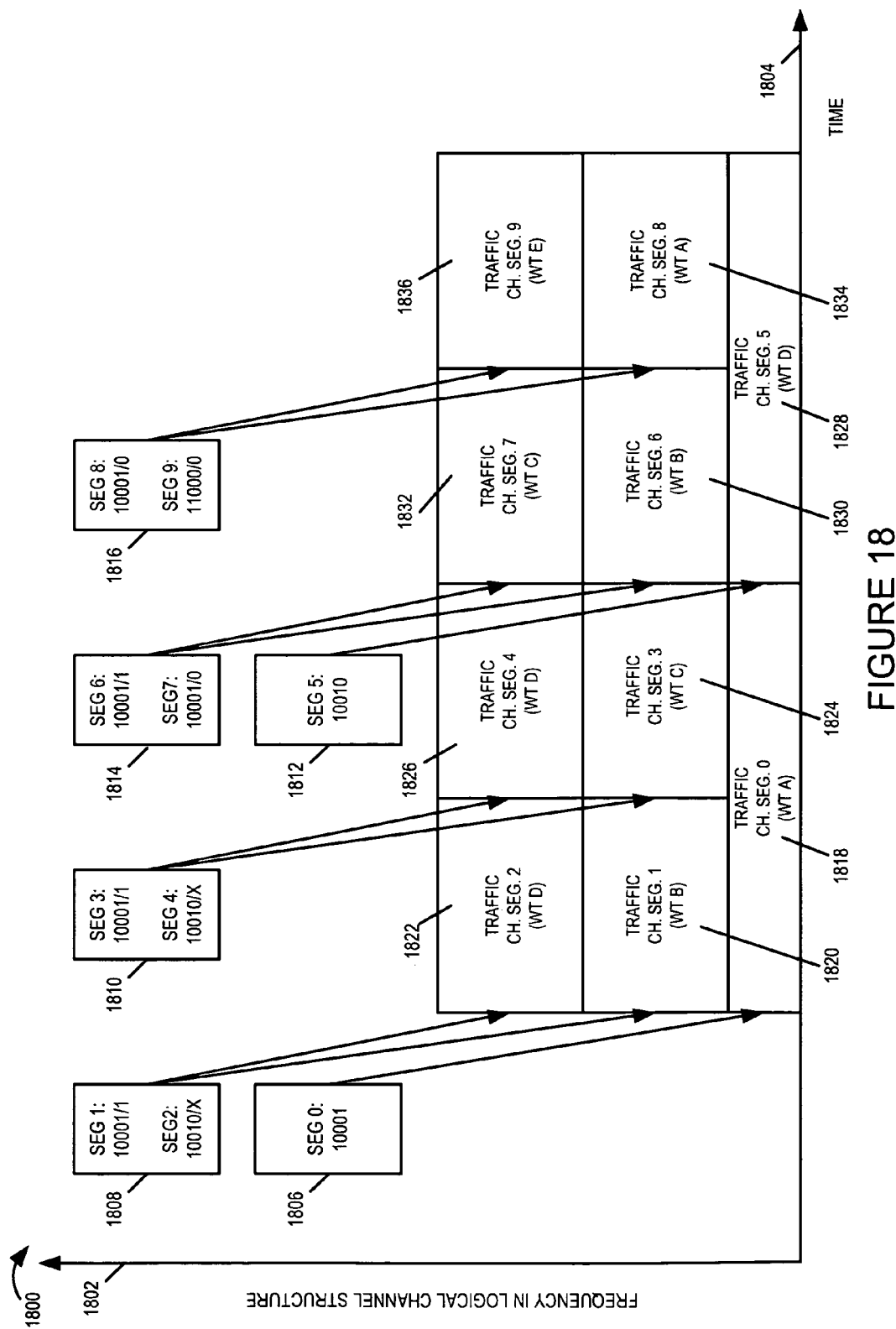

FIG. 16, FIG. 17 and FIG. 18 illustrate exemplary state transition signaling, traffic channel assignment signaling and recurring channel structure in accordance with various embodiments. FIGS. 16, 17 and 18 illustrate a simplified structure to illustrate features used in various embodiments. FIG. 16 is a drawing 1600 illustrating exemplary state transition message signaling between an exemplary base station 1602 and a plurality of wireless terminal (WT A 1604, WT B 1606, WT C 1608, WT D, 1610, and WT E 1616). Base station 1602 may be any of the base stations of system 100 of FIG. 1. WTs (1604, 1606, 1608, 1610, 1612) may be any of the WTs of system 100 of FIG. 1. Base station 1602 transmits state transition message 1614 to WT A 1604 including a 5 bit WT ON identifier field=10001 1616 and a wtONMask field=00 1618. WT A 1604 receives the message 1614 and determines that it has been assigned a WT ON ID=10001, a WT On MASK=001, and is to operate in a $1^{st}$ ON mode of operation, e.g., split tone format DCCH mode. Base station 1602 transmits state transition message 1620 to WT B 1606 including a 5 bit WT ON identifier field=10001 1622 and a wtONMask field=01 1624. WT B 1606 receives the message 1620 and determines that it has been assigned a WT ON ID=10001, a WT On MASK=010, and is to operate in a $1^{st}$ ON mode of operation, e.g., split tone format DCCH mode. Base station 1602 transmits state transition message 1626 to WT C 1608 including a 5 bit WT ON identifier field=10001 1628 and a wtONMask field=10 1630. WT C 1608 receives the message 1626 and determines that it has been assigned a WT ON ID=10001, a WT On MASK=100, and is to operate in a $1^{st}$ ON mode of operation, e.g., split tone format DCCH mode. Base station 1602 transmits state transition message 1632 to WT D 1610 including a 5 bit WT ON identifier field=10010 1634 and a wtONMask field=11 1636. WT D 1610 receives the message 1632 and determines that it has been assigned a WT ON ID=10010, a WT On MASK=111, and is to operate in a $2^{nd}$ ON mode of operation, e.g., full tone format DCCH mode. Base station 1602 transmits state transition message 1638 to WT E 1612 including a 5 bit WT ON identifier field=11000 1640 and a wtONMask field=00 1642. WT E 1612 receives the message 1638 and determines that it has been assigned a WT ON ID=11000, a WT On MASK=001, and is to operate in a $1^{st}$ ON mode of operations, e.g., split tone format DCCH mode.

FIG. 17 is a drawing 1700 illustrating an exemplary recurring channel structure which may be used by the base station 1602 and wireless terminals (1604, 1606, 1608, 1610, 1612) of FIG. 16. Vertical axis 1702 represents frequency in a logical channel structure, while horizontal axis 1704 represents time. Information pertaining to the channel structure is stored and used by the base station and wireless terminals. In this exemplary channel structure each indexed traffic channel segment corresponds to an assignment slot in an assignment message by a predetermined relationship, and there are two types of assignment messages. The first type of assignment message, e.g., a regular assignment message, has slots for two assignments, while the second type of assignment message, e.g., a flash type assignment message, conveys an assignment for a single traffic channel segment. In some embodiments, the second type assignment is transmitted at a higher power level than the first type of assignment.

This exemplary embodiment includes 10 indexed traffic channel segments (traffic channel segment 0 1718, traffic channel segment 1 1720, traffic channel segment 2 1722, traffic channel segment 3 1724, traffic channel segment 4 1726, traffic channel segment 5 1728, traffic channel segment 6 1730, traffic channel segment 7 1732, traffic channel segment 8 1734, traffic channel segment 9 1736), four type 1 assignment messages (type 1 assignment message 1 1708, type 1 assignment message 2 1710, type 1 assignment message 3 1714, type 1 assignment message 4 1716), and two type 2 assignment messages (type 2 assignment message 1 1706, type 2 assignment message 2 1712).

Type 2 assignment message 1 1706 conveys the assignment for traffic channel segment 0 1718. Traffic channel segment 0 can be assigned to a wireless terminal in the second mode of operation or a wireless terminal in the first mode of operation with an assigned WT ON Mask=001.

Type 1 assignment message 1 1708 conveys the assignment for traffic channel segment 1 1720 and the assignment for traffic channel segment 2 1722. Traffic channel segment 1 1720 can be assigned to a wireless terminal in the second mode of operation or a wireless terminal in the first mode of operation with an assigned WT ON Mask=001 or 010. Traffic channel segment 2 1722 can be assigned to a wireless terminal in the second mode of operation or a wireless terminal in the first mode of operation with an assigned WT ON Mask=001 or 100.

Type 1 assignment message 2 1710 conveys the assignment for traffic channel segment 3 1724 and the assignment for traffic channel segment 4 1726. Traffic channel segment 3 1724 can be assigned to a wireless terminal in the second mode of operation or a wireless terminal in the first mode of operation with an assigned WT ON Mask=010 or 100. Traffic channel segment 4 1726 can be assigned to a wireless terminal in the second mode of operation or a wireless terminal in the first mode of operation with an assigned WT ON Mask=010 or 001.

Type 2 assignment message 2 1712 conveys the assignment for traffic channel segment 5 1728. Traffic channel segment 5 can be assigned to a wireless terminal in the second mode of operation or a wireless terminal in the first mode of operation with an assigned WT ON Mask=010.

Type 1 assignment message 3 1714 conveys the assignment for traffic channel segment 6 1730 and the assignment for traffic channel segment 7 1732. Traffic channel segment 6 1730 can be assigned to a wireless terminal in the second mode of operation or a wireless terminal in the first mode of operation with an assigned WT ON Mask=001 or 010. Traffic channel segment 7 1732 can be assigned to a wireless terminal in the second mode of operation or a wireless terminal in the first mode of operation with an assigned WT ON Mask=100 or 010.

Type 1 assignment message 4 1716 conveys the assignment for traffic channel segment 8 1734 and the assignment for traffic channel segment 9 1736. Traffic channel segment 8 1734 can be assigned to a wireless terminal in the second mode of operation or a wireless terminal in the first mode of operation with an assigned WT ON Mask=001 or 010. Traffic channel segment 9 1736 can be assigned to a wireless terminal in the second mode of operation or a wireless terminal in the first mode of operation with an assigned WT ON Mask=001 or 100.

FIG. 18 is a drawing 1800 illustrating exemplary assignments for each of the exemplary traffic channel segments of FIG. 17. FIG. 18 illustrates information conveyed in exemplary assignment messages in view of the configuration established via the state transition message signaling of FIG. 16 and the structure of FIG. 17. The assignments are determined by the base station and communicated to the wireless terminals. A wireless terminal receives and process assignment signals and determines whether or not a particular assignment is directed to itself.

Base station 1602 has decided to assign traffic channel segment 0 to WT A 1604 as indicated by block 1818 and includes a 5 bit WT identifier=10001 in the corresponding assignment message as indicated by block 1806. Base station 1602 has decided to assign traffic channel segment 1 to WT B 1606 as indicated by block 1820 and includes a 5 bit WT identifier=10001 and a 1 bit WT mask identifier=1 in the corresponding assignment message as indicated by block 1808. Base station 1602 has decided to assign traffic channel segment 2 to WT D 1610 as indicated by block 1822 and includes a 5 bit WT identifier=10010 and a 1 bit WT mask identifier field with a don't care condition, either a 0 or a 1 in the WT mask identifier field, in the corresponding assignment message as indicated by block 1808.

Base station 1602 has decided to assign traffic channel segment 3 to WT C 1608 as indicated by block 1824 and includes a 5 bit WT identifier=10001 and a 1 bit WT mask identifier=1 in the corresponding assignment message as indicated by block 1810. Base station 1602 has decided to assign traffic channel segment 4 to WT D 1610 as indicated by block 1826 and includes a 5 bit WT identifier=10010 and a 1 bit WT mask identifier field with a don't care condition in the corresponding assignment message as indicated by block 1810.

Base station 1602 has decided to assign traffic channel segment 5 to WT D 1610 as indicated by block 1828 and includes a 5 bit WT identifier=10010 in the corresponding assignment message as indicated by block 1828. Base station 1602 has decided to assign traffic channel segment 6 to WT B 1606 as indicated by block 1830 and includes a 5 bit WT identifier 10001 and a 1 bit WT mask identifier=1 in the corresponding assignment message as indicated by block 1814. Base station 1602 has decided to assign traffic channel segment 7 to WT C 1608 as indicated by block 1832 and includes a 5 bit WT identifier=10001 and a 1 bit WT mask identifier=0 in the corresponding assignment message as indicated by block 1814.

Base station 1602 has decided to assign traffic channel segment 8 to WT A 1604 as indicated by block 1834 and includes a 5 bit WT identifier=10001 and a 1 bit WT mask identifier=0 in the corresponding assignment message as indicated by block 1816. Base station 1602 has decided to assign traffic channel segment 9 to WT E 1612 as indicated by block 1836 and includes a 5 bit WT identifier=11000 and a 1 bit WT identifier mask=0 in the corresponding assignment message as indicated by block 1816.

Note that in this exemplary embodiment, the assignment segments have a predetermined mapping to the traffic channel segments in accordance with the channel structure; therefore, the assignment messages, in various embodiments, need not and in various embodiments do not include a field identifying the index of the segment to which the assignment corresponds. The wireless terminals can determine by the position of the assignment, e.g., frequency, time in the recurring timing structure, and/or assignment slot position, the particular traffic channel segment to which an assignment corresponds.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

While described in the context of an OFDM system, at least some of the methods and apparatus, are applicable to a wide range of communications systems including many non-OFDM and/or non-cellular systems.

Numerous additional variations on the methods and apparatus described above will be apparent to those skilled in the art in view of the above description. Such variations are to be considered within scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a base station, the method comprising:
   communicating a base station assigned wireless terminal identifier and a corresponding mask value to a wireless terminal, said mask value being represented by a first number of information bits and identifying at least one traffic channel segment which may be assigned to said wireless terminal;
   communicating a first type assignment message to said wireless terminal, said first type assignment message including said wireless terminal identifier and a mask identifier value; and
   wherein said mask identifier value is a value which indicates which one of multiple wireless terminals, to which the assigned wireless terminal identifier corresponds, is being assigned a traffic channel segment by said first type assignment message.

2. The method of claim 1, wherein said mask identifier value is represented by a second number of information bits, said second number being less than said first number.

3. The method of claim 1, further comprising:
   communicating a second type assignment message to said wireless terminal, said second type of assignment message including said wireless terminal identifier but not including a mask identifier value.

4. The method of claim 3, wherein said first type assignment message is transmitted at a lower power level than said second type assignment message.

5. The method of claim 3, wherein said first type assignment message conveys assignments for a plurality of traffic channel segments one of said plurality of assignments being conveyed by said wireless terminal identifier and said mask identifier value; and wherein said second type of assignment message conveys an assignment for a single traffic channel segment.

6. The method of claim 3, wherein said first and second type assignment messages are traffic channel assignment messages.

7. The method of claim 1, wherein said mask value identifies potential traffic channel segments in a recurring traffic channel structure which may be assigned to said wireless terminal.

8. The method of claim 7, wherein if said mask value matches a first predetermined pattern any traffic channel segment from a set of traffic channel segments in the recurring traffic channel structure may be assigned to the wireless terminal and wherein if said mask value matches a second predetermined pattern a first predetermined subset of said set of traffic channel segments may be assigned to said wireless terminal, and wherein if said mask matches a third predetermined pattern a second predetermined subset of said set of traffic channel segments may be assigned to said wireless terminal.

9. The method of claim 8, wherein said first predetermined subset and said second predetermined subset are partially overlapping.

10. The method of claim 8, wherein if said mask value matches a fourth predetermined pattern a third predetermined subset of said set of traffic channel segments may be assigned to said wireless terminal, said third predetermined subset being partially overlapping with said first and second predetermined subsets.

11. The method of claim 1, wherein said mask identifier value is represented by a single information bit, said single bit distinguishing between two potential mask values which may be associated with the assignment.

12. The method of claim 1, further comprising communicating the same base station assigned wireless terminal identifier and a different corresponding mask value to a second wireless terminal, said wireless terminal and said second wireless terminal being assigned the same base station assigned wireless terminal identifier to be used for concurrent segment assignment recovery identification operations.

13. A base station, comprising:
   a wireless terminal control message generation module for generating message information directed to a wireless terminal, said message information including a base station assigned wireless terminal identifier and a corresponding mask value, said mask value identifying at least one traffic channel segment which may be assigned to said wireless terminal;
   a first type assignment message generation module for generating an assignment message of a first type including said wireless terminal identifier and a mask identifier value, said mask identifier value being a value which indicates which one of multiple wireless terminals, to which the assigned wireless terminal identifier corresponds, is being assigned a traffic channel segment by said first type assignment message; and
   a transmitter for transmitting said wireless terminal control message information and said first type assignment message.

14. The base station of claim 13,
   wherein said mask value is represented by a first number of information bits; and
   wherein said mask identifier value is represented by a second number of information bits, said second number being less than said first number.

15. The base station of claim 13, further comprising:
   a second type assignment message generation module for generating a second type assignment message, said second type of assignment message including said wireless terminal identifier but not including a mask identifier value.

16. The base station of claim 15, further comprising:
a power level control module for controlling relative transmission power levels of said first type assignment message and said second type assignment message such that said first type assignment message is transmitted at a lower power level than said second type assignment message.

17. The base station of claim 15, wherein said first type assignment message conveys assignments for a plurality of traffic channel segments one of said plurality of assignments being conveyed by said wireless terminal identifier and said mask identifier value; and wherein said second type of assignment message conveys an assignment for a single traffic channel segment.

18. The base station of claim 15, wherein said first and second type assignment messages are traffic channel assignment messages.

19. The base station of claim 13, further comprising:
stored traffic channel structure information defining a recurring traffic channel structure; and
wherein said mask value identifies potential traffic channel segments in said recurring traffic channel structure which may be assigned to said wireless terminal.

20. The base station of claim 19, wherein if said mask value matches a first predetermined pattern any traffic channel segment from a set of traffic channel segments in the recurring traffic channel structure may be assigned to the wireless terminal and wherein if said mask value matches a second predetermined pattern a first predetermined subset of said set of traffic channel segments may be assigned to said wireless terminal, and wherein if said mask matches a third predetermined pattern a second predetermined subset of said set of traffic channel segments may be assigned to said wireless terminal.

21. The base station of claim 20, wherein said first predetermined subset and said second predetermined subset are partially overlapping.

22. The base station of claim 20, wherein if said mask value matches a fourth predetermined pattern a third predetermined subset of said set of traffic channel segments may be assigned to said wireless terminal, said third predetermined subset being partially overlapping with said first and second predetermined subsets.

23. The base station of claim 13, wherein said mask identifier value is represented by a single information bit, said single bit distinguishing between two potential mask values which may be associated with the assignment.

24. The base station of claim 13, wherein said wireless terminal control message generation module further generates message information directed to a second wireless terminal including the same base station assigned wireless terminal identifier and a different corresponding mask value, said wireless terminal and said second wireless terminal being assigned the same base station assigned wireless terminal identifier to be used for concurrent segment assignment recovery identification operations.

25. A base station comprising:
means for generating message information directed a wireless terminal, said message information including a base station assigned wireless terminal identifier and a corresponding mask value, said mask value identifying at least one traffic channel segment which may be assigned to said wireless terminal;
first type assignment message generation means for generating an assignment message of a first type including said wireless terminal identifier and a mask identifier value, said mask identifier value being a value which indicates which one of multiple wireless terminals, to which the assigned wireless terminal identifier corresponds, is being assigned a traffic channel segment by said first type assignment message; and
means for transmitting said wireless terminal control message information and said first type assignment message.

26. The base station of claim 25,
wherein said mask value is represented by a first number of information bits; and
wherein said mask identifier value is represented by a second number of information bits, said second number being less than said first number.

27. The base station of claim 25, further comprising:
second type assignment message generation means for generating a second type assignment message, said second type of assignment message including said wireless terminal identifier but not including a mask identifier value.

28. The base station of claim 27, further comprising:
power level control means for controlling relative transmission power levels of said first type assignment message and said second type assignment message such that said first type assignment message is transmitted at a lower power level than said second type assignment message.

29. The base station of claim 27, wherein said first type assignment message conveys assignments for a plurality of traffic channel segments one of said plurality of assignments being conveyed by said wireless terminal identifier and said mask identifier value; and wherein said second type of assignment message conveys an assignment for a single traffic channel segment.

30. The base station of claim 27, wherein said first and second type assignment messages are traffic channel assignment messages.

31. The base station of claim 25, further comprising:
means for storing traffic channel structure information defining a recurring traffic channel structure; and
wherein said mask value identifies potential traffic channel segments in said recurring traffic channel structure which may be assigned to said wireless terminal.

32. A computer readable medium embodying machine executable instructions for implementing a method of operating a base station, the method comprising
communicating a base station assigned wireless terminal identifier and a corresponding mask value to a wireless terminal, said mask value being represented by a first number of information bits and identifying at least one traffic channel segment which may be assigned to said wireless terminal;
communicating a first type assignment message to said wireless terminal, said first type assignment message including said wireless terminal identifier and a mask identifier value; and
wherein said mask identifier value is a value which indicates which one of multiple wireless terminals, to which the assigned wireless terminal identifier corresponds, is being assigned a traffic channel segment by said first type assignment message.

33. The computer readable medium of claim 32, wherein said mask identifier value is represented by a second number of information bits, said second number being less than said first number.

34. The computer readable medium of claim 32, further comprising machine executable instructions for controlling a base station to perform the additional step of:
communicating a second type assignment message to said wireless terminal, said second type of assignment message including said wireless terminal identifier but not including a mask identifier value.

35. The computer readable medium of claim 34, wherein said first type assignment message is transmitted at a lower power level than said second type assignment message.

36. The computer readable medium of claim 34, wherein said first type assignment message conveys assignments for a plurality of traffic channel segments one of said plurality of assignments being conveyed by said wireless terminal identifier and said mask identifier value; and wherein said second type of assignment message conveys an assignment for a single traffic channel segment.

37. The computer readable medium of claim 34, wherein said first and second type assignment messages are traffic channel assignment messages.

38. The computer readable medium of claim 32, wherein said mask value identifies potential traffic channel segments in a recurring traffic channel structure which may be assigned to said wireless terminal.

39. A method of operating a wireless terminal comprising:
receiving a base station assigned wireless terminal identifier having a first value and a corresponding mask value from a base station, said mask value being represented by a first number of information bits and identifying at least one traffic channel segment which may be assigned to said wireless terminal; and
receiving a first type assignment message from said base station, said first type assignment message including said wireless terminal identifier and a mask identifier value, said mask identifier value being a value which indicates which one of multiple wireless terminals, to which the assigned wireless terminal identifier corresponds, is being assigned a traffic channel segment by said first type assignment message.

40. The method of claim 39 wherein said mask identifier value is represented by a second number of information bits, said second number being less than said first number.

41. The method of claim 39, further comprising, identifying from said received first type assignment message whether or not the assignment is directed to the wireless terminal.

42. The method of claim 39, wherein when said received mask value is one of a set of a plurality of predetermined mask values, said step of identifying whether or not said assignment is directed to said wireless terminal including: determining whether said received base station assigned wireless terminal identifier value matches said wireless terminal identifier in said received assignment message and determining whether said received mask identifier value identifies said received mask value.

43. The method of claim 39, wherein when said mask value is a first predetermined mask value, said first predetermined mask value being exclusive from said set of plurality of predetermined mask values, said step of identifying whether or not said assignment is directed to said wireless terminal including: determining whether said received base station assigned wireless terminal identifier value matches said wireless terminal identifier in said received assignment message, said determination not requiring use of said mask identifier value received in said assignment message.

44. The method of claim 41, further comprising:
receiving a second type assignment message, said second type of assignment message including said wireless terminal identifier but not including a mask identifier value; and
identifying that said second type assignment message is directed to said wireless terminal.

45. The method of claim 39, wherein the wireless terminal determines a subset of assignment messages to receive as a function of said received mask value.

46. The method of claim 39, wherein the wireless terminal determines a subset of assignment messages to process as a function of said received mask value.

47. The method of claim 39, wherein if said received mask value matches a first predetermined pattern any traffic channel segment from a set of traffic channel segments in the recurring traffic channel structure may be assigned to the wireless terminal and wherein if said mask value matches a second predetermined pattern a first predetermined subset of said set of traffic channel segments may be assigned to said wireless terminal, and wherein if said mask matches a third predetermined pattern a second predetermined subset of said set of traffic channel segments may be assigned to said wireless terminal.

48. The method of claim 47, wherein said first predetermined subset and said second predetermined subset are partially overlapping.

49. The method of claim 48, wherein if said mask value matches a fourth predetermined pattern a third predetermined subset of said set of traffic channel segments may be assigned to said wireless terminal, said third predetermined subset being partially overlapping with said first and second predetermined subsets.

50. The method of claim 41, wherein when said wireless terminal determines that said assignment is directed to said wireless terminal, the method further comprising performing one of:
transmitting coded information using an uplink traffic channel segment associated with said received assignment by a predetermined association; and
receiving coded information communicated via a downlink traffic channel segment associated with said received assignment by a predetermined association.

51. A wireless terminal, comprising:
a control message processing module for processing received control message information including a base station assigned wireless terminal identifier and a corresponding mask value, said mask value being represented by a first number of information bits and identifying at least one traffic channel segment which may be assigned to said wireless terminal; and
a first type assignment message processing module for processing assignment messages of a first type, said first type assignment messages including said wireless terminal identifier and a mask identifier value, said mask identifier value being a value which indicates which one of multiple wireless terminals, to which the assigned wireless terminal identifier corresponds, is being assigned a traffic channel segment by said first type assignment message.

52. The wireless terminal of claim 51 wherein said mask identifier value is represented by a second number of information bits, said second number being less than said first number.

53. The wireless terminal of claim 51, wherein said first type assignment message processing module identifies from a received first type assignment message whether or not a received assignment is directed to the wireless terminal.

54. The wireless terminal of claim 51,
wherein said first type assignment processing module includes a first operational mode processing module for determining whether a received base station assigned wireless terminal identifier value matches said wireless terminal identifier included in said received assignment message and determining whether said received mask identifier value identifies said received mask value, wherein said received mask value is one of a plurality of predetermined mask values.

55. The wireless terminal of claim 51, wherein said first type assignment processing module includes a second operational mode processing module for determining whether said received base station assigned wireless terminal identifier value matches said wireless terminal identifier in said received assignment message, said determination not requiring use of said mask identifier value received in said assignment message.

56. The wireless terminal of claim 53, further comprising:
a second type assignment message processing module for processing a second type of assignment message including said wireless terminal identifier but not including a mask identifier value; and for identifying that said second type assignment message is directed to said wireless terminal.

57. The wireless terminal of claim 51, further comprising:
stored traffic channel structure information defining a recurring traffic channel structure; and
wherein said mask value identifies potential traffic channel segments in said recurring traffic channel structure which may be assigned to said wireless terminal.

58. The wireless terminal of claim 53, wherein said first and second type assignment messages are traffic channel assignment messages.

59. The wireless terminal of claim 53, further comprising:
stored information indicating a predetermined mapping between assignment messages and at least one of uplink and downlink traffic channel segments in a recurring channel structure.

60. A wireless terminal, comprising:
means for processing received control message information including a base station assigned wireless terminal identifier and a corresponding mask value, said mask value being represented by a first number of information bits and identifying at least one traffic channel segment which may be assigned to said wireless terminal; and
first type assignment message processing means for processing assignment messages of a first type, said first type assignment messages including said wireless terminal identifier and a mask identifier value, said mask identifier value being a value which indicates which one of multiple wireless terminals, to which the assigned wireless terminal identifier corresponds, is being assigned a traffic channel segment by said first type assignment message.

61. The wireless terminal of claim 60 wherein said mask identifier value is represented by a second number of information bits, said second number being less than said first number.

62. The wireless terminal of claim 60, wherein said first type assignment message processing module identifies from a received first type assignment message whether or not a received assignment is directed to the wireless terminal.

63. The wireless terminal of claim 60,
wherein said first type assignment processing means includes a first operational mode processing means for determining whether a received base station assigned wireless terminal identifier value matches said wireless terminal identifier included in said received assignment message and determining whether said received mask identifier value identifies said received mask value, wherein said received mask value is one of a plurality of predetermined mask values.

64. The wireless terminal of claim 60, wherein said first type assignment processing means further includes a second operational mode processing module for determining whether said received base station assigned wireless terminal identifier value matches said wireless terminal identifier in said received assignment message, said determination not requiring use of said mask identifier value received in said assignment message.

65. The wireless terminal of claim 62, further comprising:
second type assignment message processing means for processing a second type of assignment message including said wireless terminal identifier but not including a mask identifier value; and for identifying that said second type assignment message is directed to said wireless terminal.

66. The wireless terminal of claim 60, further comprising:
means for storing traffic channel structure information defining a recurring traffic channel structure; and
wherein said mask value identifies potential traffic channel segments in said recurring traffic channel structure which may be assigned to said wireless terminal.

67. A computer readable medium embodying machine executable instructions for implementing a method of operating a wireless terminal, the method comprising
receiving a base station assigned wireless terminal identifier of a first value and a corresponding mask value from a base station, said mask value being represented by a first number of information bits and identifying at least one traffic channel segment which may be assigned to said wireless terminal;
receiving a first type assignment message from said base station, said first type assignment message including said wireless terminal identifier and a mask identifier value; and
wherein said mask identifier value is a value which indicates which one of multiple wireless terminals, to which the assigned wireless terminal identifier corresponds, is being assigned a traffic channel segment by said first type assignment message.

68. The computer readable medium of claim 67 wherein said mask identifier value is represented by a second number of information bits, said second number being less than said first number.

69. The computer readable medium of claim 67, further comprising machine executable instructions for controlling a wireless terminal to perform the step of:
identifying from said received first type assignment message whether or not the assignment is directed to the wireless terminal.

70. The computer readable medium of claim 67, wherein when said received mask value is one of a set of a plurality of predetermined mask values, said step of identifying whether or not said assignment is directed to said wireless terminal including: determining whether said received base station assigned wireless terminal identifier value matches said wireless terminal identifier in said received assignment message and determining whether said received mask identifier value identifies said received mask value.

71. The computer readable medium of claim 67, wherein when said mask value is a first predetermined mask value, said first predetermined mask value being exclusive from said set of plurality of predetermined mask values, said step of identifying whether or not said assignment is directed to said wireless terminal including: determining whether said received base station assigned wireless terminal identifier value matches said wireless terminal identifier in said received assignment message, said determination not requiring use of said mask identifier value received in said assignment message.

72. The computer readable medium of claim 69, further comprising machine executable instructions for controlling a wireless terminal to perform the steps of:

receiving a second type assignment message, said second type of assignment message including said wireless terminal identifier but not including a mask identifier value; and identifying that said second type assignment message is directed to said wireless terminal.

\* \* \* \* \*